US012770639B2

(12) United States Patent
Habets et al.

(10) Patent No.: US 12,770,639 B2
(45) Date of Patent: Oct. 20, 2026

(54) SIGNAL CHARACTERISTIC DETERMINATOR, METHOD FOR DETERMINING A SIGNAL CHARACTERISTIC, AUDIO ENCODER AND COMPUTER PROGRAM

(71) Applicant: Fraunhofer-Gesellschaft zur Förderung der angewandten Forschung e.V., Munich (DE)

(72) Inventors: Emanuel Habets, Erlangen (DE); Adrian Herzog, Erlangen (DE)

(73) Assignee: FRAUNHOFER-GESELLSCHAFT ZUR FORDERUNG DER ANGEWANDTEN FORSCHUNG E.V., Munich (DE)

( * ) Notice: Subject to any disclaimer, the term of this patent is extended or adjusted under 35 U.S.C. 154(b) by 229 days.

(21) Appl. No.: 18/331,380

(22) Filed: Jun. 8, 2023

(65) Prior Publication Data

US 2023/0352044 A1 Nov. 2, 2023

Related U.S. Application Data

(63) Continuation of application No. PCT/EP2021/084869, filed on Dec. 8, 2021.

(30) Foreign Application Priority Data

Dec. 8, 2020 (EP) .................................... 20212600

(51) Int. Cl.
*G10L 25/21* (2013.01)
*H04S 3/02* (2006.01)

(52) U.S. Cl.
CPC .................................. *G10L 25/21* (2013.01)

(58) Field of Classification Search
CPC .......... H04R 3/005; H04R 3/00; H04R 1/083; H04R 2430/20; H04R 5/027; H04S 3/02;
(Continued)

(56) References Cited

U.S. PATENT DOCUMENTS

2012/0093344 A1* 4/2012 Sun ........................ H04R 3/005 367/138
2014/0355769 A1* 12/2014 Peters ....................... H04S 7/40 381/23

(Continued)

OTHER PUBLICATIONS

Politis et al., "Sector-Based Parametric Sound field Reproduction in the Spherical Harmonic Domain", IEEE J. of Selected Topics in Signal Processing, vol. 9, No. 5, Aug., IDS pp. 852-866 (Year: 2015).*

(Continued)

*Primary Examiner* — Leshui Zhang
(74) *Attorney, Agent, or Firm* — McClure, Qualey & Rodack, LLP

(57) ABSTRACT

Embodiments according to the invention comprise a signal characteristic determinator, e.g. a calculator or an estimator, wherein the signal characteristic determinator is configured to determine an information about a characteristic of a sound field, e.g. a direction-of-arrival information or a diffuseness information, on the basis of higher-order, e.g. order larger than 1, spherical harmonic coefficients, also designated as SHCs, of a sound pressure, e.g. p(k), which may, for example, form the basis for $\Phi_p(k)$, and/or of a particle velocity and on the basis of spherical-harmonic-order dependent weights, e.g. weights g which determine the matrix G. Further embodiments of the invention comprise a signal characteristic determinator configured to determine an information about a characteristic of a sound field on the basis of higher-order circular harmonic coefficients of a sound pres- (Continued)

sure and/or of a particle velocity and on the basis of circular-harmonic-mode dependent weights.

20 Claims, 15 Drawing Sheets

(58) Field of Classification Search
CPC ........ H04S 3/008; H04S 2420/11; H04S 7/30; G06F 3/01; G06F 3/011; G10L 25/03; G10L 25/21; G10L 19/008; G10L 19/002; G10L 19/00; G10L 19/02
USPC ....... 704/200, 225, 224, 500–504; 381/1–23, 381/92, 26, 122; 700/94
See application file for complete search history.

(56) References Cited

U.S. PATENT DOCUMENTS

| | | | | |
|---|---|---|---|---|
| 2015/0043736 A1* | 2/2015 | Olsen | H04S 7/30 381/17 |
| 2015/0098572 A1* | 4/2015 | Krueger | H04H 20/89 381/22 |
| 2021/0006892 A1* | 1/2021 | Tsutsumi | H04R 3/12 |

OTHER PUBLICATIONS

International Search Report and Written Opinion issued in application No. PCT/EP2021/084869.
Pulkki, V.; "Spatial sound reproduction with directional audio coding;" Journal Audio Eng. Soc; vol. 55; No. 6; Jun. 2007; pp. 503-516.
Scaini, D., et al.; "Decoding of higher order ambisonics to irregular periphonic loudspeaker arrays;" Proc. 55th Int. Audio Eng. Soc. Conf.; Aug. 2014; pp. 1-9.
Zuo, H., et al.; "Intensity based spatial soundfield reproduction using an irregular loudspeaker array;" IEEE/ACM Trans. Audio, Speech, Lang. Processing; vol. 28; 2020; pp. 1356-1369.
Ahonen, J., et al.; "Diffuseness estimation using temporal variation of intensity vectors;" Proc. IEEE Workshop on Applications of Signal Processing to Audio and Acoustics (WASPAA); Oct. 2009; pp. 285-288.
Jarrett, D.P., et al.; "3D source localization in the spherical harmonic domain using a pseudointensity vector;" Proc. European Signal Processing Conf. (EUSIPCO); Aug. 2010; pp. 442-446.
Moore, A.H., et al.; "Direction of arrival estimation in the spherical harmonic domain using subspace pseudointensity vectors;" IEEE/ACM Trans. Audio, Speech, Lang. Processing; vol. 25; No. 1; Jan. 2017; pp. 178-192.
Gerzon, M.A.; "The design of precisely coincident microphone arrays for stereo and surround sound," in Proc. Audio Eng. Soc. Convention; 1975; pp. 1-5.
Herre, J., et al.; "MPEG-H 3D Audio—the new standard for coding of immersive spatial audio;" IEEE J. Sel. Topics Signal Processing; vol. 9; No. 5; Aug. 2015; pp. 770-779.
Zotter, F., et al.; Ambisonics—A Practical 3D Audio Theory for Recording, Studio Production, Sound Reinforcement, and Virtual Reality; Springer; 2019; pp. 1-223.
Khaykin, D., et al.; "Coherent signals direction-of-arrival estimation using a spherical microphone array: Frequency smoothing approach;" Proc. IEEE Workshop on Applications of Signal Processing to Audio and Acoustics (WASPAA); Oct. 2009; pp. 221-224.
Teutsch, H., et al.; "Detection and localization of multiple wideband acoustic sources based on wavefield decomposition using spherical apertures;" Proc. IEEE Intl. Conf. on Acoustics, Speech and Signal Processing (ICASSP); 2008; pp. 5276-5279.
Jo, B., et al.; "Parametric direction-of-arrival estimation with three recurrence relations of spherical harmonics;" J. Acoust. Soc. Am. 145(1); Jan. 2019; pp. 480-488.
Herzog, A., et al.; "Eigenbeam-ESPRIT for DOA-vector estimation;" IEEE Signal Process. Lett.; vol. 26; No. 4; Apr. 2019; pp. 572-576.
Epain, N., et al.; "Spherical harmonic signal covariance and sound field diffuseness;" IEEE Trans. Audio, Speech, Lang. Process.; vol. 24; No. 10; Oct. 2016; pp. 1796-1807.
Politis, A., et al.; "Sector-Based Parametric Sound Field Reproduction in the Spherical Harmonic Domain;" IEEE Journal of Selected Topics in Signal Processing, IEEE, US; vol. 9; No. 5; Aug. 2015; pp. 852-866.
Herzog, A., et al.; "On the relation between DOA-vector eigenbeam ESPRIT and subspace-pseudointensity-vector;" Proc. European Signal Processing Conf. (EUSIPCO); 2019; pp. 1-5.
Zuo, H., et al.; "Spatial sound intensity vectors in spherical harmonic domain;" J. Acoust. Soc. Am. EL145(2); Feb. 2019; pp. 149-155.
Zuo, H., et al.; "Particle velocity assisted three dimensional soundfield reproduction using a modal-domain approach;" IEEE/ACM Trans. Audio, Speech, Lang. Process.; vol. 28; 2020; pp. 2119-2133.
Pierce, A.D.; "Acoustics: An Introduction to Its Physical Principles and Applications;" Acoustical Society of America; 1991; pp. 1-797.
Jarrett, D.P., et al.; "Theory and Applications of Spherical Microphone Array Processing;" Springer; 2017; pp. 1-201.
Fahy, F.J.; "Sound Intensity;" second ed. (E FN SPON); 1995; pp. 1-310.
Jacobsen, F.; "Active and reactive sound intensity in a reverberant sound field;" Journal of Sound and Vibration 143 (2); 1990; pp. 231-240.
Rafaely, B.; Fundamentals of Spherical Array Processing; vol. 8; Springer; 2015; pp. 1-196.
Meyer, J., et al.; "A highly scalable spherical microphone array based on an orthonormal decomposition of the soundfield;" Proc. IEEE Intl. Conf. 077, Acoustics, Speech and Signal Processing (ICASSP); vol. 2; 2002; pp. 1781-1784.
Meyer, J., et al.; "Spherical microphone arrays for 3d sound recordings;" Audio Signal Processing for Next-Generation Multimedia Communication Systems; 2004; pp. 67-89.
Herzog, A., et al.; "Online DOA estimation using real eigenbeam ESPRIT with propagation vector matching;" Proc. EAA Spatial Audio Signal Processing Symp.; Sep. 2019; pp. 18-24.
Gaunt, J.A.; "On the triplets of helium;" Philos. Trans. Roy. Soc. (London) Ser. A 228; Nov. 1928; pp. 151-196.
Kuhn, H.W., et al.; "Nonlinear programming;" Proc. Second Berkeley Symp. an Math. Statist. and Prob., Univ. of Calif. Press; 1951; pp. 481-492.
Schwartz, O., et al.; "Joint estimation of late reverberant and speech power spectral densities in noisy environments using Frobenius norm;" Proc. European Signal Processing Conf. (EUSIPCO); 2016; pp. 1123-1127.
Gover, B.N., et al.; "Microphone array measurement system for analysis of directional and spatial variations of sound fields;" J. Acoust. Soc, Am. 112(5); Nov. 2002; pp. 1980-1991.
Jacobsen, F., et al.l; "A comparison of two different sound intensity measurement principles;" J. Acoust. Soc. Am.; vol. 118; No. 3; Sep. 2005; pp. 1510-1517.
Sennheiser electronic GmbH & Co. KG, "Ambeo VR mic." https://sennheiser.com/mikrofon-3d-audio-ambeo-vr-mic.
"Mh acoustics LLC," em32 Eigenmike ® https://mhacoustics.com/products.
Jarrett, D.P., et al.; "Noise reduction in the spherical harmonic domain using a tradeoff beamformer and narrowband DOA estimates;" IEEE/ACM Transactions on Audio, Speech, and Language Processing, IEEE; vol. 22; No. 5; May 2014; pp. 967-978.

* cited by examiner

SIGNAL CHARACTERISTIC DETERMINATOR, METHOD FOR DETERMINING A SIGNAL CHARACTERISTIC, AUDIO ENCODER AND COMPUTER PROGRAM

CROSS-REFERENCES TO RELATED APPLICATIONS

This application is a continuation of copending International Application No. PCT/EP2021/084869, filed Dec. 8, 2021, which is incorporated herein by reference in its entirety, and additionally claims priority from European Application No. EP 20 212 600.9, filed Dec. 8, 2020, which is incorporated herein by reference in its entirety.

Embodiments according to the invention are related to signal characteristic determinators, methods for determining a signal characteristic, audio encoders and computer programs.

BACKGROUND OF THE INVENTION

The following may provide an introduction to the problems addressed by embodiments of the invention.

The intensity vector and energy density are important acoustic quantities which may, for example, be used for, e.g., sound field reproduction[1-3] or acoustic parameter estimation[4-6]. In directional audio coding (DirAC)[1], the direction-of-arrival (DOA) and diffuseness parameters of a sound field may, for example, be estimated using the intensity vector and energy density at a single position. In this case, the intensity vector and energy density can be computed from the zero- and first-order spherical harmonic coefficients (SHCs) of the sound field.

These SHCs can be obtained using a sound field microphone[7]. In recent years, the use of spherical microphone arrays which can compute higher-order SHCs of a sound field have received more and more attention due to the use of higher-order Ambisonics in, e.g., MPEG-H 3D audio[8] and virtual reality[9]. Hence, it is of paramount importance to incorporate higher-order SHCs for the acoustic parameter estimation.

For the DOA-estimation, spherical harmonic domain (SHD) versions of multiple signal classification (MUSIC) and estimation of signal parameters via rotational invariance techniques (ESPRIT) have been developed[10-13]. However, both methods require an eigendecomposition of the SHCs covariance matrix and, for MUSIC, an additional grid-search is required. This results in a computational complexity which is much higher compared to the intensity vector-based method used in DirAC. For the diffuseness estimation, estimators based on the SHCs coherence matrix[14] or the variance of the eigenvalues of the SHCs covariance matrix[15] have been developed. However, these estimators either require knowledge of the DOA or an eigendecomposition of the SHCs covariance matrix.

Politis et al.[16] incorporated higher-order SHCs for DOA and diffuseness estimation by computing the intensity vector and energy density in different directional sectors. In the subspace pseudointensity vector (PIV) method[6], higher-order SHCs are employed for DOA estimation using the dominant eigenvector of the SHCs covariance matrix. Recently, the present authors have shown that the subspace PIV method can be related to the DOA-vector Eigenbeam-ESPRIT[17]. Using this relation, an extended PIV was defined which uses higher-order SHCs for the DOA estimation and has significantly lower computational complexity than the DOA-vector Eigenbeam-ESPRIT. Nevertheless, the physical meaning of the extended PIV remains unclear and a corresponding extension of the energy density has not yet been developed.

Zu et al.[18] derived expressions for the SHCs of the intensity vector at arbitrary distance r from the coordinate origin and applied it to sound field reproduction[3-19]. Higher-order SHCs of the sound pressure are involved for radii $r>0$. However, it remains unclear, how to combine the SHCs of the intensity vector for DOA estimation. Moreover, the expressions involve a radial dependency which may be useful in the context of sound field reproduction but, in the context of DOA estimation, the choice of the radius r is somewhat arbitrary.

Therefore, it is desired to obtain a concept for determining a sound field characteristic which makes a better compromise between a computational complexity and an accuracy of a determination or estimation of the characteristic of the sound field.

SUMMARY

An embodiment may have a signal characteristic determinator, wherein the signal characteristic determinator is configured to determine a characteristic of a sound field on the basis of higher-order spherical harmonic coefficients of a sound pressure and/or of a particle velocity and on the basis of spherical-harmonic-order dependent weights; wherein the characteristic of the sound field is a generalized intensity vector and/or a generalized energy density of the sound field; wherein the determination of the characteristic of the sound field on the basis of the spherical-harmonic-order dependent weights is associated with a weighted spatial averaging; and wherein the determination of the characteristic of the sound field on the basis of the spherical-harmonic-order dependent weights comprises a radial spatial averaging of an intensity vector of the sound field and/or of an energy density of the sound field.

Another embodiment may have a method for determining a signal characteristic, wherein the method comprises determining a characteristic of a sound field on the basis of higher-order spherical harmonic coefficients of a sound pressure and/or of a particle velocity and on the basis of spherical-harmonic-order dependent weights; wherein the characteristic of the sound field is a generalized intensity vector and/or a generalized energy density of the sound field; wherein the determination of the characteristic of the sound field on the basis of the spherical-harmonic-order dependent weights is associated with a weighted spatial averaging; and wherein the determination of the characteristic of the sound field on the basis of the spherical-harmonic-order dependent weights comprises a radial spatial averaging of an intensity vector of the sound field and/or of an energy density of the sound field.

Another embodiment may have a non-transitory digital storage medium having a computer program stored thereon to perform the method for determining a signal characteristic, wherein the method comprises determining a characteristic of a sound field on the basis of higher-order spherical harmonic coefficients of a sound pressure and/or of a particle velocity and on the basis of spherical-harmonic-order dependent weights; wherein the characteristic of the sound field is a generalized intensity vector and/or a generalized energy density of the sound field; wherein the determination of the characteristic of the sound field on the basis of the spherical-harmonic-order dependent weights is associated with a weighted spatial averaging; and wherein the determination of the characteristic of the sound field on the basis of the spherical-harmonic-order dependent weights comprises a radial spatial averaging of an intensity vector of the sound field and/or of an energy density of the sound field, when said computer program is run by a computer.

Embodiments according to the invention comprise a signal characteristic determinator, e.g. a calculator or an estimator, wherein the signal characteristic determinator is configured to determine an information about a characteristic of a sound field, e.g. a direction-of-arrival information or a diffuseness information, on the basis of higher-order, e.g. order larger than 1, spherical harmonic coefficients, also designated as SHCs, of a sound pressure, e.g. p(k), which may, for example, form the basis for Φp(k), e.g. $\Phi_p(k)$, and/or of a particle velocity and on the basis of spherical-harmonic-order dependent weights, e.g. weights G, and/or g, e.g. with $g=[G_0, \ldots, G_{L-1}]^T$, which determine the matrix G, wherein matrix G may be a diagonal matrix.

Embodiments according to the invention are based on the idea to incorporate higher-order spherical harmonic coefficients of a sound pressure and/or of a particle velocity of a sound field in a determination of an information about a characteristic of the sound field using spherical-harmonic-order dependent weights.

The higher order spherical harmonic coefficients (SHCs) of the sound pressure and/or of the particle velocity may, for example, be measured using spherical microphone arrays. However, in order to take advantage of the information about the sound field, contained in the SHCs, e.g. for usage in higher-order Ambisonics, for example in MPEG-H 3D audio and/or in virtual reality applications, the inventors realized that a computational inexpensive processing of the SHCs, with limited computational complexity may be advantageous.

Therefore, according to embodiments of the invention, the characteristic of the sound field may be determined using, or for example based on, spherical-harmonic order dependent weights. Calculation results or intermediate calculation results may be determined based on weighted mathematical operations, e.g. a weighted spatial averaging, using the weights. On the one hand, using spherical-harmonic-order dependent weights may allow to compute the information about the sound field using spherical harmonic expansions, or for example, the corresponding spherical harmonic coefficients thereof. Performing computations based on series expansions may, for example, provide computational advantages. As an example, the spherical harmonic representation may be useful here, e.g. in the context of the invention, because, instead of having to measure the sound field densely at many different spatial positions, one may, for example, just measure it (e.g. the sound field) on several positions on a sphere, transform these signals to the spherical harmonic domain and then use these obtained SHCs.

On the other hand, the weights may provide an additional degree of freedom in the computation of the information about the sound field. As an example, the weights may, for example be used in a weighted averaging of the SHCs of the sound pressure and/or of the particle velocity or of intermediate variables, e.g. an intensity vector (e.g. comprising an information about an energy flow of the sound field) or an energy density (e.g. comprising an information about a sum of kinetic and potential energy densities of the sound field). This may allow for an adaptation of variable dependencies, as an example, a spatial, e.g. a radial, dependency may be canceled, for example using a spatial weighted averaging. This may increase the accuracy of the determination of the information about the characteristic of the sound field.

As another example, the weights, may, for example, be used as tuning parameters, to provide means to improve, e.g. empirically or e.g. using deterministic or stochastic optimization algorithms, the accuracy of the determination of the information.

Furthermore, spherical-harmonic-order dependent weights can, for example, be incorporated in the determination of the information about the sound field with a low increase in complexity. Tuning or determination of the weights, may for example, be performed with well-known and computationally inexpensive optimization algorithms.

Moreover, the inventors recognized that the usage of order-dependent weights allows to allocate different weightings to spherical harmonic coefficients of different order, which in turn may allow to adapt the determination of the information about the sound field to specific requirements. As an example, usage of order-dependent weights may allow to implement a filtering and/or a shaping, e.g. in contrast to a simple order-independent scaling. This may allow to extract a distinctive information about a characteristic of the sound field.

Hence, a better compromise between a computational complexity and an accuracy of a determination or estimation of the characteristic of the sound field may be achieved.

According to further embodiments of the invention, the determination of the information about the characteristic of the sound field on the basis of the spherical-harmonic-order dependent weights is associated with, or, for example, effects or, for example, comprises, a weighted spatial averaging, e.g. of the acoustic intensity vector and/or energy density, e.g. of a spatial distribution of an intensity vector and/or of a spatial distribution of an energy density, wherein, for example, a spatial weighting may be defined by the spherical-harmonic-order dependent weights.

As explained before, performing a weighted spatial averaging may allow to remove a spatial, e.g. radial dependency, for example of the intensity vector, and/or of the energy density. The intensity vector and/or the energy density may, for example be calculated based on the sound pressure and/or the particle velocity. However, only SHCs of the beforementioned variables may, for example, be determined and/or used for the determination, hence performing the calculation in the spherical harmonic domain. As explained before, the information about the characteristic of the sound filed may, for example, comprise a direction of arrival (DOA) and/or a diffuseness information. The weighted spatial averaging may allow for a determination of the DOA and/or diffuseness information with increased accuracy.

According to further embodiments of the invention, the determination of the information about the characteristic of the sound field on the basis of the spherical-harmonic-order dependent weights comprises, or, for example, effects or, for example, is associated with a, e.g. weighted, direction independent spatial averaging.

According to further embodiments of the invention, the spherical-harmonic-order dependent weights may also be mode dependent, and/or spatial mode dependent, e.g. degree-dependent, and the determination of the information about the characteristic of the sound field on the basis of the spherical-harmonic-order dependent and mode dependent weights comprises, or, for example, effects or is, for example, associated with a, e.g. weighted, direction dependent spatial averaging.

With direction independent weights, an analysis of the sound field may not be biased in certain spatial directions. With a direction dependent spatial averaging, the sound field may be analyzed with a distinct focus on specific spatial directions. This may allow for an additional degree of freedom in the analysis of the sound field, in order to extract a desired information.

According to further embodiments of the invention, the characteristic of the sound field, which is determined by the signal characteristic determinator, is a generalized intensity vector, e.g. $I_g$; e.g. an intensity vector which represents a weighted spatial average of a sound intensity, wherein, for example, the spherical-harmonic-order dependent weights define a weighting characteristic; e.g. an intensity vector which approximates a weighted spatial average $I_w$. and/or a generalized energy density of the sound field, e.g. $E_g$; e.g. an energy density value which represents a weighted spatial average of a sound energy density, wherein, for example, the spherical-harmonic-order dependent weights define a weighting characteristic; e.g. an energy density value which approximates a weighted spatial average $E_w$.

Intensity vector and/or energy density may be important acoustic quantities of a sound field, that may be used for example for sound field reproduction and/or acoustic parameter estimation. Based on the intensity vector and/or the energy density a direction-of-arrival (DOA) and/or diffuseness parameters of the sound field may, for example be estimated at a particular position. Using the inventive generalized intensity vector and/or generalized energy density determination and/or estimation of the beforementioned entities may be performed with increased accuracy and/or reliability. As an example, the generalized intensity vector and/or the generalized energy density of the sound field may be calculated in the form of their respective SHCs, for example, based on the SHCs of the sound pressure and/or the particle velocity.

According to further embodiments of the invention, the signal characteristic determinator is configured to determine an information about a characteristic of a sound field on the basis of higher-order circular harmonic coefficients of a sound pressure and/or of a particle velocity and on the basis of circular-harmonic-mode dependent weights. It should be noted that the such an apparatus may be supplemented by any of the features, functionalities and details which are described herein with respect to embodiments using higher-order spherical harmonic coefficients and/or using spherical-harmonic-order dependent weights, both individually and taken in combination.

According to further embodiments of the invention, the signal characteristic determinator may be configured to convert higher-order circular harmonic coefficients of the sound pressure and/or of the particle velocity into higher-order spherical harmonic coefficients of the sound pressure and/or of the particle velocity, and to determine the information about the characteristic of the sound field using the higher-order spherical harmonic coefficients of the sound pressure and/or of the particle velocity.

According to further embodiments of the invention, the higher-order spherical harmonic coefficients of the sound pressure and/or of the particle velocity may be substituted by or may be determined by higher-order circular harmonic coefficients (CHCs) of the sound pressure and/or of the particle velocity. In addition, the signal characteristic determinator may be configured to determine the information about the characteristic of the sound field on the basis of spherical-harmonic-order dependent weights or on the basis of circular-harmonic-mode dependent weights.

As an example, a special case of the spherical harmonics may be the circular harmonics (CHs). If the sound field is independent of one of the three spatial dimensions, it can, for example, be expanded in terms of CHs. The respective sound field coefficients may, for example, be the circular harmonic coefficients (CHCs). CHCs can, for example, be estimated using a circular microphone array. For example in this case, the intensity vector and energy density can be expressed in terms of the CHCs of the sound field. Then, weighted spatial averaging of these quantities can be considered or may, for example, be performed according to any of the embodiments of the invention. Analogously to the spherical case, a generalized intensity vector and a generalized energy density can be defined which can be computed using quadratic forms of the CHCs of the sound field. These quadratic forms may incorporate circular harmonic mode dependent weights. These weights can, for example, be chosen or computed differently for different applications.

As an example, using state-of-the-art techniques it may be possible to approximate/compute (e.g. approximate and/or compute) SHCs from CHCs (e.g. possibly using additional information).

In general, according to embodiments of the invention, one may first convert CHD to SHC and then apply the invention. In other words, in general, a signal characteristic determinator may determine SHCs based on CHCs and may use the SHCs in order to determine the information about the sound field, e.g. using spherical-harmonic-order dependent weights or using circular-harmonic-mode dependent weights.

According to further embodiments of the invention, the signal characteristics determinator may be configured to convert higher-order circular harmonic coefficients of the sound pressure and/or of the particle velocity into higher-order spherical harmonic coefficients of the sound pressure and/or of the particle velocity.

According to further embodiments of the invention, the signal characteristic determinator is configured to determine, as one or more intermediate quantities, a generalized intensity vector, e.g. $I_g$, and/or a generalized energy density, e.g. $E_g$ of the sound field, on the basis of the higher order SHCs, e.g. on the basis of SHCs with maximum order >1, of the sound pressure and/or the particle velocity and on the basis of spherical-harmonic-order dependent weights, and to determine the information about the characteristic of the sound field one the basis of the one or more intermediate quantities. As an example, SHCs of the sound pressure and/or of the particle velocity of orders 0 and 1 may be involved or used as well. In other words, SHCs having an order equal or less to a maximum order may be used, wherein the maximum order may be >1.

The generalized intensity vector and/or the generalized energy density may provide an information about the sound field that may be easier to interpret, for example in comparison to sound pressure and particle velocity and hence, processing, for example averaging based on the generalized intensity vector and/or the generalized energy density or for example based on their respective SHCs may allow for an efficient information extraction. As an example, the beforementioned weighted averaging may be performed using the SHCs of the generalized intensity vector and/or of the generalized energy density, such that the weights may be interpretable themselves and such that tuning of the weights may be performed with respect to their physical meaning.

According to further embodiments of the invention, the signal characteristic determinator is configured to determine the generalized intensity vector and/or a component of the generalized intensity vector, e.g.

$$I_g^a,$$

and/or a generalized energy density, e.g. $E_g(k)$, of the sound field using a quadratic function of the SHCs of the sound pressure, e.g. $P_{lm}$, and/or of the particle velocity, e.g. $U_{lm}$, or, for example, even as a quadratic function of the SHCs of the sound pressure and/or the particle velocity, or using a quadratic form of the SHCs of the sound pressure and/or of the SHCs of the particle velocity, e.g. using equation (44) or equation (45), which may, for example, be understood as quadratic forms of p(k), which is a vector of SHCs of the sound pressure, wherein, for example, a core matrix of the quadratic form, e.g. $D^{OH}G(k)D^a$, may be determined using the spherical-harmonic-order dependent weights, wherein the spherical-harmonic-order dependent weights may, for example, determine the matrix G(k).

A quadratic form may be computable with low computational costs. In addition, a subsequent analysis of the generalized intensity vector and/or of the component of the generalized intensity vector and/or of the generalized energy density of the sound field may, for example, be performed easily. As an example, extrema of the beforementioned values may be determined analytically, e.g. to further analyze characteristics of the sound field.

According to further embodiments of the invention, the quadratic function of the SHCs of the sound pressure, e.g. $P_{lm}$, and/or of the particle velocity, e.g. $U_{lm}$, or the quadratic form of the SHCs of the sound pressure and/or of the SHCs of the particle velocity, e.g. using equation (44) or equation (45), which may, for example, be understood as quadratic forms of p(k), which is a vector of SHCs of the sound pressure, is associated with the, or for example a, weighted spatial averaging of the sound intensity vector and/or energy density.

The weights may, for example, be incorporated, e.g. computationally inexpensive, in a weight matrix, e.g. G from eqn. (44) or respectively (45). Hence, calculation of the generalized intensity vector (or components thereof) and/or the generalized energy density (or for example the respective SHCs) as well as the spatial averaging may be performed in one computationally inexpensive step, using the quadratic form.

According to further embodiments of the invention, the signal characteristic determinator is configured to determine the generalized intensity vector and/or the generalized energy density of the sound field using the quadratic form of the sound pressure and/or of the particle velocity. In addition, the quadratic form comprises a core matrix, e.g. a matrix to which $p^H(k)$ is multiplied from the left side and to which p(k) is multiplied from the right side and the signal characteristic determinator is configured to determine the core matrix on the basis of a matrix, e.g. G(k), comprising the spherical-harmonic-order dependent weights, e.g. $G_1$, and a matrix, e.g. $D^a$, describing a relationship between SHCs of the pressure and SHCs of the particle velocity, and for example additionally a dimension adaptation/limiting matrix, e.g. $D^0$.

The inventors recognized that such computation may be implemented easily, and may be performed with low computational effort.

According to further embodiments of the invention, the signal characteristic determinator is configured to determine the generalized intensity vector, e.g.

$$I_g^a(k)$$

according to equation (44), and/or the generalized energy density, e.g. $E_g(k)$ according to equation (45), in a spherical harmonic domain, e.g. on the basis of a matrix vector product comprising matrices and vectors that comprise spherical harmonical coefficients and/or parameters that represent a relationship between spherical harmonical coefficients and/or matrices that represent a weighting of spherical harmonic coefficients, for example, in other words matrices and vectors that comprise an information about a signal representation in a spherical harmonic domain, e.g. a signal that is represented with a spherical harmonic expansion. Furthermore, the determination of the generalized intensity vector and/or of the generalized energy density on the basis of spherical-harmonic-order dependent weights comprises, or, for example, corresponds to or is, for example, associated with a, e.g. weighted, spatial averaging, e.g. direction independent spatial averaging and/or a radial averaging and/or a direction dependent spatial averaging, of an intensity vector of the sound field and/or of an energy density of the sound field.

Performing a part of the computations or, for example, even all computations of the determination of the information about the sound field in the spherical harmonic domain, may be computationally advantageous. In addition, performing a part of the calculation in the spherical harmonic domain may allow a common physical interpretation of the variables and intermediate results, e.g. compared to a calculation that may alternate e.g. frequently in between domains for performing the calculation steps.

According to further embodiments of the invention, the signal characteristic determinator is configured to implement a first weighted summation, e.g. according to eqn. (40), yielding, or for example representing, the generalized intensity vector, e.g. $I_g$, and/or a second weighted summation, e.g. according to eqn. (41), yielding, or, for example, representing, the generalized energy density, e.g. $E_g$, the first and/or second weighted summation comprising order dependent spatial weights, e.g. $G_1$, and spherical harmonic coefficients of the sound pressure and/or of the particle velocity, using a matrix vector multiplication which is based on a vector, e.g. p(k), comprising spherical harmonic coefficients of the pressure, a matrix, e.g. G(k), comprising the order dependent spatial weights and a matrix, e.g. $D^a$ or $D^\alpha$, for $\alpha \in \{x, y, z\}$, or $\alpha \in \{0, x, y, z\}$ and/or $\alpha \in \{x, y, z\}$, describing a relationship between SHCs of the pressure and SHCs of the particle velocity, and, for example, using a dimension adaptation/limiting matrix, e.g. $D^0$.

Weighted summations may be implemented with low computational costs and low implementation effort.

According to further embodiments of the invention, the signal characteristic determinator is configured to implement a first weighted summation, e.g. according to eqn. (40), yielding, or, for example, representing, the generalized intensity vector, e.g. $I_g$, and/or a second weighted summation, e.g. according to eqn. (41), yielding, or, for example, representing, the generalized energy density, e.g. $E_g$, the first and/or second weighted summation comprising order dependent spatial weights, e.g. $G_l$ and spherical harmonic coefficients of the sound pressure and/or of the particle velocity, using a quadratic form which is based on, e.g. multiples, a vector, e.g. p(k), comprising, or, for example, representing the SHCs of the pressure, in order to obtain the generalized intensity vector or one or more components, e.g.

$$I_g^a(k),$$

of the generalized intensity vector, e.g. according to equation (44), and/or in order to obtain the generalized energy density, e.g. according to equation (45). Moreover, a core matrix of the quadratic form, e.g. a matrix to which $p^H(k)$ is multiplied from the left side and to which p(k) is multiplied from the right side, e.g. $D^{OH}G(k)\ D^a$ or $D^{\alpha H}G(k)D^{\alpha}$, is determined using a matrix, e.g. G(k), comprising the spherical-harmonic-order dependent weights and using a matrix, e.g. $D^a$ or $D^{\alpha}$, for $\alpha\in\{0, x, y, z\}$ and $\alpha\in\{x, y, z\}$, describing a relationship between SHCs of the pressure and SHCs of the particle velocity, and, for example, using a dimension adaptation/limiting matrix, e.g. $D^0$.

The inventors recognized that such a calculation rule may provide the information about the sound field with good accuracy and limited computational effort.

According to further embodiments of the invention, the signal characteristic determinator is configured to determine the generalized intensity vector according to $$I_g^a(k) = -\frac{1}{\rho 0c}\left[D^0 p(k)\right]^H G(k) D^a p(k)$$

wherein $$I_g^x,\ I_g^y \text{ and } J_g^z$$

uenote the x-, y- and z-components of the generalized intensity vector $I_g$, $\rho_0$ denotes the density of a gas, e.g. the gas in which the sound field is, e.g. air, $(\bullet)^H$ denotes the conjugate transpose, $$k = \frac{2\pi f}{c}$$

is the wavenumber, f the frequency and c the speed of sound and wherein $D^0$ is a $L^2\times(L+1)^2$-dimensional matrix that is the identity matrix for the first $L^2$ columns and zero for the remaining columns and wherein G(k) is a $L^2\times L^2$ diagonal matrix with 2l+1 copies of the spherical harmonic order dependent weights on its diagonal for l=0, . . . , L−1 with L being the maximum order of the SHC of the sound pressure and with $D^a$ being $L^2\times(L+1)^2$-dimensional matrices describing a relationship between SHCs of the pressure and SHCs of the particle velocity according to $$u^a(k) = -\frac{1}{\rho_0 c} D^a p(k) \text{ for } a \in \{x, y, z\} \text{ with}$$

$$p(k) = [P_{00}(k), P_{1-1}(k), \ldots, P_{LL}(k)]^T$$

$$u^a(k) = \left[U_{00}^a(k), U_{1-1}^a(k), \ldots, U_{(L-1)(L-1)}^a(h)\right]^T$$

wherein $P_{lm}$ are the SHCs of the sound pressure and $$U_{lm}^a$$

are the SHCs of the particle velocity with order l and mode, e.g. degree, m and wherein x, y and z are cartesian coordinates.

It has been found that these rules form a particularly advantageous implementation.

According to further embodiments of the invention, the signal characteristic determinator is configured to determine the generalized intensity vector and/or a component of the generalized intensity vector and/or a generalized energy density of the sound field using a matrix multiplication, which is based on a matrix comprising the spherical harmonic order dependent weights, a matrix describing a relationship of the SHCs of the sound pressure and SHCs of the particle velocity and a matrix, e.g. p $p^H$ or $\varepsilon\{p\ p^H\}$, wherein, for example, $\varepsilon\{\bullet\}$ denotes the expectation value operator or an estimate thereof, which is based on an outer product based on a vector, e.g. p, comprising the SHCs of the sound pressure, e.g. an outer self-product p $p^H$.

Such a matrix multiplication and outer product of a vector may be performed with low computational costs and may be easy to implement.

According to further embodiments of the invention, the signal characteristic determinator is configured to determine the generalized intensity vector according to $$I_g^a(k) = -\frac{1}{\rho_0 c} tr\left\{G(k) D^a \Phi_p(k) D^{0H}\right\}$$

wherein $$I_g^x,\ I_g^y \text{ and } I_g^z$$

denote the x-, y- and z-components of the Intensity vector $I_g$, $\rho_0$ denotes the density of a gas, e.g. the gas in which the sound field is, e.g. air, $(\bullet)^H$ denotes the conjugate transpose, $$k = \frac{2\pi f}{c}$$

is the wavenumber, f the frequency and c the speed of sound and wherein $D^0$ is a $L^2\times(L+1)^2$-dimensional matrix that is the identity matrix for the first $L^2$ columns and zero for the remaining columns and wherein G(k) is a $L^2\times L^2$ diagonal matrix with 2l+1 copies of the spherical harmonic order dependent weights on its diagonal for l=0, . . . , L−1 with L being the maximum order of the SHC of the sound pressure and with $D^a$ being $L^2\times(L+1)^2$-dimensional matrices describing a relationship between SHCs of the pressure, which is considered and SHCs of the particle velocity according to $$u^a(k) = -\frac{1}{\rho_0 c} D^a p(k) \text{ for } a \in \{x, y, z\} \text{ with}$$

$$p(k) = [P_{00}(k), P_{1-1}(k), \ldots, P_{LL}(k)]^T$$

$$u^a(k) = \left[U_{00}^a(k), U_{1-1}^a(k), \ldots, U_{(L-1)(L-1)}^a(h)\right]^T$$

wherein $P_{lm}$ are the SHCs of the sound pressure and $U_{lm}$ are the SHCs of the particle velocity with order l and mode, e.g. degree, m. Furthermore, $\Phi_p$ is a matrix associated with the SHCs of the sound pressure, wherein, for example, $\Phi_p$ may be a matrix associated with the covariance matrix of the SHCs of the sound pressure, e.g. which is based on an outer product, e.g. an outer self-product p $p^H$, based on a vector e.g. p comprising the SHCs of the sound pressure, e.g, wherein $\Phi_p$ is a covariance matrix of the spherical harmonic coefficients of the sound pressure and/or an estimate of the covariance matrix of the spherical harmonic coefficients of the sound pressure, e.g, wherein $\Phi_p$ is an average of the outer self-product p $p^H$ over different time frames, e.g. over different time steps, e.g. over different measurements at different points in time.

According to further embodiments of the invention, the signal characteristic determinator is configured to determine the generalized energy density according to $$E_g(k) = \frac{1}{2\rho_0 c^2} \sum_{\alpha \in \{0,x,y,z\}} [D^\alpha p(k)]^H G(k) D^\alpha p(k)$$

wherein $\rho_0$ denotes the density of a gas, e.g. the gas in which the sound field is, e.g. air, tr{•} denotes the trace operator, $(\bullet)^H$ denotes the conjugate transpose, $$k = \frac{2\pi f}{c}$$

is the wavenumber, f the frequency and c the speed of sound and wherein $D^0$ is a $L^2\times(L+1)^2$-dimensional matrix that is the identity matrix for the first $L^2$ columns and zero for the remaining columns and wherein G(k) is a $L^2\times L^2$ matrix with 2l+1 copies of the spherical harmonic order dependent weights on its diagonal for l=0, . . . , L−1 with L being the maximum order of the SHC of the sound pressure which is considered and with $D^\alpha$ with $\alpha\in\{0, x, y, z\}$ being $L^2\times(L+1)^2$-dimensional matrices, wherein $D^0$ is the identity matrix for the first $L^2$ columns and zero for the remaining columns and wherein $D^x$, $D^y$, $D^z$ are matrices describing a relationship between SHCs of the pressure and SHCs of the particle velocity according to $$u^a(k) = -\frac{1}{\rho_0 c} D^a p(k) \text{ for } a \in \{x, y, z\} \text{ with}$$

$$p(k) = [P_{00}(k), P_{1-1}(k), \ldots, P_{LL}(k)]^T$$

$$u^a(k) = \left[U_{00}^a(k), U_{1-1}^a(k), \ldots, U_{(L-1)(L-1)}^a(k)\right]^T$$

wherein $P_{lm}$ are the SHCs of the sound pressure and $U_{lm}$ are the SHCs of the particle velocity with order l and mode, e.g. degree, m.

According to further embodiments of the invention, the signal characteristic determinator is configured to determine the generalized energy density according to $$E_g(k) = \frac{1}{2\rho_0 c^2} \sum_{\alpha \in \{0,x,y,z\}} tr\left\{G(k) D^\alpha \Phi_p(k) D^{\alpha H}\right\}$$

wherein $\rho_0$ denotes the density of a gas, e.g. the gas in which the sound field is, e.g. air, tr{•} denotes the trace operator, $(\bullet)^H$ denotes the conjugate transpose, $$k = \frac{2\pi f}{c}$$

is the wavenumber, f the frequency and c the speed of sound and wherein $D^0$ is a $L^2\times(L+1)^2$-dimensional matrix that is the identity matrix for the first $L^2$ columns and zero for the remaining columns and wherein G(k) is a $L^2\times L^2$ matrix with 2l+1 copies of the spherical harmonic order dependent weights on its diagonal for l=0, . . . , L−1 with L being the maximum order of the SHC of the sound pressure which is considered and with $D^\alpha$ with $\alpha\in\{0, x, y, z\}$ being $L^2\times(L+1)^2$-dimensional matrices, wherein $D^0$ is the identity matrix for the first $L^2$ columns and zero for the remaining columns and wherein $D^x$, $D^y$, $D^z$ are matrices describing a relationship between SHCs of the pressure and SHCs of the particle velocity according to $$u^a(k) = -\frac{1}{\rho_0 c} D^a p(k) \text{ for } a \in \{x, y, z\} \text{ with}$$

$$p(k) = [P_{00}(k), P_{1-1}(k), \ldots, P_{LL}(k)]^T$$

$$u^a(k) = \left[U_{00}^a(k), U_{1-1}^a(k), \ldots, U_{(L-1)(L-1)}^a(k)\right]^T$$

wherein $P_{lm}$ are the SHCs of the sound pressure and $U_{lm}$ are the SHCs of the particle velocity with order l and mode, e.g. degree, m. Furthermore, $\Phi_p$ is a matrix associated with the SHCs of the sound pressure, e.g. which is based on an outer product, e.g. an outer self-product p $p^H$, based on a vector e.g. p comprising the SHCs of the sound pressure, e.g, wherein $\Phi_p$ is a covariance matrix of the spherical harmonic coefficients of the sound pressure and/or an estimate of the covariance matrix of the spherical harmonic coefficients of the sound pressure, e.g, wherein $\Phi_p$ is an average of the outer self-product p $p^H$ over different time frames, e.g. over different time steps, e.g. over different measurements at different points in time.

It has been found that the above described rules for the determination of the generalized intensity vector and the generalized energy density are particularly advantageous and results in a particularly good information determination for the sound field.

According to further embodiments of the invention, $\Phi_p$ is calculated according to $$\Phi_p(k) = p(k)p^H(k)$$

or according to $$\Phi_p(k) = \varepsilon\left\{p(k)p^H(k)\right\}$$

wherein $\varepsilon\{\bullet\}$ denotes the expectation value operator or an estimate thereof.

Hence, as an example, with $\Phi_p(k)$=p $p^H$, a statistical distribution of p, e.g. comprising the SHCs of the sound pressure, may be neglected. Therefore, a for example simplified version of the inventive calculation may be implemented. On the other hand, $\Phi_p(k)=\varepsilon\{p(k)\ p^H(k)\}$, $\Phi_p$ may represent a covariance matrix of the SHCs of p(k). This may allow to take into account the statistical properties of p, therefore, allowing a calculation with increased accuracy.

According to further embodiments of the invention, the signal characteristic determinator is configured to determine at least one of an expected value of the generalized intensity vector, an estimate of the expected value of the generalized intensity vector, an expected value of the generalized energy density, an estimate of the expected value of the generalized energy density, based on an averaging of the generalized intensity vector, and/or of the generalized energy density respectively over different time frames, e.g. over different time steps, e.g. over measurements, for example of the SHCs of the sound pressure, of different points in time, e.g. an averaging of the generalized intensity vector and/or the generalized energy density according to eqn. (44) and/or (45) respectively.

Averaging over time may increase the accuracy and reliability of the calculated expected values and/or the estimate thereof. Hence, as an example, a difference between an estimate of an expected value and the expected value may be decreased. Furthermore, in order to provide estimates of expected values, the signal characteristic determinator may comprise an estimator, or may comprise means to run an estimation algorithm. This may allow to take imprecisions of measurements and/or models of the sound field, e.g. used to determine the information about the sound field, in consideration.

According to further embodiments of the invention, the signal characteristic determinator is configured to determine at least one of an expected value of the generalized intensity vector, an estimate of the expected value of the generalized intensity vector, an expected value of the generalized energy density, an estimate of the expected value of the generalized energy density, based on a covariance matrix of the spherical harmonic coefficients of the sound pressure and/or an estimate of the covariance matrix of the spherical harmonic coefficients of the sound pressure, e.g. the before mentioned $\Phi_p$.

The inventors recognized that considering statistical characteristics of the sound pressure, e.g. in the form of the covariance matrix may be advantageous and may result in a particularly good information determination for the sound field, e.g. allowing for a good accuracy of the information determined. In addition, such a result may be interpretable statistically.

According to further embodiments of the invention, the signal characteristic determinator is configured to determine the covariance matrix of the spherical harmonic coefficients and/or the estimate of the covariance matrix of the spherical harmonic coefficients of the sound pressure.

Hence, the signal characteristic determinator may not be reliant on external processing units, for providing the covariance matrix or an estimate thereof.

According to further embodiments of the invention, the signal characteristic determinator is configured to determine at least one of an expected value of the generalized intensity vector, an estimate of the expected value of the generalized intensity vector, an expected value of the generalized energy density, an estimate of the expected value of the generalized energy density, using an averaging of a covariance matrix $\Phi_p$, e.g. a matrix $\Phi_p$ as mentioned before, of the spherical harmonic coefficients of the sound pressure and/or an estimate of the covariance matrix $\Phi_p$ of the spherical harmonic coefficients of the sound pressure over different time frames, e.g. over different time steps, e.g. over different measurements at different points in time, wherein the signal characteristic determinator is configured to calculate $\Phi_p$ according to $$\Phi_p(k) = p(k)p^H(k)$$

with $$p(k) = [P_{00}(k), P_{1-1}(k), \ldots , P_{LL}(k)]^T$$

wherein $P_{lm}$ are the SHCs of the sound pressure with order l and mode, e.g. degree, m.

The averaging over different time steps may increase the accuracy and significance of the covariance matrix $\Phi_p$, hence improving accuracy and significance of the information determined about the sound field determined based thereof. Optionally, the averaging of the covariance matrix $\Phi_p$ may be a weighted averaging, e.g. an averaging using the spherical-harmonic-order dependent weights.

According to further embodiments of the invention, the signal characteristic determinator is configured to determine at least one of an expected value of the generalized intensity vector, an estimate of the expected value of the generalized intensity vector, an expected value of the generalized energy density, an estimate of the expected value of the generalized energy density, using a calculation of $\Phi_p$ according to $$\Phi_p(k) = \varepsilon\{p(k)p^H(k)\}$$

with $$p(k) = [P_{00}(k), P_{1-1}(k), \ldots , P_{LL}(k)]^T$$

wherein $P_{lm}$ are the SHCs of the sound pressure with order l and mode, e.g. degree, m.

It has been found that these rules are particularly efficient and simple to implement.

According to further embodiments of the invention, the signal characteristic determinator is configured to determine at least one of an expected value of the generalized intensity vector, an estimate of the expected value of the generalized intensity vector, an expected value of the generalized energy density, an estimate of the expected value of the generalized energy density, an expected value of the covariance matrix of the spherical harmonic coefficients of the pressure and an estimate of the expected value of the covariance matrix of the spherical harmonic coefficients of the pressure recursively.

Recursive determination allows for a computation with low incremental computation costs. In addition, a recursive determination may allow real time implementations. In addition, recursive determination rules may be efficient and easy to implement.

According to further embodiments of the invention, the signal characteristic determinator is configured to determine at least one of an expected value of the generalized intensity vector, an estimate of the expected value of the generalized intensity vector, an expected value of the generalized energy density, an estimate of the expected value of the generalized energy density, according to $$\mathcal{E}\{I_g^a(k)\} = -\frac{1}{\rho_0 c} tr\{G(k)D^a\Phi_p(k)D^{0H}\}$$

$$\mathcal{E}\{E_g(k)\} = \frac{1}{2\rho_0 c^2} \sum_{\alpha\in\{0,x,y,z\}} tr\{G(k)D^\alpha\Phi_p(k)D^{\alpha H}\}$$

wherein $$I_g^x,\ I_g^y \text{ and } I_g^z$$

denote the x-, y- and z-components of the Intensity vector $I_g$, $\rho_0$ denotes the density of a gas, e.g. the gas in which the sound field is, e.g. air, tr{•} denotes the trace operator, $(\bullet)^H$ denotes the conjugate transpose $$k = \frac{2\pi f}{c}$$

is the wavenumber, f the frequency and c the speed of sound and wherein $D^0$ is a $L^2\times(L+1)^2$-dimensional matrix that is the identity matrix for the first $L^2$ columns and zero for the remaining columns and wherein G(k) is a $L^2\times L^2$ matrix with 2l+1 copies of the spherical harmonic order dependent weights on its diagonal for l=0, . . . , L−1 with L being the maximum order of the SHC of the sound pressure which is considered and with $D^a$ being $L^2\times(L+1)^2$-dimensional matrices describing a relationship between SHCs of the pressure and SHCs of the particle velocity according to $$u^a(k) = -\frac{1}{\rho_0 c} D^a p(k) \text{ for } a \in \{x, y, z\} \text{ with}$$

$$p(k) = [P_{00}(k), P_{1-1}(k), \ldots , P_{LL}(k)]^T$$

$$u^a(k) = \left[U_{00}^a(k), U_{1-1}^a(k), \ldots , U_{(L-1)(L-1)}^a(k)\right]^T$$

wherein $P_{lm}$ are the SHCs of the sound pressure and $U_{lm}$ are the SHCs of the particle velocity with order l and mode, e.g. degree, m and wherein $\Phi_p$ is calculated according to $$\Phi_p(k) = \mathcal{E}\{p(k)p^H(k)\}$$

and wherein ε{•} denotes the expectation value operator or an operator providing an estimate of an expectation value.

It has been found that these rules provide a particularly advantageous implementation.

According to further embodiments of the invention, the signal characteristic determinator is configured to determine at least one of an expected value of the generalized intensity vector, an estimate of the expected value of the generalized intensity vector, an expected value of the generalized energy density, an estimate of the expected value of the generalized energy density, an expected value of the covariance matrix of the spherical harmonic coefficients of the pressure and an estimate of the expected value of the covariance matrix of the spherical harmonic coefficients of the pressure recursively, based on N observations, e.g. of the SHCs of the sound pressure, according to $$\widehat{\mathcal{E}\{\mathbf{A}\}}_n = \begin{cases} A_1 & \text{if } n = 1 \\ \beta_\beta \widehat{\mathcal{E}\{\mathbf{A}\}}_{n-1} + (1-\beta)A_n & \text{else,} \end{cases}$$

wherein ε{•} is the expectation value operator, A is the entity whose expectation value is to be determined, e.g. $I_g$, $E_g$, and/or $pp^H$, n is the index of the observation with n=1, . . . , N, wherein $\widehat{\mathcal{E}\{\mathbf{A}\}}_n$ is an estimation of an expectation value of A with respect to the observations up to index n, or wherein $\widehat{\mathcal{E}\{\mathbf{A}\}}_n$ is an expectation value of A with respect to the observations up to index n, and wherein β∈[0,1[ is a recursive smoothing parameter.

The inventors recognized that such a recursive estimation, may be implemented with limited computational costs and may allow for a precise determination and/or estimation of the respective value. Furthermore, the parameter β may allow to increase the accuracy of the estimation, e.g. using a parameter optimization for finding an application specific value for β. On the other hand, since only β may have to be tuned, such that the above formula introduces only limited complexity for an application specific implementation.

According to further embodiments of the invention, the signal characteristic determinator is configured to receive the SHCs of the sound pressure and/or of the particle velocity from a microphone and/or wherein the signal characteristic determinator comprises a microphone, e.g. a spherical microphone array, and wherein the microphone is configured to determine the SHCs of the sound pressure and/or of the particle velocity.

Microphone arrays can be used to determine the SHCs of the sound pressure and/or the particle velocity. With such a microphone, e.g. comprising or being a microphone array, being, for example, part of the signal characteristic determinator, the determinator may not be reliant on external measurement devices. As an example, in case the microphone is part of the signal characteristics determinator, no external measurement device comprising the microphone may be needed for providing the measurement information.

According to further embodiments of the invention, the signal characteristic determinator is configured to determine, e.g. as the characteristic of the sound field, a direction of arrival of a plane wave component of a sound field which comprises the plane wave component and a diffuse component, or to determine, e.g. as the characteristic of the sound field, a diffuseness of the sound field which comprises the plane wave component and the diffuse component. Furthermore, the signal characteristic determinator is configured to receive SHCs of the sound pressure of the sound field, and the estimator is configured to determine the direction of arrival and/or the diffuseness based on at least one of the generalized intensity vector, an expected value of the generalized intensity vector, an estimate of the expected value of the generalized intensity vector, the generalized energy density, an expected value of the generalized energy density, an estimate of the expected value of the generalized energy density.

The direction of arrival and the diffuseness may be important characteristics of the sound field that may allow for a good reconstruction of the sound field. The inventors recognized that the direction of arrival and the diffuseness may be determined efficiently using an information about the generalized intensity vector and/or using an information about the energy density.

According to further embodiments of the invention, the signal characteristic determinator is configured to determine an estimation of the direction of arrival and/or the direction of arrival based on the real part of the expected value of the generalized intensity vector and/or based on the real part of an estimate of the expected value of the generalized intensity vector, e.g. based on a quotient comprising the real part of the expected value of the generalized intensity vector and/or based the real part of an estimate of the expected value of the generalized intensity vector in the nominator and a normalizing factor, for example, a norm of the real part of the estimate of the expected value of the generalized intensity vector or a norm of the real part of the expected value of the generalized intensity vector in the denominator.

It has been found that using the real part is advantageous and result in a particularly good information determination for the sound field.

According to further embodiments of the invention, the signal characteristic determinator is configured to determine an estimation of the direction of arrival according to $$\widehat{n^a(\Omega_s)} = -\frac{\mathbb{R}\{\mathcal{E}\{I_g^a(k)\}\}}{\|\mathbb{R}\{\mathcal{E}\{I_g(k)\}\}\|_2}$$

wherein a∈{x, y, z} with $n^x(\Omega_s)$, $n^y(\Omega_s)$ and $n^z(\Omega_s)$ denoting the x-, y- and z-components of the unit-norm vector $n(\Omega_s)$ pointing to the direction-of-arrival (DOA) $\Omega_s$ of the plane-wave component; and wherein $\widehat{\cdot}$ denotes an estimate of a value, $\Re\{\bullet\}$ extracts the real part, $$k = \frac{2\pi f}{c}$$

is the wavenumber, f the frequency, c the speed of sound and wherein $$I_g^x,\ I_g^y \text{ and } I_g^z$$

denote the x-, y- and z-components of the Intensity vector $I_g$ and wherein $\varepsilon\{\bullet\}$ denotes the expectation value operator or an estimate thereof.

The determination based on the expectation value may increase the robustness of the determination, for example with respect to noise, e.g. noisy measurements.

According to further embodiments of the invention, the signal characteristic determinator is configured to determine an estimate of the direction of arrival according to $$\widehat{n^a(\Omega_s)} = -\frac{\mathbb{R}\{\mathcal{E}\{I_g^a(k)\}\}}{\|\mathbb{R}\{\mathcal{E}\{I_g(k)\}\}\|_2} = \frac{\mathbb{R}\{tr\{G(k)D^a\Phi_p(k)D^{0H}\}\}}{\sqrt{\sum_{b\in\{x,y,z\}}|\mathbb{R}\{tr\{G(k)D^b\Phi_p(k)D^{0H}\}\}|^2}}$$

wherein a∈{x, y, z} with $n^x(\Omega_s)$, $n^y(\Omega_s)$ and $n^z(\Omega_s)$ denoting the x-, y- and z-components of the unit-norm vector $n(\Omega_s)$ pointing to the direction-of-arrival (DOA) $\Omega_s$ of the plane-wave component; and wherein $\widehat{\cdot}$ denotes an estimate of a value, $\Re\{\bullet\}$ extracts the real part, $$k = \frac{2\pi f}{c}$$

is the wavenumber, f the frequency, c the speed of sound and wherein $$I_g^x,\ I_g^y \text{ and } I_g^z$$

denote the x-, y-, and z-components of the Intensity vector $I_g$, $\rho_0$ is the density of a gas, e.g. the gas in which the sound field is, e.g. air, tr{•} denotes the trace operator, $(\bullet)^H$ denotes the conjugate transpose, $\varepsilon\{\bullet\}$ denotes the expectation value operator, $D^0$ is a $L^2\times(L+1)^2$-dimensional matrix that is the identity matrix for the first $L^2$ columns and zero for the remaining columns; and wherein G(k) is a $L^2\times L^2$ matrix with 2l+1 copies of the spherical harmonic order dependent weights on its diagonal for l=0, . . . , L−1 with L being the maximum order of the SHC of the sound pressure which is considered and with $D^a$ being $L^2\times(L+1)^2$-dimensional matrices describing a relationship between SHCs of the pressure and SHCs of the particle velocity according to $$u^a(k) = -\frac{1}{\rho_0 c}D^a p(k) \text{ for } a \in \{x, y, z\} \text{ with}$$

$$p(k) = [P_{00}(k), P_{1-1}(k), \dots, P_{LL}(k)]^T$$

$$u^a(k) = \left[U_{00}^a(k), U_{1-1}^a(k), \dots, U_{(L-1)(L-1)}^a(k)\right]^T$$

wherein $P_{lm}$ are the SHCs of the sound pressure and $U_{lm}$ are the SHCs of the particle velocity with order l and mode, e.g. degree, m and wherein $\Phi_p$ is the covariance matrix of the SHCs of the sound pressure or an estimate of the covariance matrix of the SHCs of the sound pressure or an approximation of the covariance matrix of the SHCs of the sound pressure.

It has been found that these rules are particularly advantageous and result in a particularly good information determination for the sound field.

According to further embodiments of the invention, $\Phi_p$ is calculated according to $$\Phi_p(k) = \varepsilon\{p(k)p^H(k)\}$$

and/or according to $\Phi_p=v_1v_1^H$, wherein $v_1$ denotes the dominant eigenvector of $\Phi_p$.

It was recognized that a robustness of the determination, for example with respect to noise, may be increased by using the dominant eigenvectors for the calculation of $\Phi_p$.

According to further embodiments of the invention, the signal characteristic determinator is configured to determine an estimate of the diffuseness or the diffuseness based on a quotient comprising a norm of an expected value of the generalized intensity vector or a norm of an estimate of the expected value of the generalized intensity vector in the numerator and an expected value of the generalized energy density or an estimate of the expected value of the generalized energy density in the denominator.

Hence, intermediate results, e.g. of the generalized intensity vector and/or of the energy density, may be used to determine an information about the diffuseness. It has been found out that such a quotient of an information about the generalized intensity vector allows for an accurate determination of an information about the diffuseness.

According to further embodiments of the invention, the signal characteristic determinator is configured to determine an estimate of the diffuseness according to $$\hat{\psi}(k) = 1 - \frac{\|\varepsilon\{I_g(k)\}\|_2}{c\varepsilon\{E_g(k)\}}$$

wherein c denotes the speed of sound, and wherein $\widehat{(\cdot)}$ denotes the estimate of a value, $$k = \frac{2\pi f}{c}$$

is the wavenumber, f the frequency and c the speed of sound and wherein $I_g$ is the generalized intensity vector, $E_g$ denotes the generalized energy density and ε{•} denotes expectation value operator or an estimate thereof.

As explained with respect to the direction of arrival, the determination based on the expectation value may increase the robustness of the determination, for example with respect to noise, e.g. noisy measurements.

According to further embodiments of the invention, the signal characteristic determinator is configured to determine an estimate of the diffuseness according to $$\hat{\psi}(k) = 1 - \frac{\|\varepsilon\{I_g(k)\}\|_2}{c\varepsilon\{E_g(k)\}} = 1 - \frac{\sqrt{\sum_{a\in\{x,y,z\}} \left|tr\{G(k)D^a\Phi_p(k)D^{0H}\}\right|^2}}{\frac{1}{2}\sum_{a\in\{0,x,y,z\}} tr\{G(k)D^a\Phi_p(k)D^{aH}\}}$$

wherein c denotes the speed of sound, and wherein $\widehat{(\cdot)}$ denotes the estimate of a value, $\Re\{\cdot\}$ extracts the real part, $$k = \frac{2\pi f}{c}$$

iS the wavenumber, f the frequency and c the speed of sound and wherein $$I_g^x,\ I_g^y \text{ and } I_g^z$$

denote the x-, y- and z-components of the Intensity vector $I_g$, $E_g$ denotes the generalized energy density, $\rho_0$ the density of a gas, e.g. the gas in which the sound field is, e.g. air, tr{•} denotes the trace operator, $(\cdot)^H$ denotes the conjugate transpose, ε{•} denotes expectation value operator, $D^0$ is a $L^2\times(L+1)^2$-dimensional matrix that is the identity matrix for the first $L^2$ columns and zero for the remaining columns; and wherein G(k) is a $L^2\times L^2$ matrix with 2l+1 copies of the spherical-harmonic-order dependent weights on its diagonal for l=0, . . . , L−1 with L being the maximum order of the SHC of the sound pressure and with $D^a$ being $L^2\times(L+1)^2$-dimensional matrices describing a relationship between SHCs of the pressure and SHCs of the particle velocity according to $$u^a(k) = -\frac{1}{\rho_0 c} D^a p(k) \text{ for } a \in \{x, y, z\} \text{ with}$$

$$p(k) = [P_{00}(k), P_{1-1}(k), \ldots, P_{LL}(k)]^T$$

$$u^a(k) = \left[U_{00}^a(k), U_{1-1}^a(k), \ldots, U_{(L-1)(L-1)}^a(k)\right]^T$$

wherein $P_{lm}$ are the SHCs of the sound pressure and $U_{lm}$ are the SHCs of the particle velocity with order l and mode, e.g. degree, m and wherein $\Phi_p$ is the covariance matrix of the SHCs of the pressure according to $$\Phi_p(k) = \varepsilon\{p(k)p^H(k)\}.$$

It has been found that these rules are particularly advantageous and result in a particularly good information about the diffuseness of the sound field.

According to further embodiments of the invention, the signal characteristic determinator comprises a weight calculator and the weight calculator is configured to determine the spherical-harmonic-order dependent weights on the basis of the sound field, such that for example a spatial averaging characteristic which is defined by the spherical harmonic order dependent weights is adapted to the sound field.

In other words, the weights may be chosen adaptively, e.g. according to the respective sound field to analyzed and/or for example with respect to a certain kind of information that is to be extracted from the sound field. This provides an additional degree of freedom, to increase the accuracy of the information determination.

According to further embodiments of the invention, the signal characteristic determinator comprises a weight calculator and the weight calculator is configured to determine the spherical-harmonic-order dependent weights using a variance of the signal characteristic to be determined as an optimization quantity, e.g. to minimize or at least reduce the variance of the signal characteristic.

This may increase the robustness of the determination, e.g. with respect to noise, for example in the form of noisy measurements. The signal characteristic may, for example be the generalized intensity vector. However, as another example, a DOA may be determined based on the generalized intensity vector, hence taking the variance of the generalized intensity vector into account for the determination of the weights. In other words, a variance of an intermediate result, for a signal characteristic to be determined, may be used as well.

According to further embodiments of the invention, the signal characteristic determinator comprises a weight calculator and the weight calculator is configured to determine the spherical-harmonic-order dependent weights on the basis of higher-order, e.g. order larger than 1, SHCs of the sound pressure, e.g. p(k), which form the basis for $\Phi_p(k)$, and/or of the particle velocity.

Usage of higher order SHCs may allow the incorporation of nuanced information about the sound field, for example in order to determine or evaluate weights that may lead to an accurate determination of a desired information about the sound field.

According to further embodiments of the invention, the weight calculator is configured to minimize the variance of the generalized intensity vector, e.g. the variance of a real part of the generalized intensity vector, of the sound field in order to determine, or, for example, when determining, the spherical-harmonic-order dependent weights.

It has been found that a minimization of the generalized intensity vector allows for an efficient determination of the weights. These weights may further allow for an accurate determination of the information about the sound field.

According to further embodiments of the invention, the weight calculator is configured to minimize a cost function, which is dependent on the coefficients, e.g. the cost function according to eqn. (59) and or eqn. (62), the cost function comprising the variance of the generalized intensity vector of the sound field, in order to determine, or, for example, when determining, the spherical-harmonic-order dependent weights.

The inventors recognized, that based on such a cost function spherical-harmonic-order dependent weights may be determined with limited computational effort, whilst allowing an accurate determination of the information about the sound field. In addition, an optimization algorithm may be chosen in accord with computation time constraints and/or the availability of hardware. Stochastic and/or deterministic optimization algorithms may be used.

According to further embodiments of the invention, the weight calculator is configured to avoid a trivial solution for the weights, e.g. g=0, by considering constraints in the cost function.

The inventors recognized that by introducing further constraints in the optimization, the weight determination may be improved.

According to further embodiments of the invention, the cost function J is defined according to $$\mathcal{J}(g,\lambda) = \varepsilon\left\{\|\mathcal{R}\{I_g\} - \varepsilon\{\mathcal{R}\{I_g\}\}\|_2^2\right\} + \lambda\left(\sum_{l=0}^{L-1} G_l(2l+1) - 1\right),$$

wherein $I_g$ is the generalized intensity vector; and wherein $g=[G_0, \ldots, G_{L-1}]^T$, wherein $G_l$ are the spherical harmonic order dependent weights for l=0, . . . , L−1 with L being the maximum order of the SHC of the sound pressure and/or the particle velocity which are considered, and wherein λ is a Lagrange-multiplier; and wherein ε{•} is the expectation value operator, and wherein $\Re\{\bullet\}$ extracts the real part.

It has been found that such a cost function allows for an efficient computation of the spherical harmonic order dependent weights. In addition, this form of cost function may be optimized with standard optimization algorithms that may even provide global minima. Therefore, not only locally optimal weights, but also globally optimal weights may be determined.

According to further embodiments of the invention, the weight calculator is configured to minimize the cost function using the Karush-Kuhn-Tucker (KKT) conditions, in order to determine the spherical-harmonic-order dependent weights.

With a convex cost function and affine equality constraints, the KKT conditions may provide a sufficient criterium for optimality. Therefore, usage of the KKT conditions may allow for a good choice of weights (e.g. providing a global minimum of the cost function).

According to further embodiments of the invention, the weight calculator is configured to determine the spherical-harmonic-order dependent weights according to $$g_{opt} = \varepsilon\{\Sigma\}^{-1} f / \left(f^T \varepsilon\{\Sigma\}^{-1} f\right)$$

wherein $g_{opt}=[G_0, \ldots, G_{L-1}]^T$ is a vector comprising the optimal spherical-harmonic-order dependent weights $G_l$ for l=0, . . . , L−1 with L being the maximum order of the SHC of the sound pressure and/or the particle velocity which are considered and wherein $$[\Sigma]_{ll'} = (\mathcal{R}\{I_l\} - \varepsilon\{\mathcal{R}\{I_l\}\})^T(\mathcal{R}\{I_{l'}\} - \varepsilon\{\mathcal{R}\{I_{l'}\}\})$$

$$[f]_l = 2l+1 \text{ for } l, l' = 0, \ldots, L-1.$$

with $$I_l = -\frac{1}{\rho_0 c}\sum_{m=-l}^{l} P_{lm}^* \sum_{l'=l\pm1}\sum_{m'=m-1}^{m+1} d_{lm,l'm'} P_{l'm'}$$

with $$I_g = \sum_{l=0}^{L-1} G_l I_l$$

wherein $I_g$ is the generalized intensity vector and wherein $\rho_0$ denotes the density of a gas, e.g. the gas in which the sound field is, e.g. air, c denotes the speed of sound and wherein $P_{lm}$ are the SHCs of the sound pressure of order l and mode, e.g. degree, m; and wherein $$d_{lm,l'm'} = \left[D_{lm,l'm'}^x, D_{lm,l'm'}^y, D_{lm,l'm'}^z\right]^T \text{ with}$$

$$D_{lm,l'm'}^x = \frac{1}{2}\left[\begin{array}{l} -\sqrt{\frac{(l+m-1)(l+m)}{(2l-1)(2l+1)}}\,\delta_{l'(l-1)}\delta_{m'(m-1)} + \\ \sqrt{\frac{(l-m-1)(l-m)}{(2l-1)(2l+1)}}\,\delta_{l'(l-1)}\delta_{m'(m+1)} + \\ \sqrt{\frac{(l-m+1)(l-m+2)}{(2l+1)(2l+3)}}\,\delta_{l'(l+1)}\delta_{m'(m-1)} - \\ \sqrt{\frac{(l+m+1)(l+m+2)}{(2l+1)(2l+3)}}\,\delta_{l'(l+1)}\delta_{m'(m+1)} \end{array}\right]$$

$$D_{lm,l'm'}^y = \frac{1}{2i}\left[\begin{array}{l} -\sqrt{\frac{(l+m-1)(l+m)}{(2l-1)(2l+1)}}\,\delta_{l'(l-1)}\delta_{m'(m-1)} - \\ \sqrt{\frac{(l-m-1)(l-m)}{(2l-1)(2l+1)}}\,\delta_{l'(l-1)}\delta_{m'(m+1)} + \\ \sqrt{\frac{(l-m+1)(l-m+2)}{(2l+1)(2l+3)}}\,\delta_{l'(l+1)}\delta_{m'(m-1)} + \\ \sqrt{\frac{(l+m+1)(l+m+2)}{(2l+1)(2l+3)}}\,\delta_{l'(l+1)}\delta_{m'(m+1)} \end{array}\right]$$

$$D_{lm,l'm'}^z = \sqrt{\frac{(l-m)(l+m)}{(2l-1)(2l+1)}}\,\delta_{l'(l-1)}\delta_{m'm} + \sqrt{\frac{(l+1-m)(l+1+m)}{(2l+1)(2l+3)}}\,\delta_{l'(l+1)}\delta_{m'm}.$$

It has been found that these rules are particularly advantageous and result in a a good trade-off between computational complexity and accuracy. In addition, these rules may be easy to implement.

According to further embodiments of the invention, the weight calculator is configured to determine the spherical-harmonic-order dependent weights with respect to, or, for example, taking into consideration, a lower bound for said weights, e.g. $G_{min}$.

The inventors recognized that introducing a lower bound in the optimization may provide good results for the weights with low computational effort. As an example, non-negativity of the weights may be forced with the lower bound. This may, for example, increase the accuracy of a DOA estimation and/or reduce computational costs thereof.

According to further embodiments of the invention, the weight calculator is configured to incorporate the lower bound for the weights via constraints in a cost function, in order to determine the spherical-harmonic-order dependent weights with respect to the lower bound.

This may allow to use standard optimization tools, e.g. toolboxes without any adaptation. As mentioned before the KKT conditions may be used in order to find a global minimum of the cost function.

According to further embodiments of the invention, the weight calculator is configured to determine the spherical-harmonic-order dependent weights with respect to the lower bound according to $$G_l = \max\{[g_{opt}]_l, G_{min}\}$$

wherein $[g_{opt}]$; is the l-th element of vector $g_{opt}=[G_0, \ldots, G_{L-1}]^T$ wherein $g_{opt}$ is optimal with respect to a cost function, wherein $G_l$ are the spherical harmonic order dependent weights for $l=0, \ldots, L-1$ with L being the maximum order of the SHC of the sound pressure and/or the particle velocity, which are considered and wherein $G_{min}$ is the lower bound for the weights.

This may reduce the computational costs, since constraints may further increase the complexity of an optimization. As an example, lower-bounding the weights (e.g. according to eqn. (61)) directly, may yield almost identical DOA estimation performance as the KKT-based solution and may have a lower computational complexity.

Further embodiments according to the invention comprise an audio encoder, e.g. a general audio encoder or a speech encoder, or a combined general/audio/speech encoder, for providing an encoded audio information, e.g. an encoded representation of an Ambisonic signal, on the basis of an input audio information, e.g. an Ambisonic signal. The audio encoder comprises a signal characteristic determinator according to any of the embodiments of the invention, e.g. according to any of the embodiments explained before, wherein the signal characteristic determinator is configured to determine, as the information about a characteristic of a sound field, one or more parameters that describe spatial properties of an Ambisonic signal, e.g. of the input audio information, wherein the audio encoder may, for example, encode the one or more parameters that describe the spatial properties of the Ambisonic signal, to obtain one or more encoded parameters, and include the one or more encoded parameters into the encoded audio information, and/or wherein the audio encoder may, for example, use the one or more parameters that describe the spatial properties of the Ambisonic signal for a processing of the audio information, e.g. for a processing of the input audio information.

The inventors recognized that the inventive signal characteristic determinator, e.g. according to any of the beforementioned embodiments, may allow to improve an audio encoding. Parameters describing spatial properties of the input audio information and/or the Ambisonic signal may be determined with increased accuracy and reliability.

According to further embodiments of the invention, the signal characteristic determinator is configured to determine a generalized intensity vector, e.g. GIV, e.g. $I_g$, and/or a generalized energy density, e.g. $E_g$, in order to determine, as the information about a characteristic of a sound field, the one or more parameters that describe spatial properties of the Ambisonic signal, e.g. of the input audio information.

The inventors recognized that usage of the generalized intensity vector and/or of the generalized energy density may allow for an efficient audio encoding.

Further embodiments according to the invention comprise an audio encoder, e.g. a general audio encoder or a speech encoder, or a combined general/audio/speech encoder, for providing an encoded audio information, e.g. an encoded representation of an Ambisonic signal, on the basis of an input audio information, e.g. an Ambisonic signal, wherein the audio encoder is configured to determine one or more parameters that describe spatial properties of an Ambisonic signal, e.g. of the input audio information, using, or, for example, on the basis of, a generalized intensity vector, e.g. $I_g$; e.g. an intensity vector which represents a weighted spatial average of a sound intensity, wherein, for example, the spherical-harmonic-order dependent weights define a weighting characteristic; e.g. an intensity vector which approximates a weighted spatial average $I_w$. Optionally, the audio encoder may, for example, obtain the generalized intensity vector from an external intensity vector determinator or using an (internal) signal characteristic determinator. As another optional feature, the audio encoder may, for example, encode the one or more parameters that describe the spatial properties of the Ambisonic signal, to obtain one or more encoded parameters, and include the one or more encoded parameters into the encoded audio information, and/or the audio encoder may, for example, use the one or more parameters that describe the spatial properties of the Ambisonic signal for a processing of the audio information, e.g. for a processing of the input audio information.

The generalized intensity vector may, for example, be determined according to any of the beforementioned embodiments comprising a signal characteristic determinator. Hence, all the features, functionalities and details explained before may be incorporated in an inventive audio encoder. Hence an improved audio encoding may be provided.

Further embodiments according to the invention comprise a method for determining a signal characteristic, wherein the method comprises determining an information about a characteristic of a sound field, e.g. a direction-of-arrival information or a diffuseness information, on the basis of higher-order, e.g. order larger than 1, spherical harmonic coefficients, also designated as SHCs, of a sound pressure, e.g. p(k), which form the basis for $\Phi_p(k)$, and/or of a particle velocity and on the basis of spherical-harmonic-order dependent weights, e.g. weights g, which determined matrix G.

It should be noted that the methods are based on the same considerations as the corresponding apparatuses. Moreover, the methods can be supplemented by any of the features, functionalities and details which are described herein with respect to the apparatuses, both individually and taken in combination.

Further embodiments according to the invention comprise a computer program for performing any of the methods according to the invention, when the computer program runs on a computer.

BRIEF DESCRIPTION OF THE DRAWINGS

Embodiments of the present invention will be detailed subsequently referring to the appended drawings, in which:

FIG. 12 shows examples for assessing the intensity vector and energy density according to embodiments of the invention; and.

DETAILED DESCRIPTION OF THE INVENTION

Figure 1:
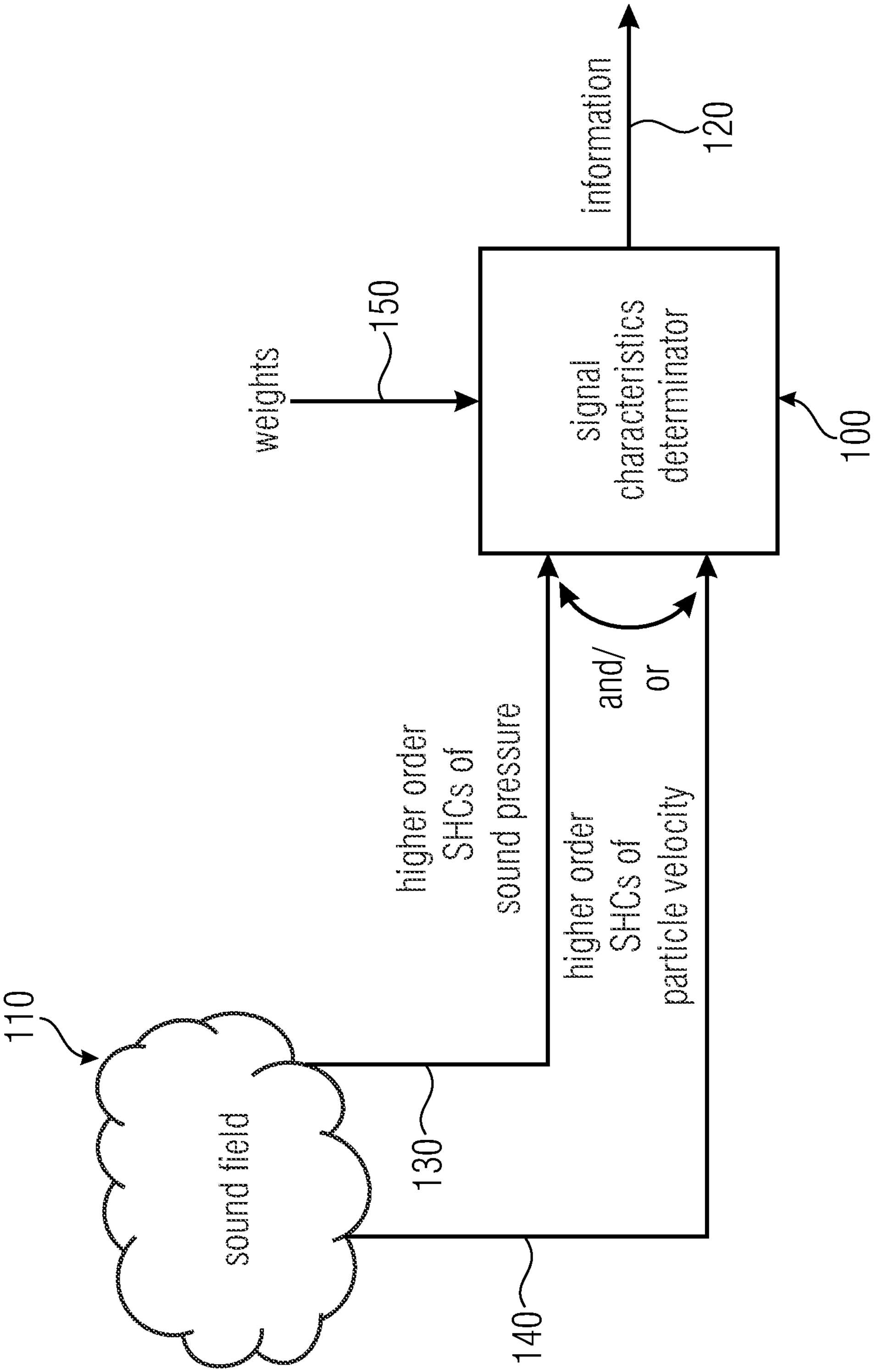
FIG. 1 shows a schematic view of a signal characteristic determinator according to embodiments of the present invention.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

FIG. 1 shows a schematic view of a signal characteristic determinator according to embodiments of the present invention. FIG. 1 shows the signal characteristic determinator 100 and a sound field 110. The signal characteristic determinator 100 is configured to determine an information 120 about a characteristic of the sound field 110 using or on the basis of higher order spherical harmonic coefficients (SHCs) 130 of a sound pressure of the sound field 110 and/or using spherical harmonic coefficients (SHCs) 140 of a particle velocity of the sound field 110 and using or on the basis of spherical-harmonic-order dependent weights 150.

The higher order SHCs 130/140 of the sound pressure and/or the particle velocity may be provided to the signal characteristics determinator 100, or may be measured by the signal characteristics determinator itself. Accordingly weights 150 may be provided to the signal characteristics determinator 100, or may be determined by the determinator 100 itself. Furthermore, the determinator 100 may as well be located inside the sound field 110.

A weighting operation using the weights 150 may allow for an incorporation of the higher order SHCs 130/140 of sound pressure and/or particle velocity in an algorithm for determining the information 120 about the sound field 110, hence allowing to calculate a precise information 120.

FIGS. 2 *a*)-*c*) show a schematic view of a signal characteristic determinator with additional, optional features, according to embodiments of the present invention.

FIG. 2 *a*) shows a first part 200*a* of the signal characteristic determinator. In addition, FIG. 2 *a*) shows a sound field 210. Optionally, the signal characteristic determinator may comprise a microphone 220. However, it is to be noted that microphone 220 may as well, be an external device which is not a part of the signal characteristic determinator. Irrespective of whether the signal characteristic determinator comprises the microphone 220 or not, the microphone 220 may comprise the following features and functionalities.

Microphone 220 may be arranged within the sound field in order to measure a characteristic of the sound field 210. Therefore, the microphone 220 may, for example, comprise a spherical microphone array. Characteristics of the sound field 210 may, for example, be a sound pressure and/or a particle velocity. Sound pressure and particle velocity may be functions of space and time. In particular, the microphone 220 may be configured to determine or to provide SHCs of characteristics of the sound field 210, e.g. SHCs in form of a vector p of the sound pressure and/or SHCs in the form of a vector $u^a$ of the particle velocity, with $a \in \{x, y, z\}$, with x, y, z being cartesian coordinates. Therefore, p and $u^a$ may be vectors according to $$p(k) = [P_{00}(k), P_{1-1}(k), \ldots , P_{LL}(k)]^T$$

$$u^a(k) = \left[U^a_{00}(k), U^a_{1-1}(k), \ldots , U^a_{(L-1)(L-1)}(k)\right]^T$$

with $P_{lm}(k)$ being the spherical harmonic coefficients (SHCs) of the sound pressure and with $U_{lm}(k)$ being the spherical harmonic coefficients (SHCs) of the particle velocity, e.g. as explained before with order l and mode m.

In case the microphone 220 is not part of the signal characteristic determinator, the signal characteristic determinator may be configured to receive the respective SHCs of the sound pressure and/or of the particle velocity.

As another optional feature, the signal characteristic determinator may be configured to determine the SHCs $u^a$ of the particle velocity. Therefore, the signal characteristic determinator may comprise a $u^a$ determination unit 230. $u^a$ may, for example, be determined according to $$u^a(k) = -\frac{1}{\rho_0 c} D^a p(k) \text{ for } a \in \{x, y, z\}.$$

with $$D^x_{lm,l'm'} = \frac{1}{2}\begin{bmatrix} -\sqrt{\frac{(l+m-1)(l+m)}{(2l-1)(2l+1)}}\,\delta_{l'(l-1)}\delta_{m'(m-1)} + \\ \sqrt{\frac{(l-m-1)(l-m)}{(2l-1)(2l+1)}}\,\delta_{l'(l-1)}\delta_{m'(m+1)} + \\ \sqrt{\frac{(l-m+1)(l-m+2)}{(2l+1)(2l+3)}}\,\delta_{l'(l+1)}\delta_{m'(m-1)} - \\ \sqrt{\frac{(l+m+1)(l+m+2)}{(2l+1)(2l+3)}}\,\delta_{l'(l+1)}\delta_{m'(m+1)} \end{bmatrix}$$

-continued $$D^{y}_{lm,l'm'} = \frac{1}{2i}\begin{bmatrix} -\sqrt{\frac{(l+m-1)(l+m)}{(2l-1)(2l+1)}}\delta_{l'(l-1)}\delta_{m'(m-1)} - \\ \sqrt{\frac{(l-m-1)(l-m)}{(2l-1)(2l+1)}}\delta_{l'(l-1)}\delta_{m'(m+1)} + \\ \sqrt{\frac{(l-m+1)(l-m+2)}{(2l+1)(2l+3)}}\delta_{l'(l+1)}\delta_{m'(m-1)} + \\ \sqrt{\frac{(l+m+1)(l+m+2)}{(2l+1)(2l+3)}}\delta_{l'(l+1)}\delta_{m'(m+1)} \end{bmatrix}$$

$$D^{z}_{lm,l'm'} = \sqrt{\frac{(1-m)(l+m)}{(2l-1)(2l+1)}}\delta_{l'(l-1)}\delta_{m'm} + \sqrt{\frac{(l+1-m)(l+1+m)}{(2l+1)(2l+3)}}\delta_{l'(l+1)}\delta_{m'm}.$$

with $\rho_0$ denoting the density of the gas comprising the sound field 210 and c being the speed of sound in the gas and L being the, e.g. maximum, order of the SHCs. As an example, m (e.g. mode or degree) and l (e.g. order) may comprise values from l=0, . . . , L and m=−l, . . . l and l'=0, . . . , L and m'=−l', . . . l'. The $$D^{a}_{lm,l'm'}$$

may, for example, only be non-zero for l'=l±1 and m'=m−1, m or m+1. As another example, if the SHCs of the sound pressure are given up to order L, the SHCs of the particle velocity may be derived up to order L−1.

Hence, $u^a$ may be measured and/or may be determined using a measurement of p. Determining $u^a$ based on a measurement of p may reduce the hardware effort for measuring.

Furthermore, as another optional feature, the signal characteristic determinator may comprise a $\Phi_p$ determination unit 240. $\Phi_p$ is a matrix associated with the SHCs of the sound pressure p. The $\Phi_p$ determination unit 240 may, for example, be configured to determine $\Phi_p$ according to $\Phi_p(k)=p(k)\ p^H(k)$ or according to $\Phi_p(k)=\varepsilon\{p(k)p^H(k)\}$, wherein $\varepsilon\{\bullet\}$ denotes the expectation value operator or an estimate thereof. In the case of $\Phi_p(k)=\varepsilon\{p(k)\ p^H(k)\}$, $\Phi_p$ may be a covariance matrix of the spherical harmonic coefficients of the sound pressure, e.g. comprising the spherical harmonic coefficients of higher order.

Optionally, determination unit 240 may comprise an estimator, or may for example be a $\Phi_p$ determination unit 240, providing an estimate of $\Phi_p$ (e.g. an estimate according to the respective definition of $\Phi_p$).

As another optional feature, determination unit 240 may be configured to perform an averaging of $\Phi_p$, e.g. providing an averaged covariance matrix $\Phi_p$ of the spherical harmonic coefficients of the sound pressure over different time frames.

Optionally, determination unit 240 may be configured to determine $\Phi_p$ according to $\Phi_p=v_1v_1H$, wherein $v_1$ denotes the dominant eigenvector of $\Phi_p$. $\Phi_p$ shown in FIG. 2 *a*) may represent any of the beforementioned values, and may hence be determined or estimated according to any of the beforementioned rules. The respective rule for the determination of $\Phi_p$ may be chosen according to the respective application.

Any of the beforementioned entities, e.g. p, $\Phi_p(k)$ and/or $u^a$ (and/or information comprising any of these entities) may be used alone or in combination with any of the other entities in order to determine the information about the sound field 210. This is represented by the measurement information 202, which may comprise at least one of the beforementioned entities.

FIG. 2 *b*) shows a second part 200*b* of the signal characteristic determinator. As optional features, the signal characteristic determinator comprises a generalized intensity vector (GIV) determination unit 250 and a generalized energy density (GED) determination unit 260. Both units 250, 260 are provided with the measurement information 202 and hence any or all of the information collected or determined or estimated or measured from the sound field 210, as explained in the context of and as shown in FIG. 2 *a*).

As another optional feature, one or both of the determination units 250, 260 may be configured to perform a weighted spatial averaging using spherical-harmonic-order dependent weights. The weights are represented by a weight matrix G, which is provided to both determination units. G is a $L^2 \times L^2$ diagonal matrix with 2l+1 copies of the spherical harmonic order dependent weights on its diagonal for l=0, . . . , L−1 with L being the maximum order of the SHC of the sound pressure. Optionally, the averaging may be a direction independent spatial averaging. However, embodiments according to the invention are not limited to direction independent spatial averaging. Hence, optionally, the determination units 250, 260 may be configured to perform a direction dependent spatial averaging. In this case, the spherical-harmonic-order dependent weights may be mode dependent, and/or spatial mode dependent.

The spatial averaging may allow to adapt spatial dependencies of results or of intermediate results. Furthermore, the averaging may allow to determine the information about the sound field with increased accuracy using the higher order SHCs.

The GIV determination unit 250 may be configured to determine a generalized intensity vector $I_g$ and/or a component $$I^{a}_{g},$$

with a∈{x, y, z}, wherein x, y and z may be cartesian coordinates of the sound field, of the generalized intensity vector of the sound field 210, for example, using a quadratic function of the SHCs of the sound pressure and/or of the particle velocity or using a quadratic form of the SHCs of the sound pressure and/or of the SHCs of the particle velocity.

Accordingly, the GED determination unit 260 may be configured to determine a generalized energy density $E_g(k)$ of the sound field using a quadratic function of the SHCs of the sound pressure and/or of the particle velocity or using a quadratic form of the SHCs of the sound pressure and/or of the SHCs of the particle velocity.

The respective quadratic function and/or the respective quadratic form, used by the respective determination unit 250, 260, may be associated with a weighted spatial averaging of the sound intensity vector and/or energy density. In other words, the weighted averaging of the sound intensity vector and/or energy density may provide or may result in the generalized intensity vector and/or the generalized energy density. In other words, and as an example, the respective determination unit may determine an intensity vector and/or an energy density of the sound field, and may average the respective entity, providing its generalized counterpart.

As another optional feature, the respective quadratic form may comprise a core matrix, e.g. $D^{OH}GD^{a}$ for the quadratic form of the generalized intensity vector and/or $D^{\alpha H}GD^{\alpha}$ for the quadratic form of the generalized energy density. As an example, the signal characteristic of the core matrix may be determined based on the weight matrix G comprising the spherical-harmonic-order dependent weights, e.g. $G_l$, and the matrix $D^a$ describing a relationship between SHCs of the pressure and SHCs of the particle velocity and for example additionally based on a dimension adaptation/limiting matrix $D^0$.

The inventors recognized that the usage of quadratic functions and/or quadratic forms yields computational advantages, and may keep the computational complexity low. Especially, an analysis of such a function or form may be performed efficiently, for example even using sufficient criteria for finding extrema. Hence a core comprising the weight matrix G may be further analyzed, or, for example counterchecked with respect to e.g. optimized weights.

Optionally, the GIV determination unit 250 and/or the GED determination unit 260 may be configured to determine the respective core matrix, for the respective quadratic form. Hence, optionally, said core matrix may as well be provided from an external processing unit.

As another optional feature, the calculation of the generalized intensity vector may be implemented in the determination unit 250 using a first weighted summation, for example using the order dependent spatial weights (e.g. provided via matrix G) and the spherical harmonic coefficients of the sound pressure and/or of the particle velocity.

Accordingly, the calculation of the generalized energy density may be implemented in the determination unit 260 using a second weighted summation, for example using the order dependent spatial weights (e.g. provided via matrix G) and the spherical harmonic coefficients of the sound pressure and/or of the particle velocity.

Optionally, for the determination of the generalized intensity vector and/or the generalized energy density a matrix vector multiplication which is based on the vector p(k) comprising the spherical harmonic coefficients of the pressure, the matrix G comprising the order dependent spatial weights and the matrices e.g. $D^a$ or $D^{\alpha}$, for $\alpha \in \{0, x, y, z\}$ and/or for $a \in \{x, y, z\}$ describing a relationship between SHCs of the pressure and SHCs of the particle velocity, and, for example, using the dimension adaptation/limiting matrix, e.g. $D^0$, may be used, for example within the first and/or second summation or for example replacing the summation with matrix-matrix or matrix-vector multiplications.

As another optional feature, for the determination of the generalized intensity vector (or components thereof) and/or the generalized energy density, the quadratic form may be used, for example within the first and/or second summation or for example replacing the summation with matrix-matrix or matrix-vector multiplications.

Usage of summations may be easy to implement and may require only simple calculation operations, hence allowing usage of low complexity calculation hardware.

As an example, the GIV determination unit 250 may be configured to determine the generalized intensity vector $I_g$ according to $$I_g^a(k) = -\frac{1}{\rho_0 c}\left[D^0 p(k)\right]^H G(k-)D^a p(k)$$

-continued and/or according to $$I_g^a(k) = -\frac{1}{\rho_0 c} tr\left\{G(k)D^a\Phi_p(k)D^{0H}\right\}$$

with $$I_g^a$$

being components of the generalized intensity vector $I_g$ for $a \in \{x, y, z\}$. Optionally, for example, in order to suppress an influence of noise, e.g. measurement noise from the microphone 220, the GIV determination unit 250 may be configured to determine an expected value of the generalized intensity vector $I_g$ according to $$\varepsilon\left\{I_g^a(k)\right\} = -\frac{1}{\rho_0 c} tr\left\{G(k)D^a\Phi_p(k)D^{0H}\right\}$$

The inventors recognized that the above shown computation formulas may only require low computational effort, whilst allowing for a precise determination of an information about the generalized intensity vector, which may allow for a good determination of the information about the sound field.

As explained before, measurement information 202 provided to the generalized intensity vector determination unit 250 and/or to the generalized energy density determination unit 260 may comprise the matrix $\Phi_p$. In this case, as another optional feature, the generalized intensity vector determination unit 250 may be configured to determine the generalized intensity vector and/or a component of the generalized intensity vector and the generalized energy density determination unit 260 may be configured to determine the generalized energy density of the sound field, using a matrix multiplication, which is based on the matrix G comprising the spherical harmonic order dependent weights, the matrices $D^a$ describing a relationship of the SHCs of the sound pressure and SHCs of the particle velocity and the matrix $\Phi_p$, in other words, using matrix $\Phi_p$ which is based on an outer product, e.g. an outer self-product p $p^H$, based on the vector p.

As another example, the GED determination unit 260 may be configured to determine a generalized intensity vector $E_g$ according to $$E_g(k) = \frac{1}{2\rho_0 c^2} \sum_{\alpha \in \{0,x,y,z\}} \left[D^{\alpha} p(k)\right]^H G(k) D^{\alpha} p(k)$$

and/or according to $$E_g(k) = \frac{1}{2\rho_0 c^2} \sum_{\alpha \in \{0,x,y,z\}} tr\left\{G(k)D^{\alpha}\Phi_p(k)D^{\alpha H}\right\}$$

Furthermore, the GED determination unit 260 may be configured to determine an estimate of the generalized density vector $E_g$ according to $$\mathcal{E}\{E_g(k)\} = \frac{1}{2\rho_0 c^2} \sum_{\alpha \in \{0,x,y,z\}} tr\{G(k)D^\alpha \Phi_p(k) D^{\alpha H}\}$$

Hence, in general, the GIV determination unit 250 and/or the GED determination unit 260 may be configured to determine at least one of an expected value of the generalized intensity vector, an estimate of the expected value of the generalized intensity vector, an expected value of the generalized energy density, and/or an estimate of the expected value of the generalized energy density.

The inventors recognized that using any of the above results, a precise determination of an information about the generalized energy density with high accuracy and low computational effort may be achieved, which may allow for a good determination of the information about the sound field.

Optionally, any of the above explained determinations may be performed using matrix $\Phi_p$, e.g. in the form of the of the covariance matrix of p, of the spherical harmonic coefficients of the sound pressure and/or using an estimate of matrix $\Phi_p$.

Optionally, the GIV determination unit 250 may be configured to perform an averaging of the generalized intensity vector over different time frames. Accordingly, the GED determination unit 260 may be configured to perform an averaging of the generalized energy density over different time frames.

As another optional feature, the GIV determination unit 250 and/or the GED determination unit 260 may be configured to perform an averaging of matrix $\Phi_p$, e.g.

In the form of the covariance matrix of p, of the spherical harmonic coefficients of the sound pressure over different time frames in order to determine the generalized intensity vector and/or an estimate of the expected value of the generalized intensity vector and/or respectively an expected value of the generalized energy density, and/or an estimate of the expected value of the generalized energy density.

The averaging over different time frames may further increase the reliability and robustness of the respective entity and hence of the information about the sound field determined.

As an example, the expected value of the generalized intensity vector, the estimate of the expected value of the generalized intensity vector and/or the expected value of the generalized energy density may be determined according to $$\mathcal{E}\{I_g^a(k)\} = -\frac{1}{\rho_0 c} tr\{G(k)D^a \Phi_p(k) D^{0H}\}$$

and the expected value of the generalized energy density and/or the estimate of the expected value of the generalized energy density may be determined according to $$\mathcal{E}\{E_g(k)\} = \frac{1}{2\rho_0 c^2} \sum_{\alpha \in \{0,x,y,z\}} tr\{G(k)D^\alpha \Phi_p(k) D^{\alpha H}\}$$

It was recognized that a computation of the generalized intensity vector and/or of the generalized energy density according to the above formulas, may be computationally advantageous and may provide accurate and robust, e.g. with respect to noise, results.

As another optional feature, the GIV determination unit 250 and/or the GED determination unit 260 may be configured to determine the expected value of the generalized intensity vector, and/or the estimate of the expected value of the generalized intensity vector, and/or respectively the expected value of the generalized energy density and/or the estimate of the expected value of the generalized energy density recursively. Furthermore, the GIV determination unit 250 and/or the GED determination unit 260 may be configured to determine an expected value of the covariance matrix of the spherical harmonic coefficients of the pressure and/or an estimate of the expected value of the covariance matrix of the spherical harmonic coefficients of the pressure. Hence, optionally the computation or processing of the matrix $\Phi_p$ may be performed by the GIV determination unit 250 and/or by the GED determination unit 260. Therefore, unit 240 may be integrated in one or both of the determination units 250, 260, therefore as well comprising the respective input variables, e.g. p. It was recognized that a recursive determination may allow for low incremental computational costs, as well as a consideration of past measurement values, e.g. the SHCs, e.g. in the form of the result of the respective entity of the last time step.

As explained before, a recursive determination may decrease the computational complexity and may allow to take past results in consideration with low effort, since no block processing has to be performed.

In general, as an optional feature, the GIV determination unit 250 may be configured to determine the generalized intensity vector in a spherical harmonic domain and the GED determination unit 260 may be configured to determine the generalized energy density in a spherical harmonic domain. Hence a calculation of the respective value may be performed using spherical harmonic coefficients, spherical harmonic functions and/or matrices comprising matrix entries, that may for example be physically interpreted in a spherical harmonic domain. The calculations in the spherical harmonic domain may, for example, comprise the spatial averaging. In other words, the spatial averaging may be performed in the spherical harmonic domain. Hence, the spherical-harmonic-order dependent weights may be used for a weighted spherical harmonic spatial averaging of an intensity vector and/or of an energy density of the sound field, which may, for example, provide the respective generalized intensity vector and/or generalized energy density.

As another optional feature, the $\Phi_p$ determination unit 240, the GIV determination unit 250 and/or the GED determination unit 260 may be configured to determine estimates of the respective entity recursively, based on N observations, e.g. of the SHCs of the sound pressure, according to.

$$\widehat{\mathcal{E}\{A\}}_n = \begin{cases} A_1 & \text{if } n = 1 \\ \beta \widehat{\mathcal{E}\{A\}}_{n-1} + (1-\beta)A_n & \text{else,} \end{cases}$$

wherein $\widehat{\mathcal{E}\{A\}}$ is an estimation of an expectation value of A (e.g. $\Phi_p$ in case of the $\Phi_p$ determination unit 240, e.g. $I_g$ in the case of the GIV determination unit 250, e.g. $E_g$ in the case of the GED determination unit 260) with respect to the observations up to index n, or wherein $\widehat{\mathcal{E}\{A\}}$ is an expectation value of A with respect to the observations up to index n, and wherein $\beta \in [0,1[$ is a recursive smoothing parameter.

As explained before, the GIV determination units 250 may determine an information about the generalized intensity vector, for example in the form of the vector $I_g$ itself, for example in the form of one or more components of the vector $$I_g^a$$

and/or estimates of expected values thereof. Hence, an output of the GIV determination units 250 is the GIV information 204, which may comprise any or all of the beforementioned entities, e.g.

$$I_g,\ I_g^a,\ \mathcal{E}\{I_g\} \text{ and/or } \mathcal{E}\{I_g^a\}.$$

Accordingly, the output of the GED determination unit 260 is a GED information 206, e.g. $E_g$ itself or an expected value or an estimate thereof $\varepsilon\{E_g\}$.

The respective entity used for the respective information may, for example, be chosen in accord with the application.

As another optional feature, the signal characteristic determinator may comprise a weight calculator 270. In general, the weight calculator 270 is configured to determine the spherical-harmonic-order dependent weights on the basis the sound field 210. Optionally, the weight calculator 270 may determine the weights based on the GIV information 204.

Optionally, the weight calculator 270 may be configured to perform an optimization, in order to determine the weights. This may comprise using a variance of the signal characteristic to be determined as an optimization quantity, e.g. as a part of the cost function for optimization. As an example, a variance of the generalized intensity vector may be used. As another example, the weight calculator may be configured to minimize the variance of the generalized intensity vector of the sound field, in order to determine the spherical-harmonic-order dependent weights. Therefore, the weight calculator may be configured to minimize a cost function comprising the variance of the generalized intensity vector of the sound field.

The optimization may allow for a good trade-off between accuracy and computational complexity. In addition, a robustness of the weight calculation may be improved by minimizing the variance of the generalized intensity vector, since the intensity vector may be based on noisy measurements of the SHCs of the sound pressure of the sound field.

As another optional feature, the weight calculator 270 may consider, e.g. in the cost function for the optimization, higher-order SHCs of the sound pressure and/or of the particle velocity. Hence, the weight calculator 270 may be provided with the measurement information 202 or in particular the vectors p and $u^a$ (not shown). This may allow to calculate weights which may allow for a better calculation of the information about the sound field, e.g. using the additional information about the sound field, contained in the higher-order SHCs.

As another optional feature, the weight calculator 270 may be configured to perform an optimization with constraints, for example, such that a trivial solution for the weights may be avoided by considering the constraints in the cost function. As an example, the weight calculator 270 may be configured to determine the spherical-harmonic-order dependent weights with respect to a lower bound for said weights. This lower bound may be incorporated in the optimization problem as constraints.

As an example, a cost function J of the weight calculator 270 may be defined according to $$\mathcal{J}(g,\lambda) = \mathcal{E}\left\{\|\mathrm{R}\{I_g\} - \mathcal{E}\{\mathrm{R}\{I_g\}\}\|_2^2\right\} + \lambda\left(\sum\nolimits_{l=0}^{L-1} G_l(2l+1) - 1\right),$$

wherein $g=[G_0, \ldots, G_{L-1}]$ T and wherein $G_l$ are the spherical harmonic order dependent weights for l=0, . . . , L−1 with L being the maximum order of the SHC of the sound pressure and/or the particle velocity which are considered, and wherein A is a Lagrange-multiplier; and wherein $\varepsilon\{\bullet\}$ is the expectation value operator, and wherein $\Re\{\bullet\}$ extracts the real part. It was recognized that such a cost function may provide weights that may be used for a precise and robust calculation about the information about the sound field.

Optionally, the weight calculator 270 may be configured to minimize the cost function using the Karush-Kuhn-Tucker (KKT) conditions, in order to determine the spherical-harmonic-order dependent weights.

Optionally, the weights may be determined by the weight calculator 270 according to $$g_{opt} = \mathcal{E}\{\textstyle\sum\}^{-1} f / \left(f^T \mathcal{E}\{\textstyle\sum\}^{-1} f\right)$$

wherein $$[\textstyle\sum]u' = (\mathrm{R}\{I_l\} - \mathcal{E}\{\mathrm{R}\{I_l\}\})^T (\mathrm{R}\{I_{l'}\} - \mathcal{E}\{\mathrm{R}\{I_{l'}\}\})$$

$$[f]_l = 2l+1 \text{ for } l, l' = 0, \ldots, L-1.$$

with $$I_l = -\frac{1}{\rho_0 c} \sum_{m=-l}^{l} P_{lm}^* \sum_{l'=l\pm1} \sum_{m'=m-1}^{m+1} d_{lm,l'm'} P_{l'm'}$$

$$\text{and } I_g = \sum\nolimits_{l=0}^{L-1} G_l I_l.$$

As another optional feature, e.g. in contrast to incorporating a lower bound within constraints, the weight calculator 270 may be configured to determine the spherical-harmonic-order dependent weights with respect to the lower bound $G_{min}$ according to $$G_l = \max\{[g_{opt}]_l, G_{min}\}$$

wherein $[g_{opt}]_l$ is the l-th element of vector $g_{opt}=[G_0, \ldots, G_{L-1}]^T$ wherein $g_{opt}$ is optimal with respect to a cost function, e.g. the cost function J. Hence according to the invention, an advantageous option to calculate the weights may be chosen with respect to the specific application. Incorporation of constraints may comprise larger computational efforts, yet in applications using standard optimization toolboxes, this may allow usage of said toolboxes without adaptation. On the other hand, using simply a lower bound, e.g. $G_{min}$ may be computationally less expensive, yet such a bound has to be found. In addition, such a bound or lower limit may be chosen individually for each element of the optimal vector $g_{opt}$.

Optionally, the generalized intensity vector and/or the generalized energy density may, for example, be the information about the characteristic of the sound field 210. As an example, in this case, the signal characteristic determinator may comprise only the first part 200*a* and second part 200*b* and the GIV information 204, e.g. comprising the generalized intensity vector and/or the GED information 206, e.g. comprising the generalized energy density 206 may be output values of the signal characteristic determinator.

As another example, the GIV information 204, e.g. in the form of the generalized intensity vector and/or the GED information 206, e.g. in the form of the generalized energy density 206 may be intermediate quantities that may be provided to a third part of the signal characteristic determinator, e.g. for further processing. Hence, the GIV information 204 and/or the GED information 206 may be used to determine the information about the characteristic of the sound field 210.

Figure 2A:
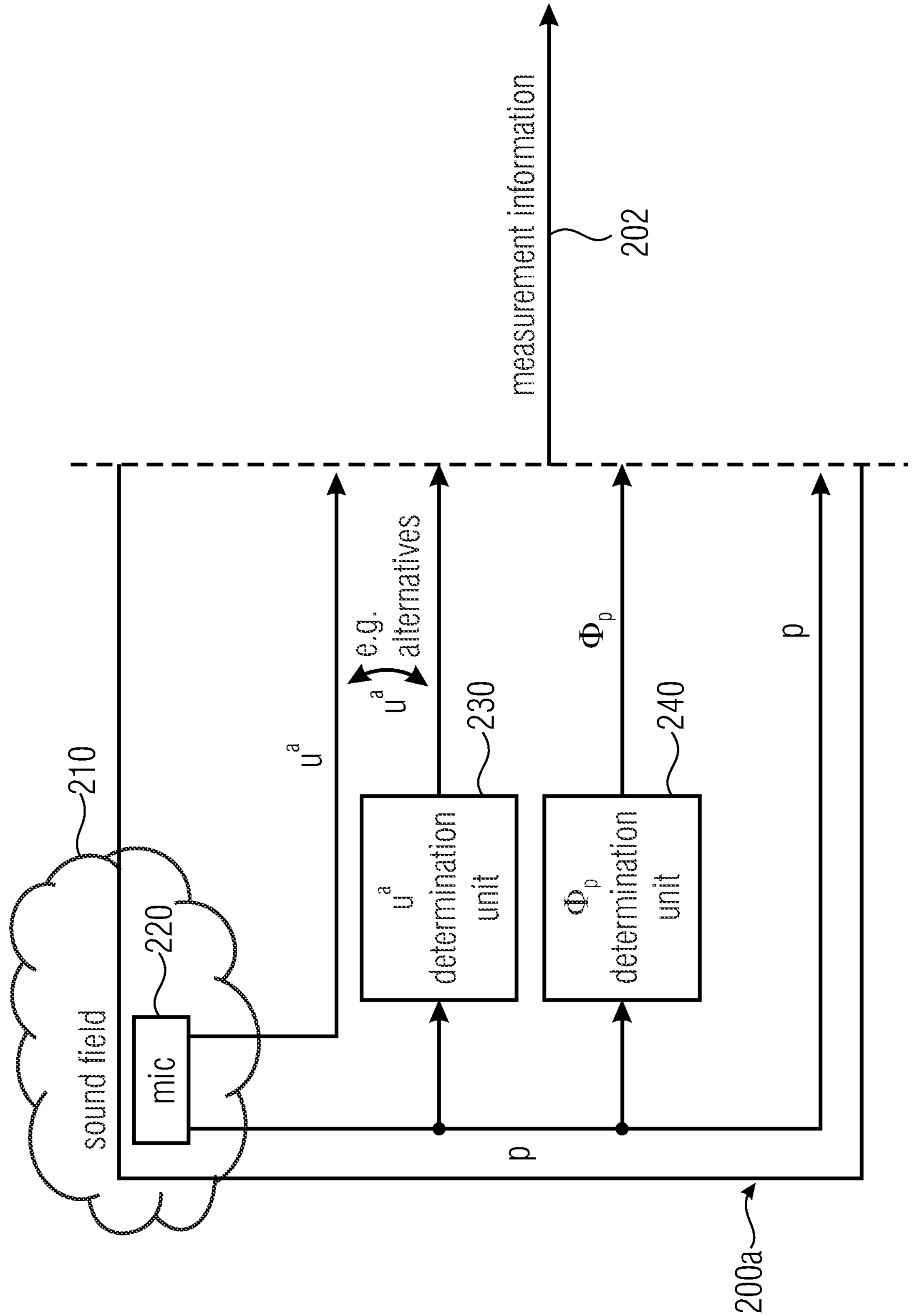
FIGS. 2 *a*)-*d*) show a schematic view of a signal characteristic determinator with additional, optional features, according to embodiments of the present invention.
Figure 2B:
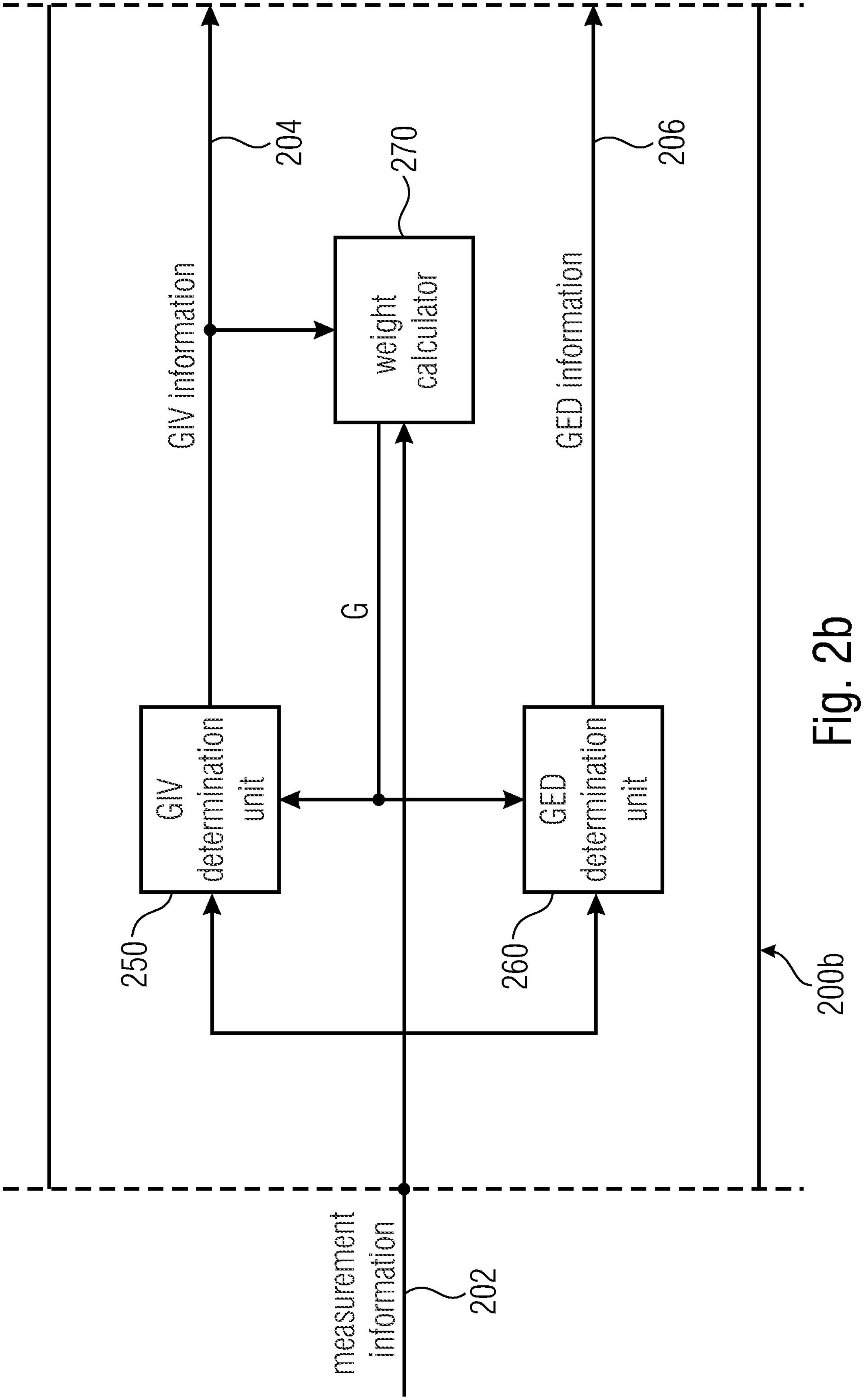
Figure 2C:
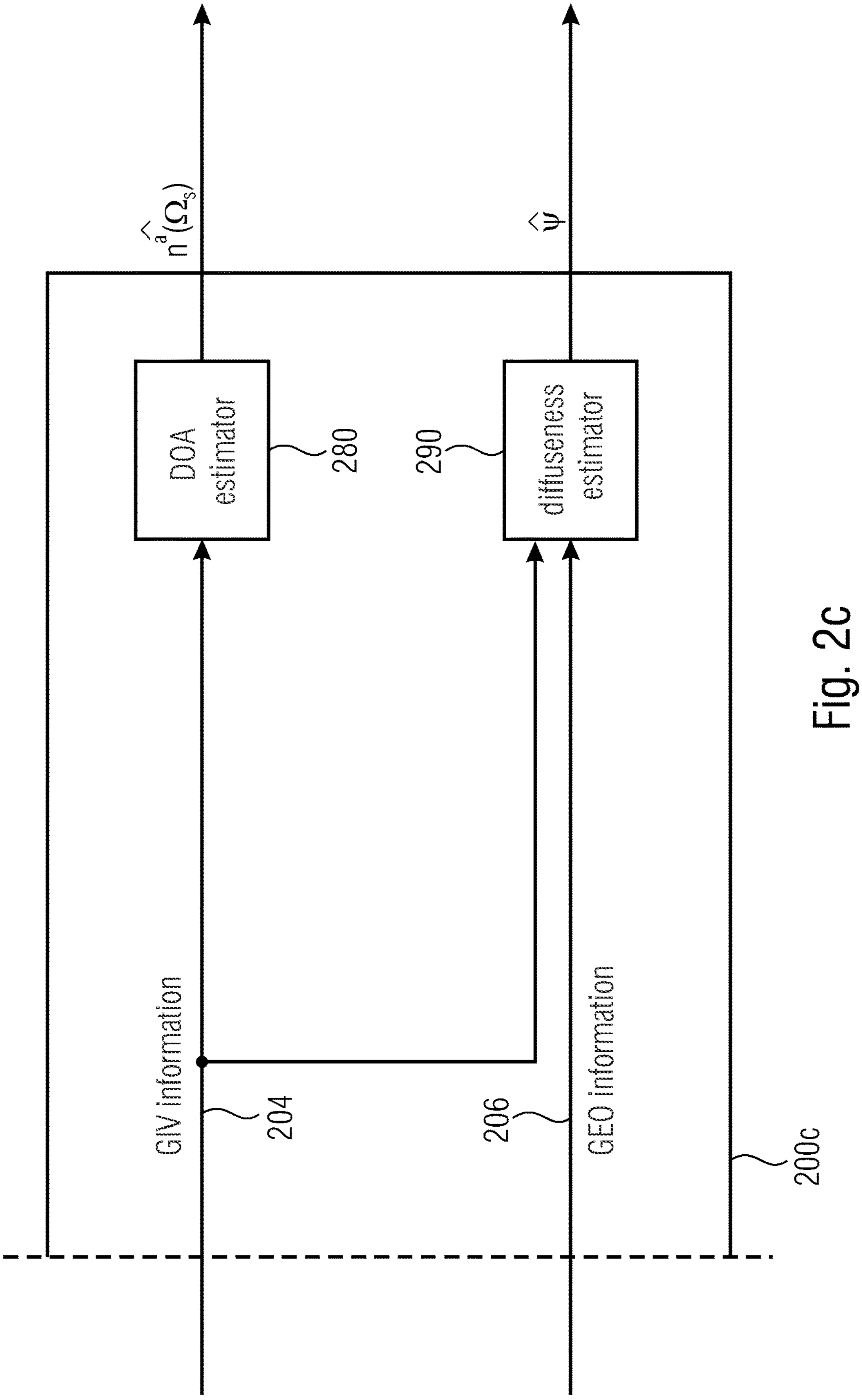
Figure 2D:
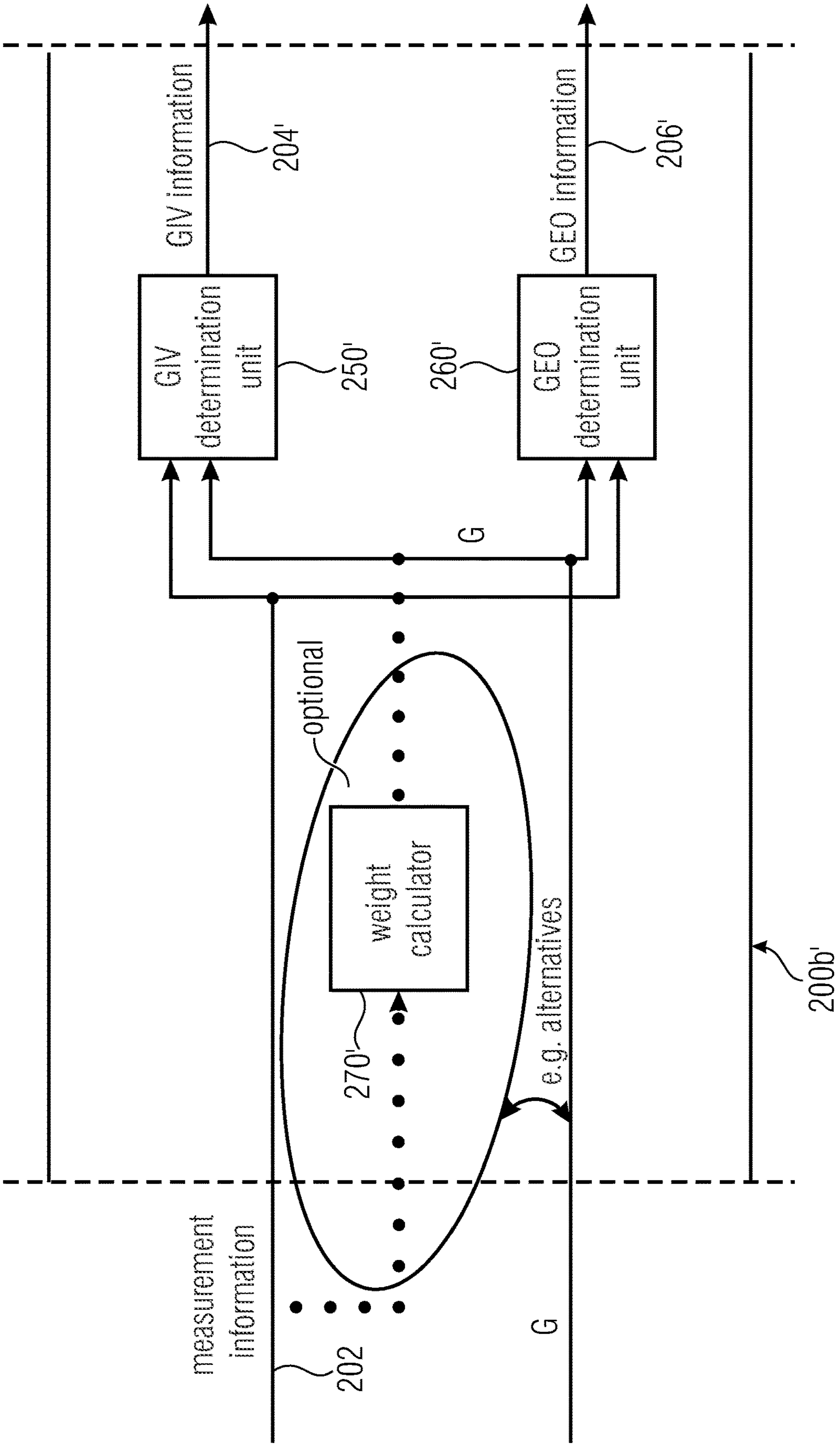

FIG. 2*c*) shows an optional third part 200*c* of the signal characteristic determinator receiving the GIV information 204 and the GED information 206, hence, for example the expected value of the generalized intensity vector and/or the estimate of the expected value of the generalized intensity vector and the expected value of the generalized energy density, and/or the estimate of the expected value of the generalized energy density.

As other optional features, the signal characteristic determinator comprises a direction of arrival (DOA) estimator 280 and a diffuseness estimator 290.

The DOA estimator 280 may be configured to determine a direction of arrival of a plane wave component of the sound field 210 which may comprise the plane wave component and a diffuse component. The diffuseness estimator 290 may be configured to determine a diffuseness of the sound field 210. Hence sound field may be analyzed and/or reproduced accurately.

FIG. 2*c*) shows one optional signal flow, wherein the DOA estimator 280 is provided with the information 204 about the generalized intensity vector and wherein the diffuseness estimator 290 is provided with the information 204 about the generalized intensity vector and with the information 206 about the generalized energy density. Optionally (not shown), one or both estimators may receive the measurement information 202, for example in particular the SHCs of the sound pressure of the sound field, e.g. in the form of vector p.

Optionally, the DOA estimator 280 and/or the diffuseness estimator 290 may consider the real part of the expected value of the generalized intensity vector and/or of the real part of an estimate of the expected value of the generalized intensity vector for the estimation of the DOA, while disregarding the corresponding imaginary part. It was recognized that this may allow for better results of the DOA and/or diffuseness respectively.

As an example, the DOA estimator 280 may be configured to determine an estimation of the direction of arrival according to $$\widehat{n^a(\Omega_s)} = -\frac{\mathrm{R}\left\{\mathcal{E}\left\{I_g^a(k)\right\}\right\}}{\|\mathrm{R}\left\{\mathcal{E}\{I_g(k)\}\right\}\|_2};$$

and/or according to $$\widehat{n^a(\Omega_s)} = \frac{\mathrm{R}\left\{tr\left\{G(k)D^a\Phi_p(k)D^{0H}\right\}\right\}}{\sqrt{\sum_{b\in\{0,x,y,z\}}\left|\mathrm{R}\left\{tr\left\{G(k)D^b\Phi_p(k)D^{0H}\right\}\right\}\right|^2}}$$

wherein a∈{x, y, z} with $n^x(\Omega_s)$, $n^y(\Omega_s)$ and $n^z(\Omega_s)$ denoting the x-, y- and z-components of the unit-norm vector $n(\Omega_s)$ pointing to the direction-of-arrival (DOA) $\Omega_s$ of the plane-wave component; and wherein $\widehat{\{\cdot\}}$ denotes an estimate of a value, $\Re\{\cdot\}$ extracts the real part, wherein $$I_g^x,\ I_g^y \text{ and } I_g^z$$

denote the x-, y-, and z-components of the Intensity vector $I_g$, and wherein $\varepsilon\{\cdot\}$ denotes the expectation value operator or an estimate thereof. For the latter, the DOA estimator 280 may receive the measurement information 202. Optionally, the DOA estimator may comprise the GIV determination unit 250, or the functionality thereof, e.g. to determine the generalized intensity vector or its components (or an expected or estimated value thereof).

As another optional feature, the diffuseness estimator 290 may be configured to determine an estimate of the diffuseness and/or the diffuseness based on a quotient comprising a norm of an expected value of the generalized intensity vector or a norm of an estimate of the expected value of the generalized intensity vector in the numerator and an expected value of the generalized energy density or an estimate of the expected value of the generalized energy density in the denominator.

Optionally, the diffuseness estimator 290 may be configured to determine an estimate of the diffuseness according to $$\hat{\psi}(k) = 1 - \frac{\|\mathcal{E}\{I_g(k)\}\|_2}{c\mathcal{E}\{E_g(k)\}}$$

and/or according to $$\hat{\psi}(k) = 1 - \frac{\sqrt{\sum_{\alpha\in\{x,y,z\}}\left|tr\left\{G(k)D^\alpha\Phi_p(k)D^{0H}\right\}\right|^2}}{\frac{1}{2}\sum_{\alpha\in\{0,x,y,z\}}tr\left\{G(k)D^\alpha\Phi_p(k)D^{\alpha H}\right\}}.$$

As another example, for the latter, the diffuseness estimator 290 may receive the measurement information 202. Optionally, the diffuseness estimator may comprise the GIV determination unit 250 and/or the GED determination unit 260, or the functionality thereof, e.g. to determine the generalized intensity vector or its components and/or the generalized energy density (or respective expected or estimated values thereof).

As another example, the DOA estimator 280 and/or the diffuseness estimator 290 may be configured to determine estimates of the respective entity recursively, based on N observations, e.g. of the SHCs of the sound pressure, according to $$\widehat{\varepsilon\{\mathrm{A}\}}_n = \begin{cases} A_1 & \text{if } n = 1 \\ \beta\widehat{\varepsilon\{\mathrm{A}\}}_{n-1} + (1-\beta)A_n & \text{else,} \end{cases}$$

Hence, in general, DOA estimator 280 and/or diffuseness estimator 290 may be configured to determine the DOA and/or the diffuseness recursively.

As am example, as shown, the output of the DOA estimator 280 may be $\widehat{n^a(\Omega_s)}$,, e.g. determined according to any of the beforementioned formulas, and the output of the diffuseness estimator 290 may be, e.g. determined according to any of the beforementioned formulas.

As another optional example FIG. 2 *d*) shows an additional option for a second part 200*b*' of the signal characteristic determinator. Hence, as an example a signal characteristics determinator may comprise part 200*b* or part 200*b*' (e.g. as alternatives). As optional features, such a signal characteristic determinator (comprising second part 200*b*')

comprises a generalized intensity vector (GIV) determination unit 250' and a generalized energy density (GED) determination unit 260'. Both units 250, 260 are provided with the measurement information 202 and hence any or all of the information collected or determined or estimated or measured from the sound field 210, as explained in the context of and as shown in FIG. 2 *a*).

In addition, in contrast to the option shown in FIG. 2 *b*), the generalized intensity vector (GIV) determination unit 250' and the generalized energy density (GED) determination unit 260' may be provided with the spherical harmonic order dependent weights, e.g. as shown in form of a matrix G, which may, for example be a diagonal matrix. These weights may be provided form an external source or by another part of the signal characteristics determinator. As an alternative example, the weights may be calculated using a weight calculator 270' based on the measurement information 202. Output of the optional second part 200*b*', e.g. providing said output to a third, optional section 200*c*, e.g. as shown in FIG. 2 *c*), are the GIV information 204' and the GED information 206'.

Figure 3:
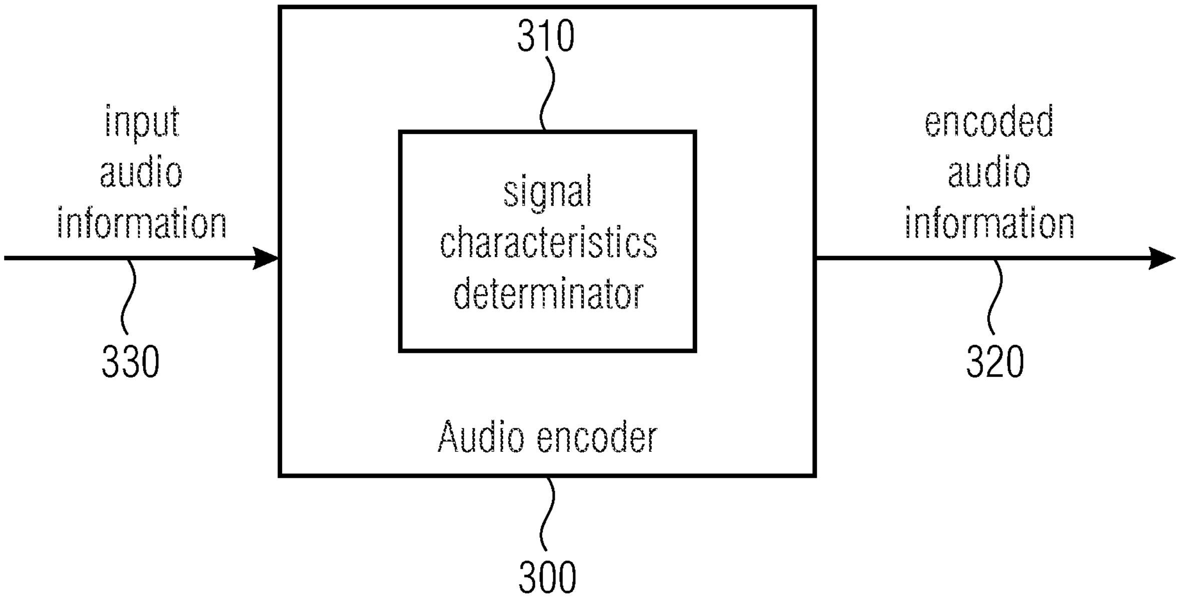
FIG. 3 shows a schematic view of an audio encoder comprising a signal characteristic determinator according to embodiments of the invention.

FIG. 3 shows a schematic view of an audio encoder comprising a signal characteristic determinator according to embodiments of the invention. Audio encoder 300 comprises a signal characteristic determinator 310, e.g. with any of the optional features as explained in the context of FIG. 2. Audio encoder 300 may be configured to provide an encoded audio information 320 on the basis of, or using an input audio information 330. The audio encoder may, for example, be a general audio encoder or a speech encoder or a combined encoder, e.g. for general/audio/speech encoding. In addition, the input audio information may, for example, be an Ambisonic signal, or therefore in general a full-sphere surround sound format. Accordingly, the audio encoder 300 may provide and/or determine an encoded representation of the input audio information, e.g. the Ambisonic signal. Therefore, the signal characteristic determinator 310 may determine, as the information about a characteristic of a sound field, one or more parameters that describe spatial properties of an Ambisonic signal. These parameters may, for example, comprise a direction of arrival, a diffuseness, a generalized intensity vector and/or a generalized energy density. Any of these entities may be determined according to any of the optional features as explained in the context of FIG. 2. Hence any of these entities may be included in an encoded audio stream, as the encoded audio information. Selection and specific determination of the encoded parameters, e.g. describing the spatial properties of the sound field, may be chosen with respect to a subsequent processing, e.g. decoding and sound field reproduction.

In particular, the signal characteristic determinator 310 may determine a generalized intensity vector and/or a generalized energy density, in order to determine, as the information about a characteristic of a sound field, the one or more parameters that describe spatial properties of the Ambisonic signal. Hence the Ambisonic signal may be described more accurately, e.g. incorporating higher order SHCs of a corresponding sound field, and/or with low computational effort.

Figure 4:
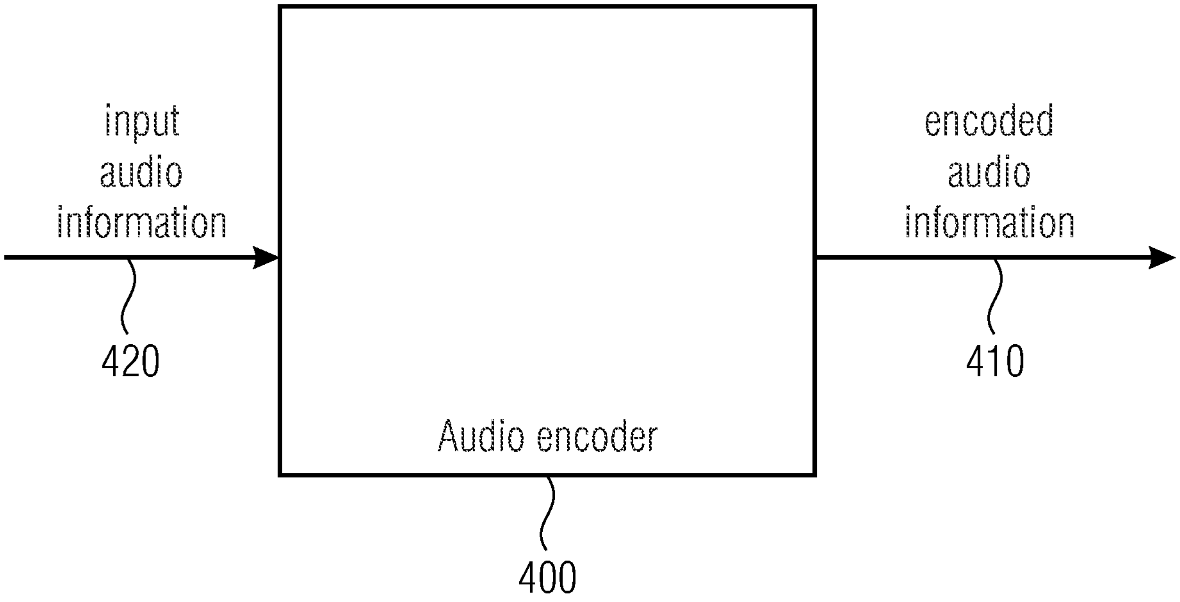
FIG. 4 shows a schematic view of an audio encoder according to embodiments of the invention.

FIG. 4 shows a schematic view of an audio encoder according to embodiments of the invention. Audio encoder 400 may be configured to provide an encoded audio information 410 on the basis of an input audio 420. Similar to the embodiment shown in FIG. 3, the input audio may be associated with a sound field, and may, for example, be or comprise an Ambisonic signal information. Hence, the encoded audio information may, for example, be or comprise an encoded representation of the Ambisonic signal. Therefore, the audio encoder 400 may be configured to determine one or more parameters describing spatial properties of the input audio information, and hence as an example of a corresponding sound field, using a generalized intensity vector. As explained before, the generalized intensity vector may be determined according to any of the options explained in the context of FIGS. 2 *a*)-*c*). Therefore, audio encoder 400 may comprise any or all of the functionality of the signal characteristic determinator explained in FIGS. 2 *a*)-*c*).

Figure 5:
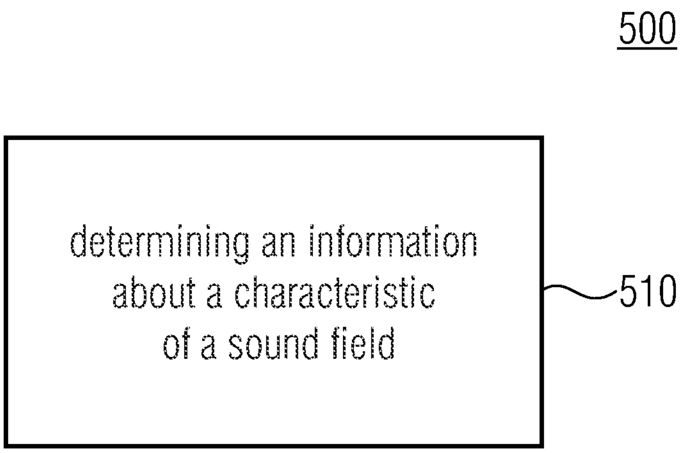
FIG. 5 shows a method for determining a signal characteristic according to embodiments of the invention.

FIG. 5 shows a method for determining a signal characteristic according to embodiments of the invention. Method 500 comprises determining 510 an information about a characteristic of a sound field on the basis of higher-order spherical harmonic coefficients of a sound pressure and/or of a particle velocity and on the basis of spherical-harmonic-order dependent weights.

In the following, different inventive embodiments and aspects will be described in a first part titled “Generalized intensity vector and energy density in the spherical harmonic domain”, for example in the chapters “Overview” “INTRODUCTION”, “ACOUSTIC INTENSITY AND ENERGY DENSITY”, “SPHERICAL HARMONIC DOMAIN”, “GENERALIZED INTENSITY VECTOR AND ENERGY DENSITY ACCORDING TO ASPECTS OF THE INVENTION”, “APPLICATIONS ACCORDING TO ASPECTS OF THE INVENTION” and “EVALUATION”, “CONCLUSION” and “APPENDIX” and in a second part titled “Generalized Intensity Vector and Energy Density”, for example in the sections “Introduction”, “Main Idea according to aspects of the invention”, “Applications according to aspects of the invention”, “Evaluation” and “Summary and Conclusions”.

Also, further embodiments will be defined by the enclosed claims.

It should be noted that any embodiments as defined by the claims can be supplemented by any of the details (features and functionalities) described in the above mentioned chapters.

Also, the embodiments described in the above mentioned chapters can be used individually, and can also be supplemented by any of the features in another chapter, or by any feature included in the claims.

Also, it should be noted that individual aspects described herein can be used individually or in combination. Thus, details can be added to each of said individual aspects without adding details to another one of said aspects.

It should also be noted that the present disclosure describes, explicitly or implicitly, features usable in a speech encoder and/or an audio encoder (apparatus for providing an encoded representation of an input audio signal) and in a speech decoder and/or an audio decoder (apparatus for providing a decoded representation of an audio signal on the basis of an encoded representation). Thus, any of the features described herein can be used in the context of a speech encoder and/or an audio encoder and in the context of a speech decoder and/or an audio decoder.

Moreover, features and functionalities disclosed herein relating to a method can also optionally be used in an apparatus (configured to perform such functionality). Furthermore, any features and functionalities disclosed herein with respect to an apparatus can also be used in a corresponding method. In other words, the methods disclosed herein can optionally be supplemented by any of the features and functionalities described with respect to the apparatuses.

Also, any of the features and functionalities described herein can be implemented in hardware or in software, or using a combination of hardware and software, as will be described in the section "implementation alternatives".

Implementation Alternatives:

Although some aspects are or have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

In the following, part titled "Generalized intensity vector and energy density in the spherical harmonic domain: Theory and applications" aspects and details according to embodiments of the invention will be discussed.

Overview

The acoustic intensity vector and energy density are perceptually relevant physical measures of a sound field which can be used in the context of sound field reproduction or acoustic parameter estimation. In this disclosure, weighted spatial averaging of the intensity vector and energy density is investigated or disclosed, and the results may, for example, be expressed in terms of the spherical harmonic coefficients of the sound field. Higher-order spherical harmonic coefficients may, for example, be incorporated by considering radial averaging or, for example, generally speaking weighted spatial averaging, for example by considering direction dependent weighted spatial averaging or direction independent weighted spatial averaging, e.g., by considering radial averaging]. This radial averaging, e.g., as an example of weighted spatial averaging, may then, for example, be generalized yielding the proposed generalized intensity vector and energy density according to an embodiment of the invention. Direction-of-arrival and diffuseness estimators may, for example, be constructed based on the generalized intensity vector and energy density. In the evaluation, the proposed parameter estimators according to embodiments of the invention are compared to existing state-of-the-art estimators using simulated signals containing directional, diffuse and sensor-noise components.

I. Introduction

The intensity vector and energy density are important acoustic quantities which may, for example, be used for, e.g., sound field reproduction[1-3] or acoustic parameter estimation[4-6]. In directional audio coding (DirAC)[1] the direction-of-arrival (DOA) and diffuseness parameters of a sound field may, for example, be estimated using the intensity vector and energy density at a single position. In this case, the intensity vector and energy density can be computed from the zero- and first-order spherical harmonic coefficients (SHCs) of the sound field.

These SHCs can be obtained using a sound field microphone[7]. In recent years, the use of spherical microphone arrays which can compute higher-order SHCs of a sound field have received more and more attention due to the use of higher-order Ambisonics in, e.g., MPEG-H 3D audio[8] and virtual reality[9]. Hence, it is of paramount importance to incorporate higher-order SHCs for the acoustic parameter estimation.

For the DOA-estimation, spherical harmonic domain (SHD) versions of multiple signal classification (MUSIC) and estimation of signal parameters via rotational invariance techniques (ESPRIT) have been developed[10-13]. However, both methods require an eigendecomposition of the SHCs covariance matrix and, for MUSIC, an additional grid-search is required. This results in a computational complexity which is much higher compared to the intensity vector-based method used in DirAC. For the diffuseness estimation, estimators based on the SHCs coherence matrix[14] or the variance of the eigenvalues of the SHCs covariance matrix[15] have been developed. However, these estimators either require knowledge of the DOA or an eigendecomposition of the SHCs covariance matrix.

Politis et al.[16] incorporated higher-order SHCs for DOA and diffuseness estimation by computing the intensity vector and energy density in different directional sectors. In the subspace pseudointensity vector (PIV) method[6], higher-order SHCs are employed for DOA estimation using the dominant eigenvector of the SHCs covariance matrix. Recently, the present authors have shown that the subspace PIV method can be related to the DOA-vector Eigenboom-ESPRIT[17]. Using this relation, an extended PIV was defined which uses higher-order SHCs for the DOA estimation and has significantly lower computational complexity than the DOA-vector Eigenbeam-ESPRIT. Nevertheless, the physical meaning of the extended PIV remains unclear and a corresponding extension of the energy density has not yet been developed.

Zu et al.[18] derived expressions for the SHCs of the intensity vector at arbitrary distance r from the coordinate origin and applied it to sound field reproduction[3-19]. Higher-order SHCs of the sound pressure are involved for radii $r>0$. However, it remains unclear, how to combine the SHCs of the intensity vector for DOA estimation. Moreover, the expressions involve a radial dependency which may be useful in the context of sound field reproduction but, in the context of DOA estimation, the choice of the radius r is somewhat arbitrary.

In this work, we show that higher-order SHCs of the sound field can be incorporated using weighted spatial averaging of the intensity vector and/or energy density. In other words, according to embodiments of the invention, higher-order SHCs of the sound field may, for example, be incorporated using weighted spatial averaging of the intensity vector and/or energy density. The resulting expressions may, for example, involve the SHCs of the intensity vector and/or energy density and a radial averaging [or, for example, generally speaking weighted spatial averaging, for example a direction independent spatial averaging, e.g. radial averaging]. In addition to previous works[3,18,19], we show that, for example according to embodiments, the radial dependency of the SHCs of the particle velocity can be removed using mode strength compensation and the respective SHCs may, for example be related to the SHCs of the sound pressure via the recurrence relations, which are also used in the DOA-vector Eigenbeam-ESPRIT[13]. This may, for example, simplify the expressions for the SHCs of the intensity vector and/or energy density, for example significantly. In contrast to Politis et al.[16], direction-independent spatial weighting may, for example, be considered for the spatial averaging according to aspects of the invention. The weighted spatial averaging, e.g. the radial averaging may, for example, be generalized yielding the proposed generalized intensity vector and energy density. As an application of the developed theory, novel DOA and diffuseness estimators are derived according to embodiments of the invention.

The remainder of this disclosure is organized as follows: In Section II, the acoustic intensity vector and energy density are discussed in the spatial domain. In Section III, the spherical harmonics decomposition of the sound pressure, particle velocity, intensity vector and energy density, according to aspects of the invention, are discussed. In Section IV, the generalized intensity vector and energy density, according to aspects of the invention, are derived. In Section V, the proposed DOA and diffuseness estimators, according to aspects of the invention, are derived and evaluated in Section VI. Section VII concludes this disclosure and in the appendix, the relation between the SHCs of the particle velocity and the sound pressure is derived.

II. Acoustic Intensity and Energy Density

In the following, expressions for the acoustic intensity and energy density will be derived to illustrate aspects of the invention. The description of the sound field and the assumptions associated with the description of the sound field and the derivation of the expressions for the acoustic intensity and energy density are examples, to support an understanding for aspects of the invention for a man skilled in the art. Simplifications and assumptions may optionally be used to enable an easier understanding. Therefore, it is to be noted that aspects of the invention are not limited to the details presented in the following. A sound field can, for example, be described via the sound pressure $p: \mathbb{R}^4 \rightarrow \mathbb{R}$ and particle velocity $u: \mathbb{R}^4 \rightarrow \mathbb{R}^3$, where $\mathbb{R}$ denote the real numbers, which are functions of space and time. Let us denote the spatial coordinate by $r \in \mathbb{R}^3$ and the temporal coordinate by $t \in \mathbb{R}^3$. If $\int_{\mathbb{R}} |p(r, t)| dt < \infty$, the sound pressure can for example be described by its Fourier coefficients $P(r, k) \in \mathbb{C}$, where $\mathbb{C}$ an c denotes the complex numbers, the wavenumber k is related to the frequency f via $$k = \frac{2\pi f}{c}$$

and c denotes the speed of sound. Analogously, the particle velocity can for example be described via its Fourier coefficients $U(r, k)\in\mathbb{C}^3$ under the same conditions.

At positions r which do not contain sound sources, the Fourier coefficients of the sound pressure fulfill the homogeneous Helmholtz equation:

$$\Delta P(r, k) + k^2 P(r, k) = 0, \tag{1}$$

where $\Delta=\nabla.\nabla$ denotes the Laplace operator and $\nabla$ the gradient with regard to the spatial coordinates. The explicit form of $\nabla$ depends on the chosen coordinate system. The particle velocity is related to the sound pressure via the Euler-equation[20]:

$$U(r, k) = -\frac{1}{ik\rho_0 c}\nabla P(r, k), \tag{2}$$

where $i=\sqrt{-1}$ denotes the imaginary number and $p_0$ the density of air. Note, that we use, for example the engineering convention for the Fourier transform as discussed in e.g.[21].

The instantaneous complex intensity vector I and energy density E can be defined as follows[22]:

$$I(r, k) = P^*(r, k)U(r, k) \tag{3}$$

$$E(r, k) = \frac{1}{2}\rho_0\left(\frac{1}{\rho_0^2c^2}|P(r, k)|^2 + \|U(r, k)\|_2^2\right), \tag{4}$$

where $(\bullet)^*$ denotes the complex conjugate and $\|(\bullet)\|_2$ the $\ell^2$-norm. According to aspects of the invention, these acoustic quantities can be averaged over space and/or wavenumber. This is discussed further in Section IV.

Considering the sound pressure and particle velocity as random processes, we can, for example compute expectations of the intensity vector and energy density, i.e., $$\varepsilon\{I(r, k)\} = E\{P^*(r, k)U(r, k)\} \tag{5}$$

$$\varepsilon\{E(r, k)\} = \frac{\rho_0}{2}\varepsilon\left\{\frac{1}{\rho_0^2c^2}|P(r, k)|^2 + \|U(r, k)\|_2^2\right\}, \tag{6}$$

where $\varepsilon\{\bullet\}$ denotes for example the statistical expectation. In the remainder of this section, we discuss the intensity vector and energy density for example for a directional (plane-wave) sound field and a diffuse sound field. Again, it is to be noted that discussing the intensity vector and energy density for a directional sound field and a diffuse sound field is to be seen as an illustrative example to provide an understanding for embodiments of the invention for a man skilled in the art.

The sound pressure of a plane-wave can for example be expressed as follows[21]:

$$P(r, k) = S(k)e^{ikr^T n(\Omega_s)}, \tag{7}$$

where S(k) is the complex amplitude which may be a random process for each k, $(\bullet)^T$ denotes the transpose and $n(\Omega_s)$ is the unit-norm vector pointing to the direction-of-arrival (DOA) $\Omega_s$, of the plane-wave. The DOA consists for example of two angles denoted as elevation $\theta_s\in[0, \pi]$ and azimuth $\phi_s\in(-\pi, \pi]$, i.e., $\Omega_s=(\theta_s, \phi_s)$. One can compute that $\nabla P(r,k)=ikn(\Omega_s)P(r, k)$. Using (2), (3), and (4), for example the following expressions for the intensity vector and energy density can be derived:

$$I(r, k) = -(1/\rho_0 c)|S(k)|^2 n(\Omega_s) \tag{8}$$

$$E(r, k) = (1/\rho_0 c^2)|S(k)|^2. \tag{9}$$

From (8), the inventors recognized or concluded that the intensity vector is proportional to minus the DOA-vector $n(\Omega_s)$. Therefore, according to the embodiments of the invention, the DOA-vector may, for example, be from the intensity vector[5]. This is discussed in more detail in Section V.

A diffuse sound field may, for example, be characterized by an isotropic and uncorrelated superposition of plane-waves. The sound pressure can for example be expressed as follow[s23]:

$$P(r; k) = \int_{\mathbb{S}^2} S(\Omega, k)e^{ikr^T n(\Omega)}d\Omega, \tag{10}$$

where $\mathbb{S}^2$ denotes the two-dimensional sphere (2-sphere), $S(\Omega, k)$ is the complex amplitude of a plane-wave with DOA $\Omega=(\theta, \phi)$ The complex amplitudes $S(\Omega, k)$ may, for example, be described by mutually uncorrelated random processes with equal power, i.e., $$\varepsilon\{S(\Omega, k)S^*(\Omega' k)\} = \frac{\phi dif(k)}{4\pi}\delta(\Omega, \Omega'), \tag{11}$$

where $\phi_{dif}(k)$ denotes the diffuse field power spectral density (PSD) and $\delta(\Omega, \Omega')$ the kernel of the Dirac delta-distribution over the 2-sphere $\delta_\Omega[f]=\int_{s^2}f(\Omega')\delta(\Omega, \Omega')d\Omega'=f(\Omega)$ From these properties, the following expected intensity vector and energy density of a diffuse field can be derived[24]:

$$\mathcal{E}\{I(r, k)\} = 0 = [0, 0, 0]^T \tag{12}$$

$$\mathcal{E}\{E(r, k)\} = (1/\rho_0 c^2)\phi_{dif}(k). \tag{13}$$

We continue discussing the spherical harmonic representation of sound fields which enables the incorporation of spatial averaging of the intensity vector and energy density using different combinations of the spherical harmonic coefficients of the sound pressure according to embodiments of the invention. Note, that spatial averages of sound intensity and energy density are usually derived from microphone recordings at different positions[22]. According to embodiments of the invention, spatial averaging via the spherical harmonic expansion of the sound pressure may, for example, be achieved.

III. Spherical Harmonic Domain

As mentioned in Section II, the explicit form of the Laplace operator A depends on the chosen coordinate system. Let us, for example optionally, consider spherical coordinates, i.e., a position in space is described with the radius $r \in \mathbb{R}^+$ from the coordinate origin, the elevation angle $\theta \in [0, \pi]$ and the azimuth angle $\phi \in (-\pi, \pi]$. The relation between Cartesian coordinates (x, y, z) and spherical coordinates is given as follows:

$$r^T = [x, y, z] = r[\sin(\theta)\cos(\phi), \sin(\theta)\sin(\phi), \cos(\theta)]. \tag{14}$$

The elevation θ is defined from the positive z-axis downwards and the azimuth angle from the positive x-axis counter-clockwise.

Solving the Helmholtz-equation (1) for the sound pressure in spherical coordinates yields the following general solution[21, 25]

$$P(r, k) = \sum_{l=0}^{\infty}\sum_{m=l}^{l} 4\pi i^l \left(j_l(kr)P_{lm}^{(i)}(k) + h_l^{(2)}(kr)P_{lm}^{(o)}(k)\right)Y_{lm}(\Omega) \tag{15}$$

with $j_l$ denoting the spherical Bessel function of order $$l, h_l^{(2)}$$

the spherical Hankel function of the second kind and order $$l, P_{lm}^{(i)}(k)$$

the spherical harmonic coefficients (SHCs) of the incident sound pressure, $$P_{lm}^{(o)}(k)$$

the SHCs of the radiating sound pressure and $Y_{lm}(\Omega)$ the spherical harmonic function (SHF) of order l and degree m at direction $\Omega=(\theta, \phi)$. This is denoted as the spherical harmonic expansion (SHE) of the sound pressure.

The SHFs $Y_{lm}$: $\mathbb{S}^2 \rightarrow \mathbb{C}$ for l=0, . . . , ∞ and m=−l, . . . , l form a complete orthonormal basis of functions on the 2-sphere[26]. Explicit expressions can be found in e.g.[25].

A. SHCs of Sound Pressure

Using the orthonormality of the SHFs and (15), one may, for example, get $$\int_{\mathbb{S}^2} P(r, k)Y_{lm}^*(\Omega)d\Omega = 4\pi i^l \left(j_l(kr)P_{lm}^{(i)}(k) + h_l^{(2)}(kr)P_{lm}^{(o)}(k)\right). \tag{16}$$

Therefore, given the sound pressure at the surface of a sphere of radius r, a combination of the SHCs of the incident and radiating sound pressure can be derived. Let us, for example, optionally assume that there are no sound sources at radii ≤r. If the sphere of radius r is transparent, this results in $$P_{lm}^{(o)}(k) = 0 \forall\, l, m.$$

if the sphere is not transparent, scattering at the surface of the sphere may be or for example even will contribute to $$P_{lm}^{(o)}(k).$$

Analytic expressions for the scattering on a rigid sphere can be derived[27]. In both cases, the SHCs of the incident sound pressure can be computed as follows:

$$P_{lm}^{(i)}(k) = \frac{1}{b_l(kr)}\int_{\mathbb{S}^2} P(r, k)Y_{lm}^*(\Omega)d\Omega \tag{17}$$

with the mode−strengths[27]:

$$b_l(kr) = 4\pi i^l \begin{cases} j_l(kr) & \text{(open sphere)} \\ j_l(kr) - \dfrac{j_l'(kr)}{h_l^{(2)\prime}(kr)}h_l^{(2)}(kr) & \text{(rigid sphere)}, \end{cases} \tag{18}$$

where (Ω)' denotes the derivative. The mode-strength compensation $1/b_l(kr)$ may be, or in some cases even has to be, regularized in practice due to zeros in the spherical Bessel functions[9,25]. Moreover, in practice, the sound pressure can, for example only be measured at a finite number of directions on the sphere. In this case, the integral in (17) may be, for example even has to be replaced by a quadrature over the sphere. For more information, we refer the reader to[25]. One can show, that at least $(L+1)^2$ sampling points (i.e., microphones) on the sphere are required to compute the SHCs of the incident sound pressure up to a maximum order L[28].

B. SHCs of Particle Velocity

Zuo et al.[18] derived expressions which relate the radial and angular components of the particle velocity to the SHCs of the sound pressure. However, the expressions still contain radial dependencies involving spherical Bessel functions and derivatives thereof. In this disclosure x, y and z components of the SHCs of the incident particle velocity are derived according to embodiments of the invention, in terms of the SHCs of the incident sound pressure, which do not contain radial dependencies.

Let us for example optionally, assume for simplicity, that the sound pressure contains only incident contributions at radius r. Note, that scattering at the surface of a spherical microphone array may be compensated for as described in Section III A. Using the Euler equation (2) and (15), one can derive:

$$U(r, k) = -\frac{1}{ik\rho_0 c}\nabla P(r, k) = -\frac{1}{ik\rho_0 c}\sum_{l=0}^{\infty}\sum_{m=-l}^{l} 4\pi i^l [\nabla j_l(kr)Y_{lm}(\Omega)]P_{lm}(k), \tag{19}$$

where we omitted the superscript $(\bullet)^{(i)}$ for the SHCs of the incident sound pressure for brevity. The SHCs of the particle velocity U can be derived analogously to (17), i.e.:

$$U_{lm}(k) = \frac{1}{4\pi i^l j_l(kr)}\int_{\mathbb{S}^2} U(r, k)Y_{lm}^*(\Omega)d\Omega = -\frac{1}{\rho_0 c}\sum_{l'=0}^{\infty}\sum_{m'=-l'}^{l} d_{lm,l'm'}P_{l'm'}(k), \tag{20}$$

where we used (19) in the second step and defined:

$$d_{lm,l'm'} = \int_{\mathbb{S}^2} Y^*_{lm}(\Omega)\frac{i^{l'-1}}{i^l k j_l(kr)}[\nabla j_{l'}(kr)Y_{l'm'}(\Omega)]d\Omega. \tag{21}$$

in the appendix, it is shown that the coefficients $$d_{lm,l'm'} = \left[D^x_{lm,l'm'}, D^y_{lm,l'm'}, D^z_{lm,l'm'}\right]^T$$

are independent of r, k and may, for example, take the following form:

$$D^x_{lm,l'm'} = \frac{1}{2}\left[-\sqrt{\frac{(l+m-1)(l+m)}{(2l-1)(2l+1)}}\delta_{l'(l-1)}\delta_{m'(m-1)} + \sqrt{\frac{(l-m-1)(l-m)}{(2l-1)(2l+1)}}\delta_{l'(l-1)}\delta_{m'(m+1)} + \sqrt{\frac{(l-m+1)(l-m+2)}{(2l+1)(2l+3)}}\delta_{l'(l+1)}\delta_{m'(m-1)} - \sqrt{\frac{(l+m+1)(l+m+2)}{(2l+1)(2l+3)}}\delta_{l'(l+1)}\delta_{m'(m+1)}\right] \tag{22}$$

$$D^y_{lm,l'm'} = \frac{1}{2i}\left[-\sqrt{\frac{(l+m-1)(l+m)}{(2l-1)(2l+1)}}\delta_{l'(l-1)}\delta_{m'(m-1)} - \sqrt{\frac{(l-m-1)(l-m)}{(2l-1)(2l+1)}}\delta_{l'(l-1)}\delta_{m'(m+1)} + \sqrt{\frac{(l-m+1)(l-m+2)}{(2l+1)(2l+3)}}\delta_{l'(l+1)}\delta_{m'(m-1)} + \sqrt{\frac{(l+m+1)(l+m+2)}{(2l+1)(2l+3)}}\delta_{l'(l+1)}\delta_{m'(m+1)}\right]$$

$$D^z_{lm,l'm'} = \sqrt{\frac{(l-m)(l+m)}{(2l-1)(2l+1)}}\delta_{l'(l-1)}\delta_{m'm} + \sqrt{\frac{(l+1-m)(l+1+m)}{(2l+1)(2l+3)}}\delta_{l'(l+1)}\delta_{m'm}.$$

with $\delta_{ab}=1$ if a=b and 0 else. Note, that these are the recurrence-relation coefficients used in the DOA-vector Eigenbeam-ESPRIT[29]. They are only non-zero for l'=l±1 and m'=m−1, m or m+1. Hence, the SHCs of the particle velocity can be computed from the SHCs of the sound pressure as follows:

$$U_{lm}(k) = -\frac{1}{\rho_0 c}\sum_{l'=l\pm 1}\sum_{m'=m-1}^{m+1} d_{lm,l'm'}P_{l'm'}(k). \tag{23}$$

If the SHCs of the sound pressure are given up to order L, the SHCs of the particle velocity can be derived up to order L−1.

C. Spherical Harmonic Coefficients of Intensity Vector and Energy Density

The SHCs of the intensity vector and energy density according to embodiments of the invention, may, for example, be defined as follows:

$$I_{lm}(r,k) = \int_{\mathbb{S}^2} I(r,k)Y^*_{lm}(\Omega)d\Omega \tag{24}$$

$$E_{lm}(r,k) = \int_{\mathbb{S}^2} E(r,k)Y^*_{lm}(\Omega)d\Omega. \tag{25}$$

Note, that these SHCs include the radial dependency as opposed to the SHCs of the sound pressure and particle velocity. Using the definition of the intensity vector in (3), the SHE of the sound pressure and particle velocity and, for example optionally, assuming that the sound field consists of incident contributions only, i.e., there may, for example, be no sound sources at radii <r and no scattering one can derive:

$$I_{lm}(r,k) = \int_{\mathbb{S}^2} U(r,k)P^*(r,k)Y^*_{lm}(\Omega)d\Omega = (4\pi)^2 \sum_{l'=0}^{\infty}\sum_{m'=-l'}^{l'}\sum_{l''=0}^{\infty}\sum_{m''=-l''}^{l''} C_{l'm',l''m'',lm}\, i^{l'-l''} j_{l'}(kr) j_{l''}(kr) U_{l'm'}(k) P^*_{l''m''}(k). \tag{26}$$

with the Gaunt-coefficients[30]:

$$C_{l'm',l''m'',lm} = \int_{\mathbb{S}^2} Y_{l'm'}(\Omega)Y^*_{l''m''}(\Omega)Y^*_{lm}(\Omega)d\Omega = \int_{\mathbb{S}^2} Y^*_{l'm'}(\Omega)Y_{l''m''}(\Omega)Y_{lm}(\Omega)d\Omega. \tag{27}$$

Explicit expressions of the Gaunt-coefficients can be computed using Wigner-3j symbols. For more details we refer the reader to[31]. Analogously to (26), one can compute the SHCs of the energy density, yielding:

$$E_{lm}(r,k) = (4\pi)^2 \sum_{l'=0}^{\infty}\sum_{m'=-l'}^{l'}\sum_{l''=0}^{\infty}\sum_{m''=-l''}^{l''} C_{l'm',l''m'',lm} \times i^{l'-l''} j_{l'}(kr) j_{l''}(kr)\frac{\rho_0}{2}\left[\frac{1}{\rho_0^2 c^2}P_{l'm'}(k)P^*_{l''m''}(k) + \sum\nolimits_{a\in\{x,y,x\}} U^a_{l'm'}(k)U^{a*}_{l''m''}(k)\right], \tag{28}$$

where $$U^x_{lm}, U^y_{lm}, \text{ and } U^z_{lm}$$

denote the x, y anu z components of the SHCs of the particle velocity, respectively.

Note that, due to the sum of the product of spherical Bessel functions of different orders in (26) and (28), there may, for example, be no straightforward way to compensate for the radial dependencies of the discussed SHCs. However, one can remove the radial dependency using radial averaging, or, for example, generally speaking weighted spatial averaging, e.g. direction independent spatial average, for example using radial averaging, according to embodiments of the invention as shown in the next section.

IV. Generalized Intensity Vector. And Energy Density Accoring to Aspects of the Invention In the previous section, we discussed expressions for the SHCs of the intensity vector (26) and energy density (28) at one specific radius r. In this section according to embodiments of the invention, we consider spatial averaging of the intensity vector and energy density. The motivation is that, because the expressions for the intensity vector and energy density of plane-waves (8), (9) and diffuse sound (12), (13) are independent of the position, spatial averaging might help to increase the accuracy for DOA and diffuseness estimation. Using (26), (28) and direction-independent spatial averaging according to an aspect of the invention, we define a generalized intensity vector and energy density which may contain linear combinations of the SHCs of the sound pressure and particle velocity.

In this section, we, for example, optionally assume that the sound pressure consists of incident contributions only or that radiating contributions can be compensated for, as discussed in Sec. III A.

A. Spatial Averaging

Weighted spatial averaging of the intensity vector and energy density using a real valued spatial weighting function w is considered according to embodiments of the invention.

$$I_w(k) = \int_{\mathbb{R}^3} w(r, k) I(r, k) dV \tag{29}$$

$$E_w(k) = \int_{\mathbb{R}^3} w(r, k) E(r, k) dV. \tag{30}$$

Here, $\int_{\mathbb{R}^3} f(r)dV$ devotes the volume integral of f over r. The weighting function may be or for example even should be normalized such that $\int_{\mathbb{R}^3} w(r, k)dV$ is finite.

Assuming that the SHE of w exists, it can be expressed via its SHCs as follows:

$$w(r, k) = \sum_{l=0}^{L_W} \sum_{m=-l}^{l} W_{lm}(r, k) Y_{lm}(\Omega) = \sum_{l=0}^{L_W} \sum_{m=-l}^{l} W_{lm}^*(r, k) Y_{lm}^*(\Omega), \tag{31}$$

where we used that w(r, k) is real valued and assumed that the SHCs are zero or for example negligible for orders we used $1 > L_w$. Inserting (31) into (29) and (30), yields:

$$\begin{aligned} I_w(k) &= \int_{\mathbb{R}^3} w(r, k) I(r, k) dV = \int_{\mathbb{S}^2} \int_0^\infty \sum_{l=0}^{L_W} \sum_{m=-l}^{l} W_{lm}^*(r, k) I(r, k) Y_{lm}^*(\Omega) dV \\ &= \sum_{l=0}^{L_W} \sum_{m=-l}^{l} \int_0^\infty W_{lm}^*(r, k) I_{lm}(r, k) r^2 dr \end{aligned} \tag{32}$$

$$E_w(k) = \sum_{l=0}^{L_W} \sum_{m=-l}^{l} \int_0^\infty W_{lm}^*(r, k) E_{lm}(r, k) r^2 dr; \tag{33}$$

where we used $dV = r^2 dr d\Omega$ and assumed convergence of the integrals involved. One can see that the spatially weighted intensity vector and energy density contain a weighted sum of the SHCs of the respective quantities and a radial averaging, which may be an example for spatial averaging.

B. Direction-Independent Spatial Averaging

Different spatial weighting functions may be considered. Optionally, e.g. for simplification, in this disclosure, we restrict to the special case where the spatial weighting function is direction-independent, i.e., $$w(r, k) \equiv w(r, k) \Longrightarrow W_{lm}^*(r, k) = \sqrt{4\pi}\, w(r, k) \delta_{l0} \delta_{m0} \tag{34}$$

Yet again, it is to be noted that aspects of the invention are not limited to direction-independent weighting functions. Usage of such weighting functions is to be seen as an example to enable a good understanding for the man skilled in the art and also bring along some advantages. Therefore, for example direction dependent weighting functions may also be used in embodiments of the invention. In this case, e.g., wherein the spatial weighting function is direction-independent, we get:

$$\begin{aligned} I_w(k) &= \int_0^\infty \sqrt{4\pi}\, w(r, k) I_{00}(r, k) r^2 dr \\ &= \int_0^\infty w(r, k) (4\pi)^{\frac{5}{2}} \sum_{l=0}^{\infty} \sum_{m=-l}^{l} \sum_{l'=0}^{\infty} \sum_{m'=-l'}^{l'} C_{lm,l'm',00} i^{l-l'} j_l(kr) j_{l'}(kr) U_{lm}(k) P_{l'm'}^*(k) r^2 dr \\ &= \sum_{l=0}^{\infty} \sum_{m=-l}^{l} \left[ \int_0^\infty w(r, k) (4\pi)^2 j_l^2(kr) r^2 dr \right] U_{lm}(k) P_{lm}^*(k) \end{aligned} \tag{35}$$

-continued $$= \sum_{l=0}^{\infty} \sum_{m=-l}^{l} G_l(k) U_{l'm'}(k) P^*_{lm}(k)$$

$$E_w(k) = \sum_{l=0}^{\infty} \sum_{m=-l}^{l} G_l(k) \frac{\rho_0}{2} \left( \frac{|P_{lm}(k)|^2}{\rho_0^2 c^2} + \|U_{lm}(k)\|_2^2 \right), \tag{36}$$

where we used the fact that $C_{lm,l'm',00} = \frac{1}{\sqrt{4\pi}} \delta_{ll'} \delta_{mm'}$ and defined $$G_l(k) = (4\pi)^2 \int_0^{\infty} w(r, k) j_l^2(kr) r^2 dr. \tag{37}$$

Note, that the SHCs of the particle velocity $U_{lm}$ can for example only be derived up to order L−1, where L is the maximum order of the SHCs of the sound pressure. Therefore, the Gains $G_1$ may be or in some cases even have to be zero or negligible for order l>L−1.

As an example, let us consider the following radial averaging function:

$$w(r, k) = \begin{cases} k^2 / \left[(4\pi)^2 R\right] & \text{if } r \le R \\ 0 & \text{else} \end{cases}. \tag{38}$$

Using (37), the relation between spherical Bessel-functions j; and Bessel-functions Jv, as well as the integral formula for $$\int_0^x t J_v^2(t) dt^{32},$$

one can derive:

$$G_l(k) = \sum_{o=0}^{\infty} (2l + 3 + 4o) j_{l+1+2o}^2(kR). \tag{39}$$

Figure 6:
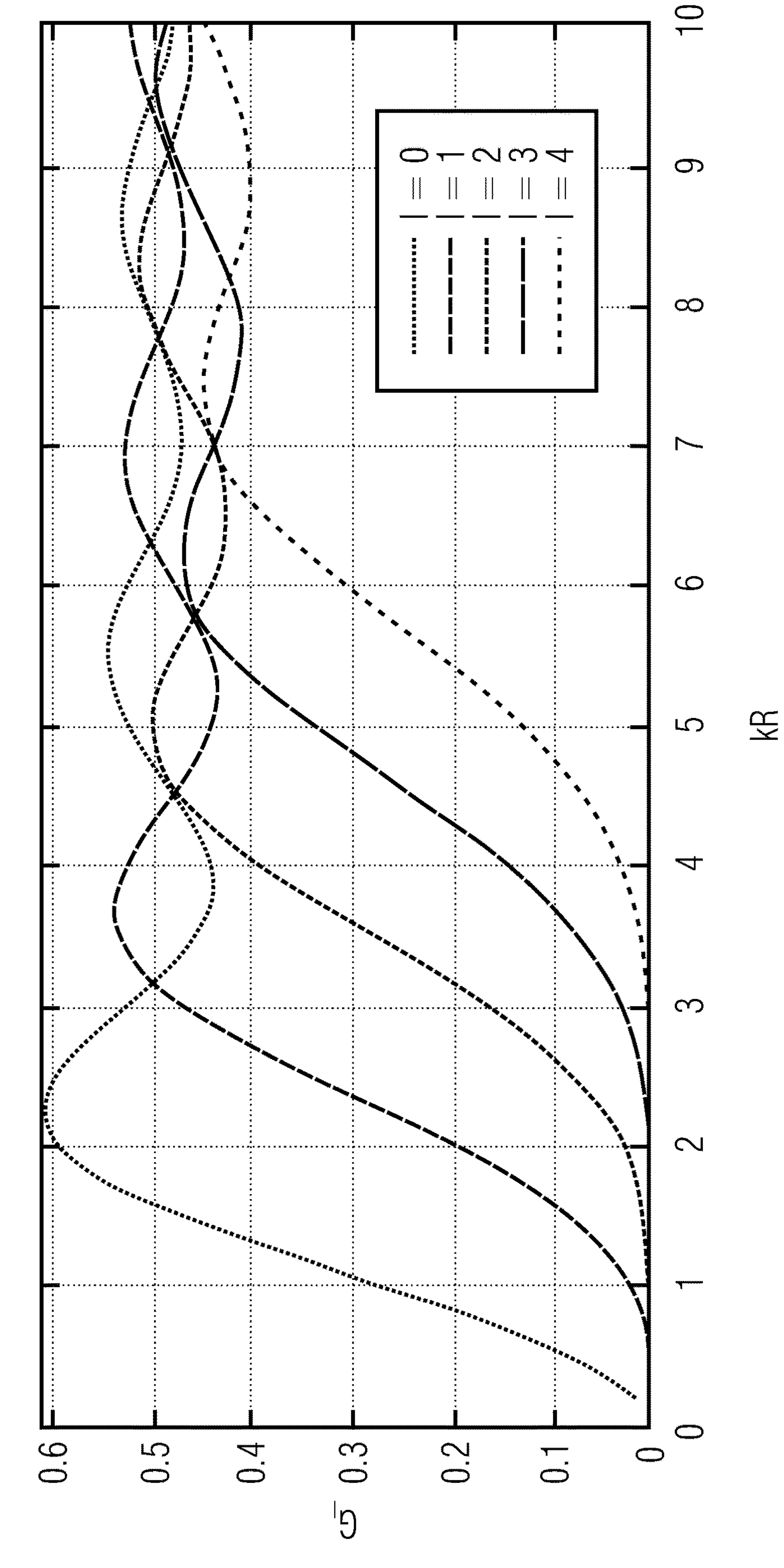
FIG. 6 shows an example of weights $G_l$ according to embodiments of the invention.

FIG. 6 shows an example of weights $G_1$, corresponding to radial weights given by (38), according to embodiments of the invention. In FIG. 6, these weights are shown for different order l and values of kR. The sum in (39) has been limited to o≤50, for practice reasons. This is appropriate for kR<<1+1+2·50, due to the decay behavior of the spherical Bessel-functions. One can see that the weight G becomes relevant for kR>l and stabilizes around $G_l$~0.5 for large kR.

C. Order-Dependent Spatial Averaging

Finding appropriate weights w which satisfy $G_l$≈0 for l≥L may be difficult. Hence, according to embodiments of the invention, we propose to choose the order-dependent gains $G_l$ directly. To make the difference between the spatially weighted intensity vector $I_w$, and energy density $E_w$ more explicit, we denote the corresponding quantities which are derived by choosing $G_l$ instead of w by $$I_g(k) = \sum_{l=0}^{L-1} \sum_{m=-l}^{l} G_l(k) U_{l'm'}(k) P^*_{lm}(k) \tag{40}$$

$$E_g(k) = \sum_{l=0}^{L-1} \sum_{m=-l}^{l} G_l(k) \frac{\rho_0}{2} \left( \frac{|P_{lm}(k)|^2}{\rho_0^2 c^2} + \|U_{lm}(k)\|_2^2 \right), \tag{41}$$

with g=[$G_0$, . . . , $G_{L-1}$]$^T$. We refer to these quantities as generalized intensity vector and energy density, respectively in the following.

Let us introduce the following vector notation $$p(k) = [P_{00}(k), P_{1-1}(k), \dots, P_{LL}(k)]^T \tag{42}$$

$$u^a(k) = \left[U_{00}^a(k), U_{1-1}^a(k), \dots, U_{(L-1)(L-1)}^a(k)\right]^T$$

for a∈{x, y, z} which are $(L+1)^2$-dimensional and $L^2$-dimensional vectors of SHCs, respectively. The coefficients in (22), which relate $u^a$ to p, can be represented as elements of three $L^2 \times (L+1)^2$-dimensional matrices $D^x$, $D^y$, $D^z$. Moreover, we define the $L^2 \times (L+1)^2$-dimensional matrix $D^0$ as the identity matrix for the first $L^2$ columns and zero for the remaining columns. The relation (23) can be expressed in matrix-vector notation as follows:

$$u^a(k) = -\frac{1}{\rho_0 c} D^a p(k) \text{ for } a \in \{x, y, z\}. \tag{43}$$

The generalized intensity vector (40) and energy density (41) can be written in the following form:

$$I_g^a(k) = -\frac{1}{\rho_0 c} \left[D^0 p(k)\right]^H G(k) D^a p(k) \tag{44}$$

$$E_g(k) = \frac{1}{2\rho_0 c^2} \sum_{\alpha \in \{0,x,y,z\}} [D^\alpha p(k)]^H G(k) D^\alpha p(k) \tag{45}$$

for a∈{x, y, z} where $(\bullet)^H$ denotes the conjugate transpose and G(k) is the $L^2 \times L^2$ diagonal matrix which has 2l+1 copies of the weights G(k) on its diagonal, i.e., $[G(k)]_{lm,l'm}=G_1(k)\,\delta_{ll'}\delta_{mm'}$.

Let us define the covariance matrix of the SHCs of p(k) as $\Phi_p(k)=\varepsilon\{p(k)\, p^H(k)\}$, where we, for example optionally, assumed that p(k) is a zero-mean random vector. The expected generalized intensity vector (44) and energy density (45) can be expressed as follows:

$$\mathcal{E}\{I_g^a(k)\} = -\frac{1}{\rho_0 c} tr\{G(k) D^a \Phi_p(k) D^{0H}\} \tag{46}$$

$$\mathcal{E}\{E_g(k)\} = \frac{1}{2\rho_0 c^2} \sum_{\alpha \in \{0,x,y,z\}} tr\{G(k) D^\alpha \Phi_p(k) D^{\alpha H}\} \tag{47}$$

for a=x, y, z, where tr{•} denotes the trace-operator.

In the next section, we discuss how to employ the generalized intensity vector and employ the generalized density for DOA and diffuseness estimation according to embodiments of the invention. Note, that in[16], the DOA-vector and diffuseness are computed for different directional sectors by weighting the sound pressure with different directional gains. In principle, this can be interpreted as another special case of the weighted spatial averaging of the intensity vector and energy density. However, according to embodiments of the invention, higher-order SHCs may, for example, be incorporated by using direction-independent spatial weights.

V. Applications According to Aspects of the Invention

A. Sound Field Model

Let us consider a sound field consisting of a plane-wave component S and a diffuse component D. Additionally, we incorporate sensor-noise N. The SHCs of the compound sound field become:

$$P_{lm}(k) = S_{lm}(k) + D_{lm}(k) + N_{lm}(k) \qquad (48)$$

$$p(k) = s(k) + d(k) + n(k)$$

for l=0, . . . , L and m=−l, . . . , l, where we used a vector notation of the SHCs up to order L analogously to (42). As $S_{lm}$ denote the SHCs of a plane-wave, we get $S_{lm}(k)=S(k)\sqrt{4\pi}Y^*_{lm}(\Omega_s)$, where S(k) and $\Omega_s$ denote the complex amplitude and DOA of the plane-wave, respectively[21,25]. Assuming for example optionally that the plane-wave, diffuse and sensor-noise components are mutually independent, the covariance matrix of the SHCs of p(k) decomposes as:

$$\Phi_p(k) = \mathcal{E}\{p(k)p^H(k)\} = \Phi_s(k) + \Phi_d(k) + \Phi_n(k), \qquad (49)$$

where $\Phi_s$, $\Phi_d$ and $\Phi_n$ denote the covariance matrices of the plane-wave, diffuse and sensor-noise components respectively. The elements of these covariance matrices take the following form[21]:

$$[\Phi_s]_{lm,l'm'}(k) = 4\pi\phi_S(k)Y^*_{lm}(\Omega_s)Y_{l'm'}(\Omega_s) \qquad (50)$$

$$[\Phi_d]_{lm,l'm'}(k) = \phi_D(k)\delta_{ll'}\delta_{mm'}$$

$$[\Phi_n]_{lm,l'm'}(k) = \phi_N(k)|b_l(kr)|^{-2}\delta_{ll'}\delta_{mm'},$$

where $\phi_s(k)$, $\phi_d(k)$ and $\phi_N(k)$ are denoted as plane-wave PSD, diffuse PSD and noise PSD, respectively and the mode-strengths $b_l(kr)$ are discussed in Section III A.

Using the expressions for the covariance matrices in (50), one can derive the following expressions for the expected generalized intensity vector (46) and energy density (47):

$$\mathcal{E}\{I_g^a(k)\} = -\frac{I}{\rho_0 c}\phi_S(k)n^a(\Omega_s)c_1(k) \qquad (51)$$

$$\mathcal{E}\{E_g(k)\} = \frac{1}{\rho_0 c^2}[(\phi_S(k) + \phi_D(k))c_1(k) + \phi_N(k)c_2(k)],$$

where we used the property $$\sum_{m=-l}^{l}\sum_{a\in\{x,y,z\}}\sum_{l'=l\pm 1}\sum_{m'=m-1}^{m+1}|D^a_{lm,l'm'}|^2 f_{l'} = lf_{l-1} + (l+1)f_{l+1} \qquad (52)$$

which can be shown using (22) and defined:

$$c_1(k) = \sum_{l=0}^{L-1}(2l+1)G_l(k) \qquad (53)$$

$$c_2(k) = \sum_{l=0}^{L-1}\frac{G_l(k)}{2}[(2l+1)f_l(k) + lf_{l-1}(k) + (l+1)f_{l+1}(k)]$$

with $f_{-1}(k) = 0$ and $f_l(k) = |b_l(kr)|^{-2}$ for $l \geq 0$.

For the remaining sections of this work, we define the signal-to-diffuse ratio $I_g$, the diffuseness ψ and the signal-to-noise ratio ξ as follows:

$$\Gamma(k) = \frac{\phi_S(k)}{\phi_D(k)}\ \psi(k) = \frac{\phi_D(k)}{\phi_S(k) + \phi_D(k)}\ \xi(k) = \frac{\phi_S(k)}{\phi_N(k)|b_0(kr)|^{-2}}. \qquad (54)$$

B. Expectation Estimation According to Aspects to the Invention

Let A denote a random scalar, vector or matrix such as e.g. $pp^H$, $I_g$ or $E_g$. Assume we have N observations $A_1, \ldots, A_N$ of A. According to embodiments of the invention, the expectation of A may, for example, be estimated using the commonly used recursive averaging, i.e., via:

$$\widehat{\mathcal{E}\{A\}_n} = \begin{cases} A_1 & \text{if } n = 1 \\ +(1-\beta)A_n & \text{else,} \end{cases} \qquad (55)$$

where β∈[0,1[ is a recursive smoothing parameter. The notation $\widehat{(\cdot)}$ is omitted for brevity in the remaining parts of this section.

C. Direction-of-Arrival Estimation

Comparing the generalized intensity vector (44) to the extended pseudointensity vector (PIV) 17, one can see that, for $g(k)=[1, \ldots, 1]^T$, $I_g(k)$ becomes proportional to the extended PIV. Moreover, for L=1, $I_g(k)$ becomes proportional to the ordinary PIV[5]. The DOA of a plane-wave can be estimated from the direction of $I_g(k)$. To make it optionally more robust with regard to noise, according to embodiments of the invention, $\mathcal{E}\{I_g(k)\}$ may, for example, be used instead. This may, for example, cancel or reduce contributions from the diffuse and sensor-noise components of the sound field, as can be seen from (51). Therefore, according to embodiments of the invention, we propose the following generalized intensity-vector-based DOA estimator:

$$\widehat{n^a(\Omega_s)} = -\frac{\Re\{\mathcal{E}\{I_g^a(k)\}\}}{\|\Re\{\mathcal{E}\{I_g\}\}\|_2} = \frac{\Re\{tr\{G(k)D^a\Phi_p(k)D^{0H}\}\}}{\sqrt{\sum_{b\in\{x,y,z\}}|\Re\{tr\{G(k)D^b\Phi_p(k)D^{0H}\}\}|^2}} \qquad (56)$$

for a∈{x, y, z}, wherein $n^x(\Omega_s)$, $n^y(\Omega_s)$ and $n^z(\Omega_s)$ denote the x-, y- and z-components of the DOA-vector and $\Re\{\bullet\}$ extracts the real part.

To make the DOA-estimation optionally more robust with regard to noise that exhibits a non-diagonal SHD coherence matrix, optionally, according to embodiments of the Invention, $\Phi_p$ may, for example, be replaced in (56) by $$v_1 v_1^H,$$

where $v_1$ denotes the dominant eigenvector of $\Phi_p$. For $g(k)=[1, \ldots, 1]^T$, this results in the DOA-vector Eigenbeam ESPRIT for estimating a single DOA, as discussed in[17]. For conciseness, this eigenvector-based method is not investigated further in this work. Yet, it is to be noted; that this eigenvector-based method may optionally be used with embodiments according to the Invention.

D. Diffuseness Estimation According to Aspects of the Invention

Assuming, for example optionally, that the sensor-noise is negligible, the diffuseness $\psi$, defined in (54), may, for example, be estimated according to embodiments of the Invention, using the expressions for the generalized intensity vector and energy density in (51).

Hence, we propose for example the following generalized diffuseness estimator according to embodiments of the Invention:

$$\hat{\psi}(k) = 1 - \frac{\|\mathcal{E}\{I_g(k)\}\|_2}{c\mathcal{E}\{E_g(k)\}} = 1 - \frac{\sqrt{\sum_{a\in\{x,y,z\}}\left|tr\left\{G(k)D^n\Phi_p(k)D^{0H}\right\}\right|^2}}{\frac{1}{2}\sum_{\alpha\in\{x,y,z\}} tr\left\{G(k)D^\alpha\Phi_p(k)D^{\alpha H}\right\}}. \tag{57}$$

It can be shown that, for L=1 and g=1, (57) reduces to the DirAC diffuseness measure[1].

E. Choice of the Weights According to Aspects of the Invention

In this section, we discuss different possible choices of the weights g, according to embodiments of the Invention. The for example simplest choice may, for example, be:

$$g(k) = [G_0(k), \ldots, G_{L-1}(k)]^T = [1, \ldots, 1]^T \tag{58}$$

which is denoted as equal weighting in the following.

For the DOA estimation, the diffuse and sensor-noise, theoretically do not contribute to the estimator as $\varepsilon\{\Re\{I_g\}\}=0$ for diffuse sound and sensor-noise. In practice, however, the covariance matrix $\Phi_p$ may, for example, be estimated from observations of p, hence, yielding estimation errors which translate to estimation errors of $\varepsilon\{\Re\{I_g\}\}$. Therefore according to embodiments of the invention, we propose to choose the weights g based on the variance of $\{\Re\{I_g\}\}$. To this end, consider the following optional cost-function:

$$\mathcal{J}(g, \lambda) = \mathcal{E}\left\{\|\mathrm{K}\{I_g\} - \mathcal{E}\{\mathrm{K}\{I_g\}\}\|_2^2\right\} + \lambda\left(\sum_{l=0}^{L-1} G_l(2l+1) - 1\right), \tag{59}$$

where the dependency on the wavenumber k is omitted for brevity in this and the subsequent section. The first term in (59) contains the variance of $\{\Re\{I_g\}\}$, the second term is a for example optional constraint which may, for example, avoid or for example even avoids the trivial solution g=0 and $\lambda$ denotes the corresponding Lagrange-multiplier.

Let us define the per-order intensity vectors $I_i$ as follows:

$$I_l = -\frac{1}{\rho_0 c}\sum_{m=-l}^{l} P_{lm}^{*} \sum_{l'=l\pm 1} \sum_{m'=m-1}^{m+1} d_{lm,l'm'} P_{l'm'} \tag{60}$$

such that $$I_g = \sum_{l=0}^{L-1} G_l I_l.$$

Moreover, let us define the L×L matrix $\Sigma$ and L-dimensional vector f with elements:

$$[\Sigma]_{ll'} = (\mathrm{R}\{I_l\} - \mathcal{E}\{R\{I_l\}\})^T(\mathrm{R}\{I_{l'}\} - \mathcal{E}\{\mathrm{R}\{I_{l'}\}\}) \tag{61}$$

$$[f]_l = 2l+1 \text{ for } l, l' = 0, \ldots, L-1.$$

Using these definitions, the cost-function (59) can be rewritten as follows:

$$\mathcal{J}(g, \lambda) = g^T\mathcal{E}\{\Sigma\}g + \lambda\left(f^Tg - 1\right) \tag{62}$$

The following optimal solution for g can be derived:

$$g_{opt} = E\{\Sigma\}^{-1}f/\left(f^TE\{\Sigma\}^{-L}f\right). \tag{63}$$

Note, that this solution also allows negative weights $G_l$. We experimentally found, that, according to aspects of the invention, the DOA-estimation performance can for example be optionally slightly increased by restricting the weights to be positive. In principle, this restriction can be implemented by adding inequality constraints of the form $G_l > G_{min}$ to the minimization problem, where $G_{min}$ denotes a lower bound. An optimal solution can be found using the Karush-Kuhn-Tucker (KKT) conditions33. However, we found that lower-bounding the weights (63) directly, may yield almost identical DOA-estimation performance as the KKT-based solution and has lower computational complexity. Hence, according to embodiments of the invention, we choose the following weights:

$$G_l = \max\{[g_{opt}]_l, G_{min}\} \tag{64}$$

for l=0, . . . , L−1. This choice of the weights is denoted as minimum-variance weights in the following. It is to be noted that this choice of weights may, for example, be optional for embodiments of the invention. Therefore, the before mentioned usage of constraints for a cost function may also be applied for weight calculation according to embodiments of the invention. In addition, usage of the KKT conditions is to be seen as an example since a plurality of optimization methods may, for example, be used with aspects of the invention, for example in order to determine the weights.

VI. Evaluation

A. Simulation Setup

For the evaluation of the proposed DOA and diffuseness estimators according to embodiments of the Invention, SHD signals containing a plane-wave component, a diffuse component and sensor-noise were simulated as discussed in Section V A.

The plane-wave component was simulated by generating a complex white Gaussian noise sequence $S_1, S_2, \ldots, S_N$ with variance $\phi_s=1$ and then multiplying the sequence with, the SHCs of a unit-amplitude plane-wave with DOA $\Omega_s$[21], i.e., $$s_n = \sqrt{4\pi}\, S_n y^*(\Omega_s) \text{ for } n = 1, \ldots , N, \tag{65}$$

where $$y^*(\Omega_s) = [Y_{00}^*(\Omega_s), \ldots , Y_{LL}^*(\Omega_s)]^T$$

and $s_n$ is the n'th observation of the plane-wave SHCs vector s.

The diffuse component was simulated by generating $(L+1)^2$ independent complex white Gaussian noise sequences with variance $\phi_D=\phi_S/T$, where I is the adjustable signal-to-diffuse ratio (SDR). This yielded a sequence of $(L+1)^2$-dimensional vectors $d_1, \ldots , d_N$ representing the vector of SHCs of the diffuse sound.

The sensor-noise was simulated by first generating $(L+1)^2$ independent complex white Gaussian noise with sequences unit variance, yielding sequences $\hat{N}_{lm,1}, \ldots , \hat{N}_{lm,N}$ for $l=0, \ldots , L$ and $m=-l, \ldots , l$. These sequences were then multiplied by the corresponding regularized inverse mode-strengths and the standard deviation of the noise, i.e., $$N_{lm,n} \sqrt{\phi_N}\, [b_l(kr)]_{reg}^{-1} \hat{N}_{lm,n} \tag{66}$$

for $l=0, \ldots , L$ and $m=-l, \ldots , l$ and $n=1, \ldots , N$, where $\phi_N$ is the noise variance, the mode-strengths $b_l(kr)$ are given in (18) and $$[b_l(kr)]_{reg}^{-1} = \frac{b_l^*(kr)}{|b_l(kr)|^2 + \lambda_{reg}}. \tag{67}$$

In this disclosure, as an optional example, the mode-strengths of a rigid array and $\lambda_{reg}=10^{-3}$ were used according to embodiments of the invention. The noise variance was computed via $$\phi_N = \frac{\phi_S}{\xi \left| [b_0(kr)]_{reg}^{-1} \right|^2},$$

where $\xi$ is the adjustable signal-to-noise ratio (SNR).

For all simulations, N=1000, $\Omega_s=(90°, 0°)$ and $\beta=0.7$ were chosen. The lower bound for the minimum-variance weights (64) was set to $G_{min}=10^{-12}$.

B. Doa Estimation

Figure 7:
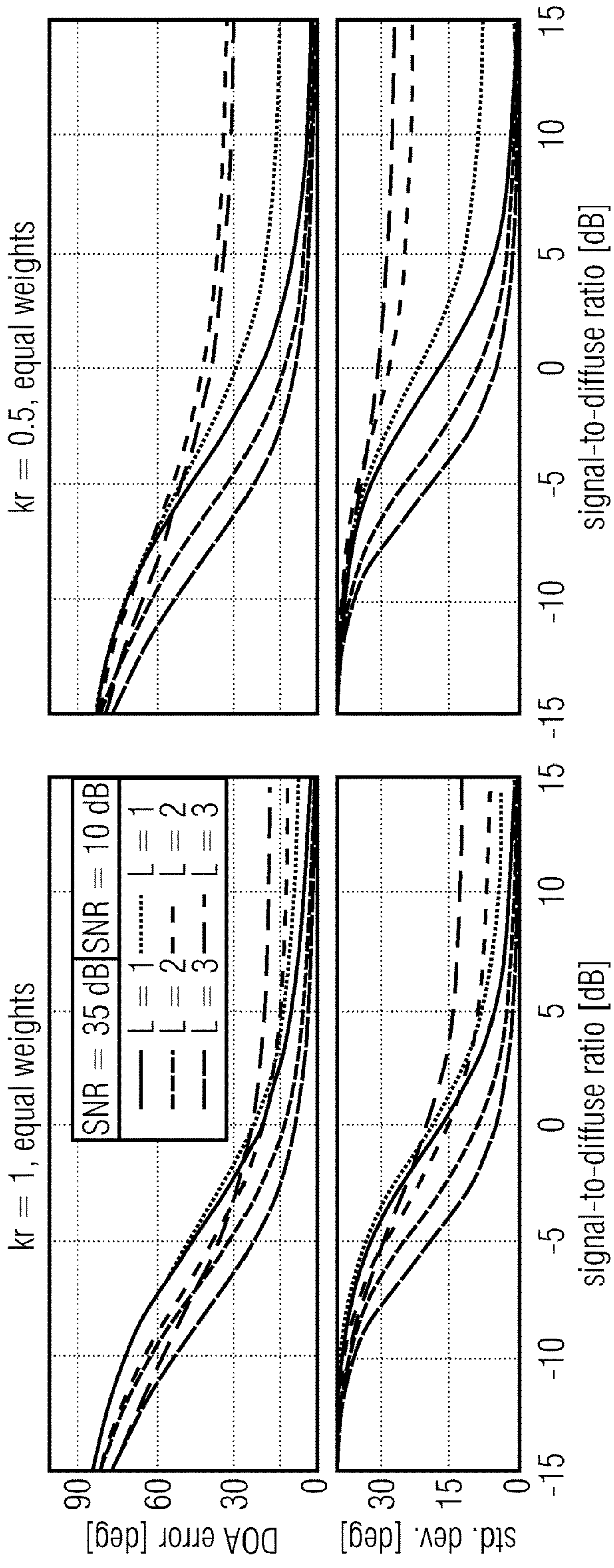
FIG. 7 shows examples of DOA estimation errors for equal weighting according to embodiments of the invention.

FIG. 7 shows examples of DOA estimation errors for equal weighting according to embodiments of the invention. In FIG. 7 examples for, the mean (e.g. DOA Error in degree) and standard deviations (e.g. Std. dev. in degree) of the DOA estimation error for an example of the proposed generalized intensity vector (GIV)-based method (56) according to embodiments of the invention are shown for equal weighting and different SDRs, SNRs, kr-values and orders L. Note, that the low SNR-case (SNR=10 dB, e.g. shown with the dashed plots) may rarely occur in practice when high-quality microphones are used. This scenario was only investigated to emphasize the influence of sensor-noise on the DOA-estimation accuracy. For L=1 the GIV-based DOA estimation reduces to the PIV-based DOA estimation. Hence, the results for L=1 serve as the baseline for this evaluation.

Figure 9:
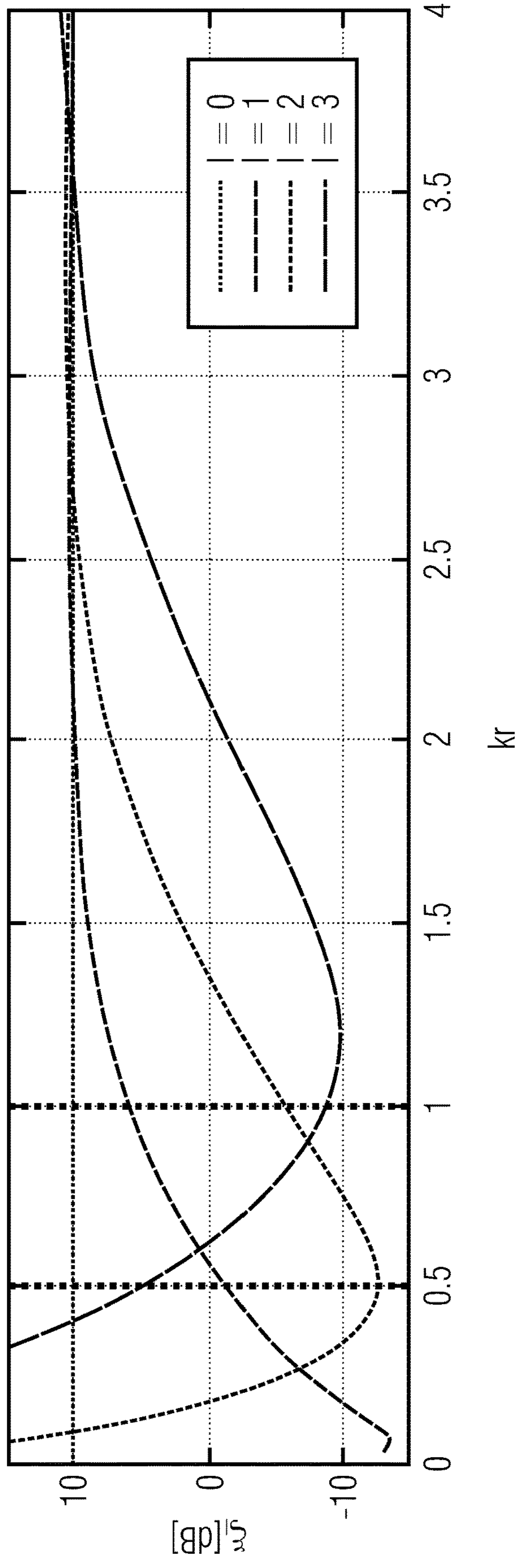
FIG. 9 shows an example of an effective SNR for SNR=10 dB according to embodiments of the invention.

One can see that, for SNR=35 dB, the DOA estimation accuracy increased with increasing order L. However, for SNR=10 dB, the higher-order (L>1) DOA-estimators became more sensible with regard to the sensor-noise at positive SDRs for kr=1 and for SDRs larger than —7 dB for kr=0.5. The reason for this is that, due to the mode-strength compensation, the effective SNR can be much lower than $\xi$ for the higher-order SHCs of the signal. FIG. 9 shows an example of an effective SNR for SNR=10 dB according to embodiments of the invention. In FIG. 9, the effective SNR $$\xi l(kr) = \phi_S / \left(\phi_N \left| [b_1(kr)]_{reg}^{-1} \right|^2\right.$$

is shown as a function of kr for SNR=10 dB and different l.

Figure 8:
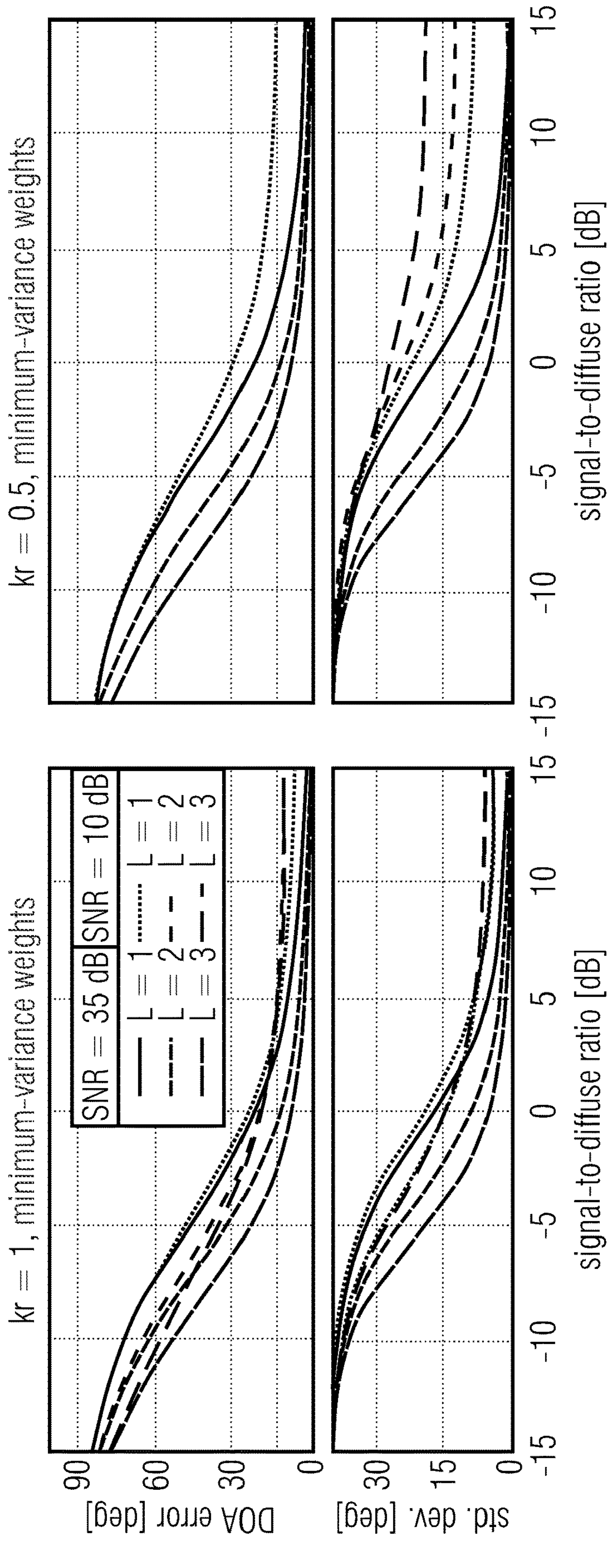
FIG. 8 shows examples of DOA estimation errors for minimum-variance weighting according to embodiments of the invention.

FIG. 8 shows examples of DOA estimation errors for minimum-variance weighting according to embodiments of the invention. In FIG. 8 examples of, the analogous results for the GIV-based DOA estimation errors are shown for minimum-variance weighting. One can observe, that the higher-order DOA estimators were considerable less sensible with regard to the sensor noise as opposed to the results for the equal weighting in FIG. 7. Hence, one can conclude that the minimum-variance weighting according to embodiments of the invention helps to improve the DOA estimation accuracy for example when a significant amount of sensor noise is present in the signal.

Figure 10:
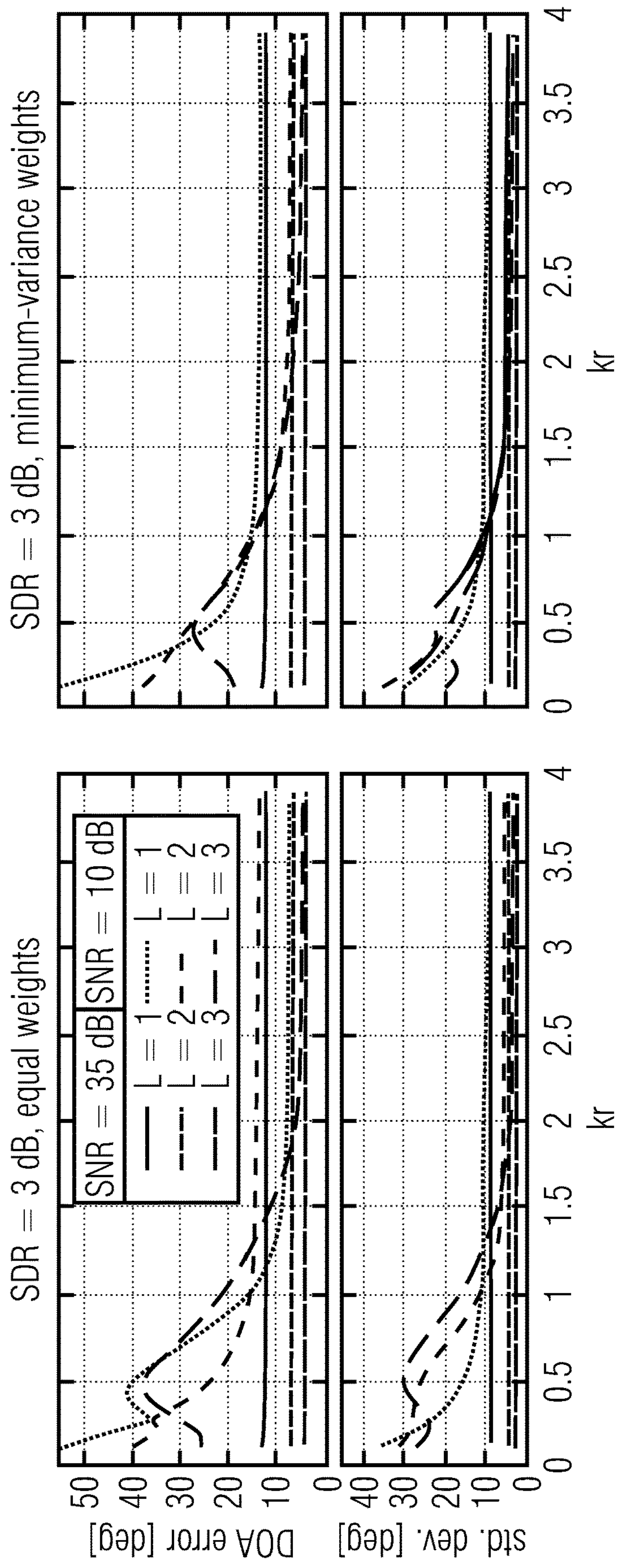
FIG. 10 shows an example of DOA estimation errors for different kr-values according to embodiments of the invention.

FIG. 10 shows an example of DOA estimation errors for different κρ-values according to embodiments of the invention. In FIG. 10 examples of, the DOA estimation errors are shown as a function of kr for different orders L, SNRs and for SDR=3 dB. For SNR=35 dB, the DOA estimation accuracy increases with increasing L for all evaluated kr-values, while, for SNR=10 dB and kr≥2, the inclusion of higher-order SHCs for the DOA estimation can deteriorate the performance. Therefore, in a practical implementation, optionally, according to embodiments of the invention one may choose the maximum order L dependent on the frequency, which is proportional to kr. Note, however, that the SNR is usually much higher than 10 dB in practical scenarios. The minimum-variance weighting according to embodiments of the invention yields higher DOA estimation accuracy, compared to the equal weighting, only for L>1, SNR=10 dB and kr≤2. For L=3 and SNR=35 dB, the equal weighting method performs slightly better than the minimum-variance method.

C. Diffuseness Estimation

For the diffuseness estimators discussed in this section, we assume that the sensor-noise is negligible. Therefore, we use the noiseless ground-truth diffuseness $$\psi_{th} = \phi_D/(\phi_S + \phi_D) \tag{68}$$

for the performance evaluation.

1. Proposed Diffuseness Estimator

Figure 11:
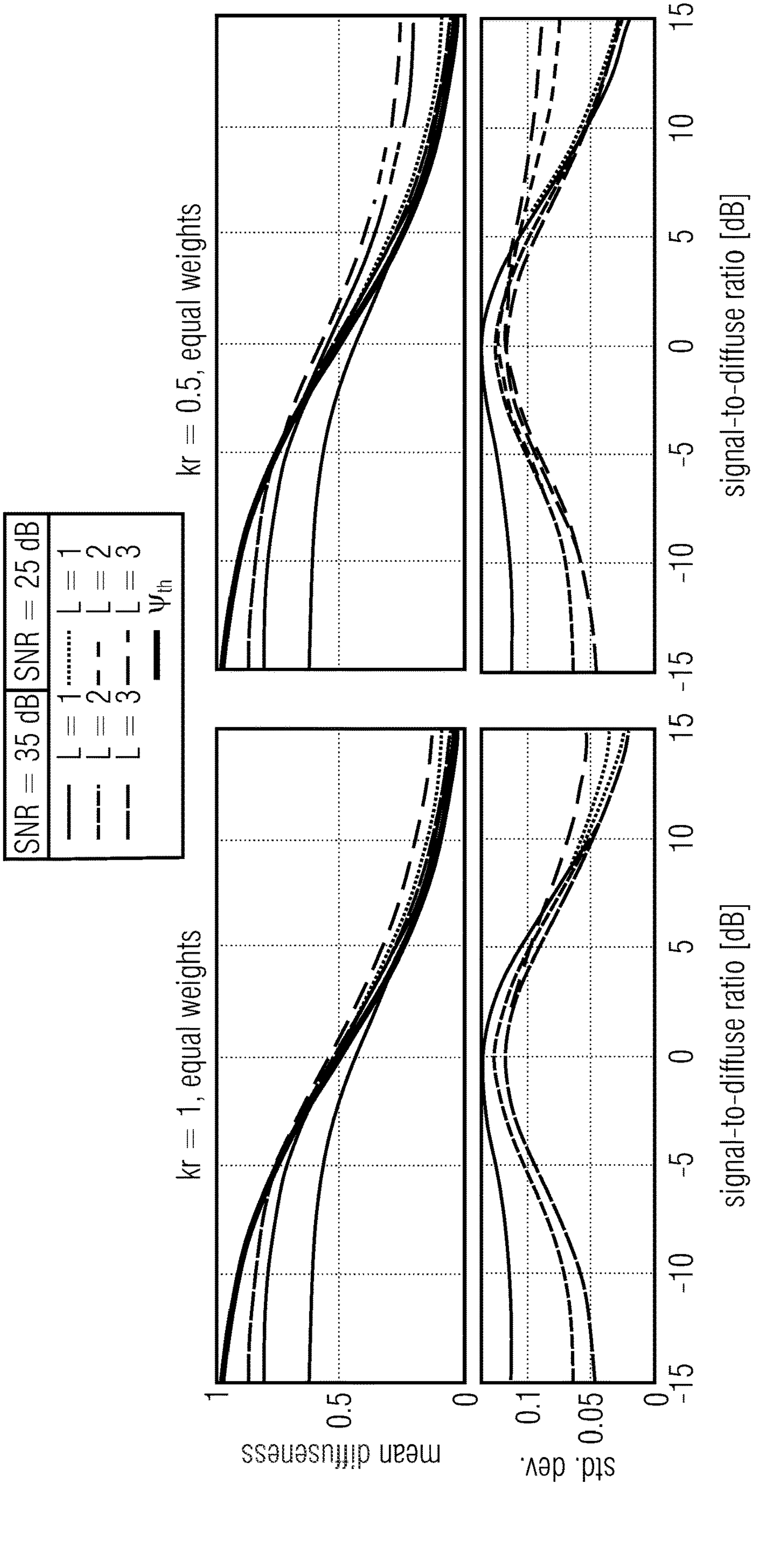
FIG. 11 shows an example of an estimated diffuseness for equal weighting according to embodiments of the invention.

FIG. 11 shows an example of an estimated diffuseness for equal weighting according to embodiments of the invention. In FIG. 11 examples of, the mean and standard deviations of the proposed diffuseness estimator (57), according to embodiments of the invention, are shown for equal weighting and different SDRs, SNRs, kr-values and orders L. Note, that the estimator is biased in the presence of sensor-noise. As discussed, we assume that the sensor-noise is negligible which is appropriate for high SNRs.

One can see, that the diffuseness estimation accuracy significantly increased for low SDRs when higher-order SHCs were incorporated (L>1). For larger SDRs, the accuracy deteriorated, in particular, for L>1, due to the influence of the sensor-noise, because the mode-strength compensation yields low effective SNRs for the higher-order SHCs as discussed in Sec. VIB. Therefore, the estimation errors increased with L at high SDRs. This, however was negligible for SNR=35 dB. In summary, we can conclude that, for low sensor-noise (SNR≥35 dB), the accuracy of the DirAC diffuseness estimator can be increased using the proposed method for L>1.

2. Comparison of Diffuseness Estimators

In this evaluation, we compare the proposed diffuseness estimator to other state-of-the-art SHD diffuseness estimators. The following methods are evaluated:

Proposed: The proposed diffuseness measure (57) according to an embodiment of the invention.

DirAC: Measure used in DirAC[1]. Equals proposed method for L=1.

CB: Coherence-based diffuseness estimator[14]. The same weighting of the modal SDRs as in[14] is used.

FN: Diffuseness based on the Frobenius-norm PSD estimator[34]. The diffuseness is computed from the estimated plane-wave and diffuse PSDs $$\hat{\phi}_S \hat{\phi}_D \text{ via } \hat{\psi} = \frac{\hat{\phi}_D}{\hat{\phi}_S + \hat{\phi}_D}.$$

TG: Thiele-Gover diffuseness measure[35], where the formulation described in[15] has been used and[48] almost uniformly distributed directions were chosen for the maximum-directivity beamformers.

We assume that the sensor-noise is negligible (i.e., $\phi_N=0$ for all methods).

Note, that the CB, TG and FN methods require an estimate of $\Omega_s$ for the diffuseness estimation. For this purpose, either the oracle (true) DOA or the GIV-based estimated DOA is used in the following evaluation.

In Tab. I examples of mean and standard deviations σ of the diffuseness error $|\hat{\psi}-\psi_{th}|$ are shown for different methods, SDRs and orders L, where oracle DOAs have been used for the CB, FN and TG methods. Results with lowest mean+σ are highlighted and "Avg." denotes the average results with regard to the three different SDRs.

In general, the CB method performed worst for low SDRs and best for high SDRs except for L=1, where the DirAC measure performed worst for SDR=−9 dB. The FN method performed best for SDR=−9 dB and overall (Avg.) best for L=1 and L=2. The TG measure performed best for SDR=0 dB and the proposed method had overall best performance for L=3. Hence, when the DOA is known, the proposed method is not necessarily the best choice as the FN method performs slightly better for L<3.

In Tab. II examples of the corresponding diffuseness errors are shown for the case where the DOA has been estimated with the GIV-based method. The diffuseness errors of the CB, FN and TG methods were slightly higher compared to the results with oracle DOA. For L=2, the proposed and FN methods yielded the same average performance. Note, however, that the proposed method does not require to estimate the DOA as opposed to the FN method. For L=3, the proposed method yielded overall best performance.

TABLE I

Diffuseness errors $|\hat{\psi} - \psi_{th}|$ for oracle (true) DOA, SNR = 25 dB and equal weighting. (example)

| | SDR | DirAC | CB | FN | TG |
|---|---|---|---|---|---|
| a) L = 1 | −9 dB | 0.28 ± 0.11 | 0.24 ± 0.11 | 0.11 ± 0.08 | 0.22 ± 0.09 |
| | 0 dB | 0.13 ± 0.08 | 0.13 ± 0.09 | 0.12 ± 0.09 | 0.11 ± 0.08 |
| | 9 dB | 0.04 ± 0.04 | 0.04 ± 0.03 | 0.05 ± 0.05 | 0.05 ± 0.04 |
| | Avg. | 0.15 ± 0.08 | 0.14 ± 0.09 | 0.09 ± 0.07 | 0.13 ± 0.07 |
| | SDR | Proposed | CB | FN | TG |
| b) L = 2 | −9 dB | 0.11 ± 0.07 | 0.24 ± 0.08 | 0.06 ± 0.04 | 0.16 ± 0.05 |
| | 0 dB | 0.10 ± 0.07 | 0.12 ± 0.08 | 0.10 ± 0.08 | 0.09 ± 0.06 |
| | 9 dB | 0.06 ± 0.05 | 0.04 ± 0.04 | 0.08 ± 0.06 | 0.08 ± 0.06 |
| | Avg. | 0.09 ± 0.07 | 0.14 ± 0.07 | 0.08 ± 0.06 | 0.11 ± 0.06 |
| c) L = 3 | −9 dB | 0.06 ± 0.05 | 0.24 ± 0.08 | 0.05 ± 0.04 | 0.15 ± 0.04 |
| | 0 dB | 0.10 ± 0.07 | 0.12 ± 0.08 | 0.10 ± 0.07 | 0.08 ± 0.06 |
| | 9 dB | 0.09 ± 0.07 | 0.04 ± 0.04 | 0.13 ± 0.08 | 0.13 ± 0.08 |
| | Avg. | 0.08 ± 0.06 | 0.13 ± 0.07 | 0.09 ± 0.07 | 0.12 ± 0.06 |

TABLE II

Diffuseness errors $|\hat{\psi} - \psi_{th}|$ for GIV-based DOA estimation, SNR = 25 dB and equal. (example)

| | SDR | DirAC | CB | FN | TG |
|---|---|---|---|---|---|
| a) L = 1 | −9 dB | 0.28 ± 0.11 | 0.33 ± 0.15 | 0.13 ± 0.10 | 0.22 ± 0.09 |
| | 0 dB | 0.13 ± 0.08 | 0.13 ± 0.09 | 0.13 ± 0.11 | 0.11 ± 0.08 |
| | 9 dB | 0.04 ± 0.04 | 0.04 ± 0.03 | 0.05 ± 0.04 | 0.05 ± 0.04 |
| | Avg. | 0.15 ± 0.08 | 0.17 ± 0.10 | 0.10 ± 0.09 | 0.13 ± 0.07 |
| | SDR | Proposed | CB | FN | TG |
| b) L = 2 | −9 dB | 0.11 ± 0.07 | 0.39 ± 0.18 | 0.07 ± 0.05 | 0.16 ± 0.05 |
| | 0 dB | 0.10 ± 0.07 | 0.12 ± 0.08 | 0.12 ± 0.10 | 0.09 ± 0.06 |
| | 9 dB | 0.06 ± 0.05 | 0.04 ± 0.04 | 0.08 ± 0.06 | 0.08 ± 0.06 |
| | Avg. | 0.09 ± 0.07 | 0.18 ± 0.12 | 0.09 ± 0.07 | 0.11 ± 0.06 |
| c) L = 3 | −9 dB | 0.06 ± 0.05 | 0.39 ± 0.19 | 0.08 ± 0.04 | 0.15 ± 0.04 |
| | 0 dB | 0.10 ± 0.07 | 0.12 ± 0.08 | 0.12 ± 0.10 | 0.08 ± 0.06 |
| | 9 dB | 0.09 ± 0.07 | 0.04 ± 0.04 | 0.13 ± 0.08 | 0.13 ± 0.08 |
| | Avg. | 0.08 ± 0.06 | 0.18 ± 0.12 | 0.11 ± 0.08 | 0.12 ± 0.06 |

In summary, we can conclude that the proposed diffuseness estimator outperformed the DirAC, CB and TG methods in average and had comparable performance to the FN method, with the benefit that no DOA estimation is required.

VII. Conclusion

We proposed, according to the embodiments of the invention, the generalized intensity vector and energy density by considering weighted spatial averaging of the intensity vector and energy density and expressing the result in terms of the SHCs of the sound pressure. As an, for example optional, intermediate step according to the embodiments of the invention, we derived an expression of the SHCs of the particle velocity in terms of the SHCs of the sound pressure which does not involve any radial dependency. The radial averaging, which may be an example for spatial averaging, of the spatially weighted intensity vector and energy density was expressed as an order-dependent weighting in the SHD, according to aspects of the invention.

As one possible application, we proposed DOA and diffuseness estimators based on the generalized intensity vector and energy density. These, estimators according to an embodiment of the invention, can be seen as natural higher-order extensions of the DOA and diffuseness estimators used in DirAC[1]. For equal weighting, the proposed DOA estimator reduces to the extended PIV discussed in[17]. We proposed to choose different order-dependent weights for the DOA estimator by minimizing the variance of the generalized intensity vector.

In the evaluation, we showed that the minimum-variance weights may yield lower DOA estimation errors compared to the equal weights for scenarios with significant sensor-noise. For the diffuseness estimation, we showed that the accuracy of the proposed estimator increases with the maximum order L when the sensor-noise is negligible. We compared the proposed diffuseness estimator to three different higher-order SHD diffuseness estimators. We showed that the proposed diffuseness estimator has compatible performance with regard to the other estimators with the benefit that the proposed estimator does not require to estimate the DOA for the diffuseness estimation. Moreover, for L=3 the proposed diffuseness estimator yielded overall lowest diffuseness errors compared to the other methods.

Appendix

In this appendix, we derive that the coefficients (21) which relate the SHCs of the particle velocity to the SHCs of the sound pressure are independent of the radius r and wavenumber k. To this end, we use two relations. First, the plane-wave expansion in terms of SHFs[27]:

$$e^{ikr^T n(\Omega_s)} = \sum_{l=0}^{\infty} 4\pi i^l j_l(kr) \sum_{m=-l}^{l} Y_{lm}^*(\Omega_s) Y_{lm}(\Omega). \tag{A.1}$$

Second, the recurrence relations of SHFs used in the DOA-vector Eigenbeam-ESPRIT[29]:

$$n^a(\Omega) Y_{lm}^*(\Omega) = \sum_{l'=l\pm1} \sum_{m'=m-1}^{m+1} D_{lm,l'm'}^a Y_{l'm'}^*(\Omega) \tag{A.2}$$

for $a \in \{x, y, z\}$, where the coefficients $$D_{lm,l'm'}^a$$

are given in (22). Moreover, we use the definition $$d_{lm,l',m'} = \left[D_{lm,l'm'}^x, D_{lm,l'm'}^y, D_{lm,l'm'}^z\right]^T$$

and the orthonormality of SHFs. Using these relations, one can compute:

$$\frac{1}{ik} \nabla e^{ikr^T n(\Omega_s)} = n(\Omega_s) e^{ikr^T n(\Omega_s)} \tag{A.3}$$

-continued $$\frac{4\pi}{ik} \nabla \sum_{l=0}^{\infty} i^l j_l(kr) \sum_{m=-l}^{l} Y_{lm}^*(\Omega_s) Y_{lm}(\Omega) = \sum_{l=0}^{\infty} 4\pi i^l j_l(kr) \sum_{m=-l}^{l} n(\Omega_s) Y_{lm}^*(\Omega_s) Y_{lm}(\Omega)$$

$$\sum_{l=0}^{\infty} \sum_{m=-l}^{l} Y_{lm}^*(\Omega_s) \frac{1}{ik} \nabla i^l j_l(kr) Y_{lm}(\Omega) =$$

$$\sum_{l=0}^{\infty} \sum_{m=-l}^{l} \sum_{l'=l\pm1} \sum_{m'=m-1}^{m+1} d_{lm,l'm'} Y_{l'm'}^*(\Omega_s) i^l j_l(kr) Y_{lm}(\Omega)$$

$$\frac{i^{l'-1}}{k} \nabla j_{l'}(kr) Y_{l'm'}(\Omega) = \sum_{l=0}^{\infty} \sum_{m=-l}^{l} d_{lm,l'm'} i^l j_l(kr) Y_{lm}(\Omega)$$

$$\int_{\mathbb{S}^2} Y_{lm}^*(\Omega) \frac{i^{l'-1}}{k} \nabla j_{l'}(kr) Y_{l'm'}(\Omega) d\Omega = i^l j_l(kr) d_{lm,l'm'}$$

$$\int_{\mathbb{S}^2} Y_{lm}^*(\Omega) \frac{i^{l'-1}}{i^l k j_l(kr)} \left[\nabla j_{l'(kr)} Y_{l'm'}(\Omega)\right] d\Omega = d_{lm,l'm'} \square$$

In the following, features, aspects functionalities and details of embodiments according to the invention are explained in other words. This section may be titled "Generalized Intensity Vector and Energy Density—Theory and Applications"

In the following, inter alia, theory and applications according to embodiments of the invention, of a generalized intensity vector and an energy density are discussed.

First of all, for example as an introduction to embodiments of the invention, the physical meaning of the intensity vector and energy density are explained in brevity:

Introduction

Physical meaning of intensity vector and energy density:

Intensity vector I: energy flow of sound field

Energy density E: sum of kinetic and potential energy densities of sound field

As an example, intensity vector and energy density may be used in spatial audio signal processing. In general, usage in spatial audio signal processing may comprise sound field reproduction [1, 2, 3], and/or acoustic parameter estimation [4, 5, 6] and/or e.g. as discussed in this work, e.g. with respect to embodiments of the invention: direction-of-arrival and diffuseness estimation.

In the following examples for an assessment of, or for example means for obtaining, intensity vector and energy density are presented. This may, for example comprise sound pressure and particle velocity sensors, sound field microphones and/or first-order Ambisonics (FOA), Microphone arrays (e.g. spherical arrays). As an example, any of these sensors or microphones may be used with embodiments of the invention. In particular, signal characteristics devices and/or audio encoder according to embodiments of the invention may comprise such sensors and/or microphones.

Figure 12:
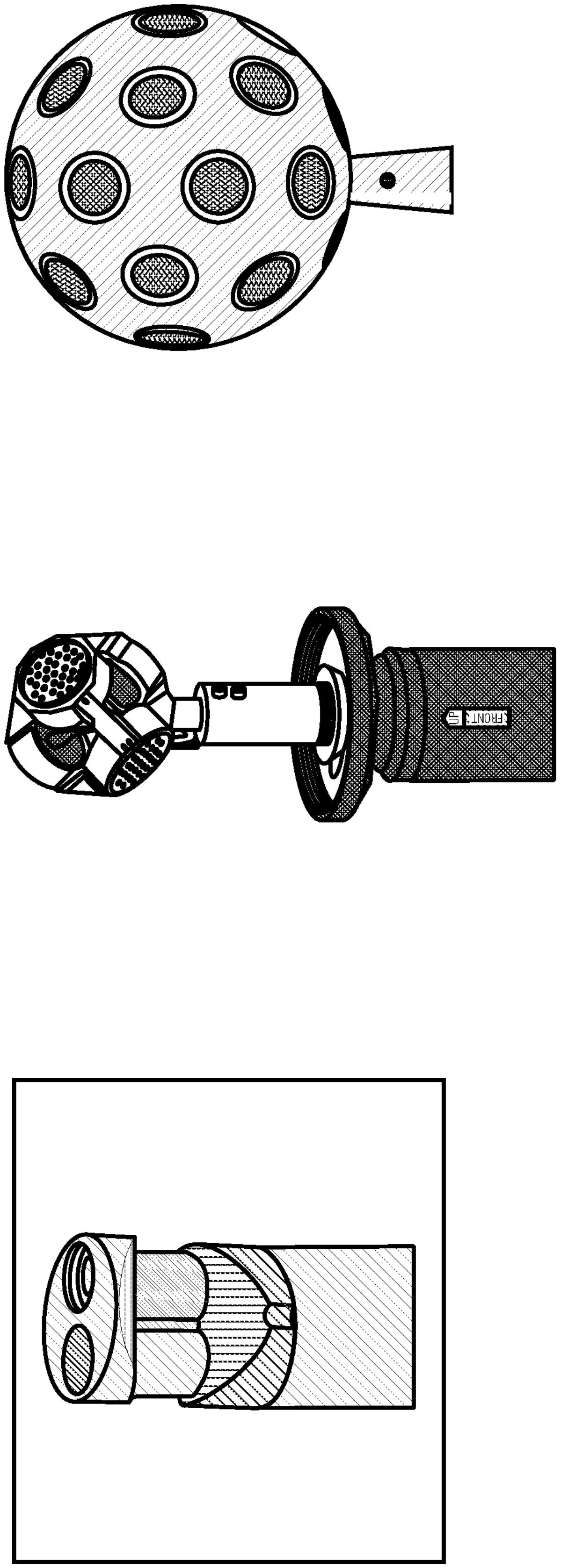

FIG. 12 shows examples for assessing, or for example obtaining, the intensity vector and energy density according to embodiments of the invention. FIG. 12 left: Microflown sound intensity probe [36], center: Sennheiser Ambeo VR Mic [37], right: mh acoustics Eigenmike [38]. As an example, according to embodiments, several of such microphones may be used in order to assess or obtain the measurements, e.g. p, in order to determine the (e.g. generalized) intensity vector and/or (e.g. generalized) energy density Main Idea According to Aspects of the Invention In the following a main Idea according to the aspects of the invention is presented.

Problem Formulation:

I and E are, for example, functions of space and time/frequency. I and E at the microphone array center can, for example, be expressed in terms of the zero- and first-order spherical harmonic coefficients (SHCs) of the sound field, i.e., FOA. Intensity-based acoustic parameter estimators, such as in directional audio coding (DirAC) [1], use only FOAs. The intensity-based parameter estimators are computationally cheap.

Question: How can we efficiently incorporate higher-order Ambisonics (HOA) for intensity-based parameter estimation?

Proposed Solution According to Embodiments of the Invention:

Consider, for example, weighted spatial averaging of I and/or E. Express the spatially averaged quantities, for example, via the SHCs of the sound field. The resulting expressions may contain higher-order SHCs and, for example, optionally spherical-harmonic-order-dependent weights g which are, for example, related to the spatial weighting function. This yields the proposed generalized quantities $I_g$ and $E_g$ according to the embodiments of the invention. $I_g$ and/or $E_g$ may, for example, be used for direction-of-arrival and diffuseness estimation.

In the following, examples of some useful properties of the generalized intensity vector and energy density are provided:

$I_g=0$ for spatially white noise and diffuse sound. $I_g$ and $E_g$ are, for example, quadratic functions of the SHCs⇒No computationally expensive operations such as singular-value-decompositions, etc. are required. Weights g can, for example, be chosen dependent on the application/scenario.

Applications According to Embodiments of the Invention

In the following, applications according to the aspects of the invention are discussed. One application addressed with embodiments of the invention may, for example be a signal model, and/or for example, determining sound field components according to a signal model.

Example of a signal model according to embodiments of the invention:

An observed SHCs of the sound pressure may be written in the following form $$X_{lm}(k, n) = S_{lm}(k, n) + D_{lm}(k, n) + N_{lm}(k, n)$$

wherein l, m: order and degree indices of SHCs, k, n: wavenumber (∝ frequency) and observation number, $S_{lm}$: SHCs of directional sound-field component, Dim: SHCs of diffuse sound-field component, $N_{lm}$: SHCs of microphone noise.

Assessment of SHCs may, for example be performed in practice from a spherical microphone array recording. In this work, a direct simulation of the SHCs is presented. It should be noted that the direct simulation of the SHCs presented in the following is an example for the assessment of the SHCs and that the recording of the SHCs from a microphone, for example a microphone array, such as spherical microphone array, is another optional feature of embodiments of the invention.

Another application addressed with embodiments of the invention may, for example be a parameter estimation.

Example of a parameter estimation according to embodiments of the invention:

Examples for parameters to estimate may be Ω(k,n): direction-of-arrival (DOA) per (k, n), and/or Ψ(k,n): diffuseness per (k, n).

Figure 13:
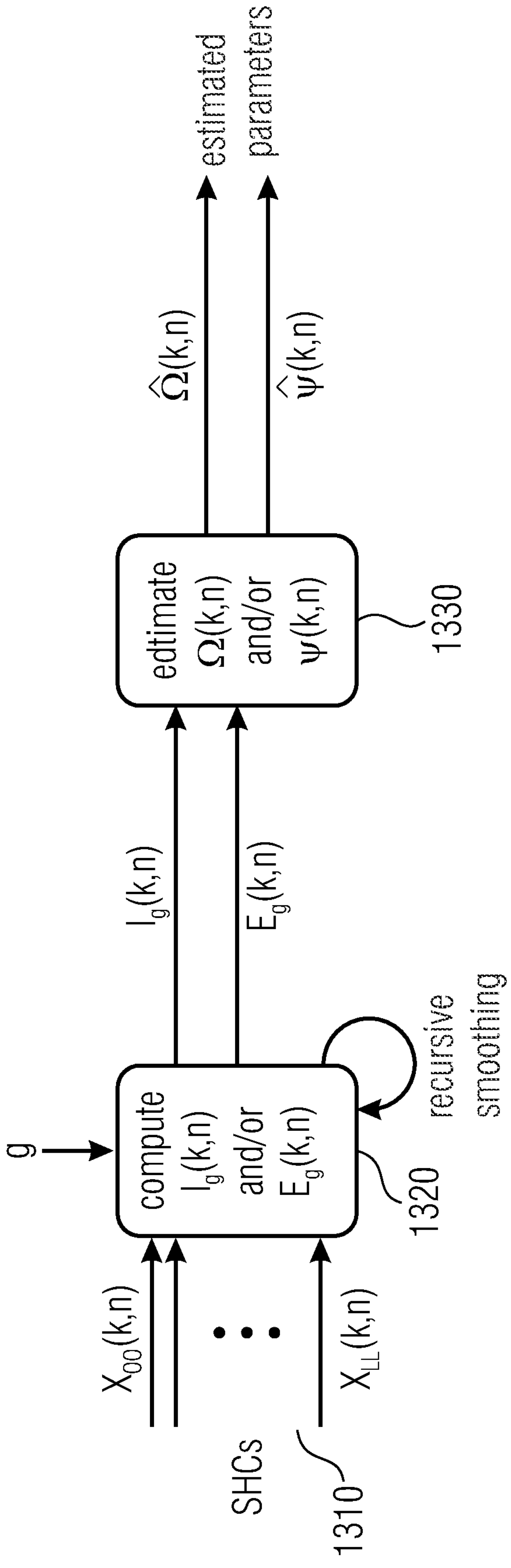
FIG. 13 shows a schematic signal flow according to embodiments of the invention.

FIG. 13 shows a schematic signal flow according to embodiments of the invention. FIG. 13 may show an example of an overview of a method according to embodiments of the invention.

SHCs $X_{lm}$ 1310 of a sound pressure of a sound field for l=0, m=0, up to l=L, m=L, with L being as an example the maximum order of SHCs=Ambisonic order, may be provided to a computation unit 1320. The computation unit may, for example, comprise one or both of the determination units 250, 260 shown in FIG. 2 *b*). Computation unit 1320 may be provided with spherical-harmonic-order dependent weights g, e.g. as defined before. The computation unit 1320 may, for example, determine a generalized intensity vector $I_g$ and/or a generalized energy density $E_g$. This may comprise a weighted spatial averaging of an intensity vector and/or a density vector and/or of SHCs of the sound pressure, using the spherical-harmonic-order dependent weights. Optionally, computation unit 1320 may be configured to perform recursive smoothing.

Generalized intensity vector $I_g$ and/or a generalized energy density $E_g$ may then be provided to an estimator 1330. Estimator 1330 may be configured to determine or to estimate an estimate for a direction of arrival $\hat{\Omega}$ and/or an estimate for a diffuseness of the sound field. The DOA and/or the diffuseness may be the estimated parameters, or in other words the information about the sound field determined.

In the following examples of evaluation results according to the aspects of the invention are presented.

Example of Evaluation

Simulation:

As an example, the following simulation setup may be used for the following evaluation results:

Direct simulation of $S_{lm}$, $D_{lm}$, $N_{lm}$ using complex white Gaussian noise sequences and theoretical coherence matrices; different signal-to-diffuse ratios (SDRs) and signal-to-microphone-noise ratios (SNRs); and coherence matrix of microphone noise dependents on kr (wavenumber x array radius)∝frequency.

The following fixed parameters may, for example, be used: True DOA: azimuth=0°, inclination=90°; number of samples: 1000; recursive smoothing parameter: 0.7.

As an example, reference is made to FIG. 7, for direction-of-arrival results.

As explained before, FIG. 7 may show an example of DOA estimation errors for different maximum orders L, SDRs (Signal-to-diffuse ratio), SNRs (signal to noise ratio) and kr-values. It is to be noted, that higher-order SHCs are in some cases very sensitive to microphone noise at low kr-values.

As another example, reference is made to FIG. 11, for diffuseness results

As explained before, FIG. 11 shows an example of estimated diffuseness for different maximum orders L, SDRs, SNRs and kr-values, with $\psi_{th}$ being the true diffuseness excluding microphone noise.

In the following, e.g. for a further evaluation of embodiments of the invention, reference is made to a diffuseness comparison.

We compared the proposed diffuseness estimator to other diffuseness estimators [14, 34, 35]. For details: see above disclosure.

Results: Proposed estimator, e.g. signal characteristic determinator according to embodiments of the invention, and performed best in average, but requires knowledge of the DOA. Proposed estimator yielded best average performance for L=3.

In the following a summary and conclusions regarding embodiments of the invention is discussed.

Summary: We proposed the generalized intensity vector $I_g$ and energy density $E_g$. $I_g$ and/or $E_g$ may, for example, contain higher-order SHCs of the sound pressure. We proposed to use $I_g$ and/or $E_g$ for acoustic parameter estimation.

Conclusions: $I_g$ and $E_g$ are computationally efficient to compute. The accuracy of the acoustic parameter estimation may for example increase, e.g. significantly, when higher-order SHCs are incorporated.

Further Conclusions

Embodiments according to the invention comprise methods for intensity vector and energy density estimation.

Embodiments according to the invention comprise methods to estimate the acoustic intensity vector and energy density using higher-order Ambisonic signals.

Further embodiments can be used or may be applicable on the field of and/or for at least one of spatial audio recording, acoustic scene analysis, speech coding and audio coding.

Embodiments according to the invention may be applicable in at least one of upHear Spatial Audio Microphone Processing, IVAS (e.g. Immersive Voice and Audio Services), Speech Coding and Audio Coding.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

1. V. Pulkki, "Spatial sound reproduction with directional audio coding," Journal Audio Eng. Soc. 55(6), 503-516 (2007).
2. D. Scaini and D. Arteaga, "Decoding of higher order ambisonics to irregular periphonic loudspeaker arrays," in Proc. 55th Int. Audio Eng. Soc. Conf. (2014).
3. H. Zuo, P. N. Samarasinghe, and T. D. Abhayapala, "Intensity based spatial soundfield reproduction using an irregular loudspeaker array," IEEE/ACM Trans. Audio, Speech, Lang. Process. 28, 1356-1369 (2020).
4. J. Ahonen and V. Pulkki, "Diffuseness estimation using temporal variation of intensity vectors," in Proc. IEEE Workshop an Applications of Signal Processing to Audio and Acoustics (WASPAA) (2009), pp. 285-288.
5. D. P. Jarrett, E. A. P. Habets, and P. A. Naylor, "3D source localization in the spherical harmonic domain using a pseudointensity vector," in Proc. European Signal Processing Conf. (EUSIPCO), Aalborg, Denmark (2010), pp. 442-446.
6. A. H. Moore, C. Evers, and P. A. Naylor, "Direction of arrival estimation in the spherical harmonic domain using subspace pseudointensity vectors," IEEE/ACM Trans. Audio, Speech, Lang. Process. 25(1), 178-192 (2017).
7. M. A. Gerzon, "The design of precisely coincident microphone arrays for stereo and surround sound," in Proc. Audio Eng. Soc. Convention (1975).
8. J. Herre, J. Hilpert, A. Kuntz, and J. Plogsties, "MPEG-H 3D Audio—the new standard for coding of immersive spatial audio," IEEE J. Sel. Topics Signal Process. 9(5) (2015).
9. F. Zotter and M. Frank, Ambisonics-A Practical 3D Audio Theory for Recording, Studio Production, Sound Reinforcement, and Virtual Reality (Springer, 2019).
10. D. Khaykin and B. Rafaely, "Coherent signals direction-of-arrival estimation using a sphereical microphone array: Frequency smoothing approach," in Proc. IEEE Workshop on Applications of Signal Processing to Audio and Acoustics (WASPAA) (2009), pp. 221-224, doi: 10.1109/ASPAA.2009.5346492.
11. H. Teutsch and W. Kellermann, "Detection and localization of multiple wideband acoustic sources based on wavefield decomposition using spherical apertures," in Proc. IEEE Ina Conf. on Acoustics, Speech and Signal Processing (ICASSP) (2008), pp. 5276-5279, doi: 10.1109/ICASSP.2008.4518850.
12. B. Jo and J. W. Choi, "Parametric direction-of-arrival estimation with three recurrence relations of spherical harmonics," J. Acoust. Soc. Am. 145(1), 480-488 (2019).
13. A. Herzog and E. A. P. Habets, "Eigenbeam-ESPRIT for DOA-vector estimation," IEEE Signal Process. Lett. 26(4), 572-576 (2019).
14. D. P. Jarrett, O. Thiergart, E. A. P. Habets, and P. A. Naylor, "Coherence-based diffuseness estimation in the spherical harmonic domain," in Proc. IEEE Convention of Electrical & Electronics Engineers in Israel (IEEEI), Israel (2012).
15. N. Epain and C. T. Jin, "spherical harmonic signal covariance and sound field diffuseness," IEEE Trans. Audio, Speech, Lang. Process. 24(10), 1796-1807 (2016).
16. A. Politis, J. Vilkamo, and V. Pulkld, "Sector-based parametric sound field reproduction in the spherical harmonic domain," IEEE J. Sel. Topics Signal Process. 9(5), 852-866 2015
17. A. Herzog and E. A. P. Habets, "On the relation between DOA-vector eigenenbeam ESPRIT and subspace-pseudointensity-vector," in Proc. European Signal Processing Conf. (EUSIPCO), A Conla, Spain (2019).
18. H. Zuo, P. N. Samarasinghe, T. D. Abhayapala, and G. Dickins, "Spatial sound intensity vectors in spherical harmonic domain," J. Acoust. Soc. Am. EL145(2), 149-155 (2019).
19. H. Zuo, T. D. Abhayapala, and P. N. Samarasinghe, "Particle velocity assisted three dimensional soundfield reproduction using a modal-domainapproach," IEEE/ACM Trans. Audio, Speech, Lang. Process. (2020).
20. A. D. Pierce, Acoustics: An Introduction to Its Physical Principles and Applications (Acoustical Society of America, 1991).
21. D. P. Jarrett, E. A. P. Habets, and P. A. Naylor, Theory and Applications of Spherical Microphone Array Processing (Springer, 2017).

22. F. J. Fahy, Sound Intensity, second ed. (E FN SPON, 1995).
23. E, A. P. Habets and S. Gannot, "Generating sensor signals in isotropic noise fields," J. Acoust. Soc. Am. 122(6), 3464-3470 (2007).
24. F. Jacobsen, "Active and reactive sound intensity in a reverberant sound field," Journal of Sound and Vibration 143(2), 231-240 (1990).
25. B. Rafaely, Fundamentals of Spherical Array Processing, Vol. 8 (Springer, 2015).
26. J. Meyer and G. Elko, "A highly scalable spherical microphone array based on an orthonormal decomposition of the soundfield," in Proc. IEEE Intl. Conf. 077, Acoustics, Speech and Signal Processing (ICASSP) (2002), Vol. 2, pp. 1781-1784.
27. B. Rafaely, "Plane-wave decomposition of the pressure on a sphere by spherical convolution," J. Acoust. Soc. Am. 116(4), 2149-2-157 (2004).
28. J. Meyer and G. W. Elko, "Spherical microphone arrays for 3d sound recordings," in Audio Signal Processing for Next-Generation Multimedia Communication Systems, edited by Y. Huang and J. Benesty (Kluwer Academic Publishers, Norwell, MA, USA, 2004), pp. 67-89.
29. A. Herzog and E. A. P. Habets, "Online DOA estimation using real eigenbeam ESPRIT with propagation vector matching," in Proc. EAA Spatial Audio Signal Processing Symp., Paris, France (2019).
30. J. A. Gaunt, "On the triplets of heluum," Philos. Trans. Roy. Soc. (London) Ser. A 228, 151-196 (1929).
31. D. M. Brink and G. R. Satchler, Angular Momentum, second ed. (Oxford University Press, 1968).
32. "NIST Digital library of mathematical functions", [Online] Available: http://dlmf.nist.gov/f. W. J. Olver, A. B. Olde Daalhuis, D. W. Lozier, B. I. Schneider, R. F. Boisvert, C. W. Clark, B. R. Maler, B. V. Saunders, H. S. Cohl, and M. A. McClain, eds.
33. H. W. Kuhn and A. W. Tucker, "Nonlinear programming," in Proc. Second Berkeley Symp. an Math. Statist, and Prob., Univ. of Calif. Press (1951), pp. 481-492.
34. O. Schwartz, S. Gannot, and E. A. P. Habets, "Joint estimation of late reverberant and speech power spectral densities in noisy environments using Frobenius norm," in Proc. European Signal Processing Conf. (EUSIPCO) (2016), pp. 1123-1127.
35. B. N. Gover, J. G. Ryan, and M. R. Stinson, "Microphone array measurement system for analysis of directional and spatial variations of sound fields," J. Acoust. Soc, Am. 112(5), 1980-1991 (2002) doi: 10. 1121/1. 1508782 1
36. F. Jacobsen and H. E. de Bree, "A comparison of two different sound intensity measurement principles," J. Acoust. Soc. Am., vol. 118, no. 3, pp. 1510-1517, 2005
37 Sennheiser electronic GmbH & Co. KG, "Ambeo VR mic." https://sennheiser.com/mikrofon-3d-audio-ambeo-vr-mic
38. mh acoustics LLC, "em32 Eigenmike Φ" https://mhacoustics.com/products.

The invention claimed is:

1. A signal characteristic determinator, wherein the signal characteristic determinator is configured to determine a characteristic of a sound field on the basis of higher-order spherical harmonic coefficients of a sound pressure and/or of a particle velocity and on the basis of spherical-harmonic-order dependent weights;

wherein the characteristic of the sound field is a generalized intensity vector and/or a generalized energy density of the sound field;

wherein the determination of the characteristic of the sound field on the basis of the spherical-harmonic-order dependent weights is associated with a weighted spatial averaging; and wherein the determination of the characteristic of the sound field on the basis of the spherical-harmonic-order dependent weights comprises a radial spatial averaging of an intensity vector of the sound field and/or of an energy density of the sound field.

2. The signal characteristic determinator according to claim 1, wherein the signal characteristic determinator is configured to determine the generalized intensity vector and/or a component of the generalized intensity vector and/or a generalized energy density of the sound field using a quadratic function of the SHCs of the sound pressure and/or of the particle velocity or using a quadratic form of the SHCs of the sound pressure and/or of the SHCs of the particle velocity.

3. The signal characteristic determinator according to claim 2, wherein the quadratic function of the SHCs of the sound pressure and/or of the particle velocity or the quadratic form of the SHCs of the sound pressure and/or of the SHCs of the particle velocity is associated with the weighted spatial averaging of the sound intensity vector and/or energy density.

4. The signal characteristic determinator according to claim 2, wherein the signal characteristic determinator is configured to determine the generalized intensity vector and/or the generalized energy density of the sound field using the quadratic form of the sound pressure and/or of the particle velocity; and wherein the quadratic form comprises a core matrix; and wherein the signal characteristic determinator is configured to determine the core matrix on the basis of a matrix comprising the spherical-harmonic-order dependent weights and a matrix describing a relationship between SHCs of the pressure and SHCs of the particle velocity.

5. The signal characteristic determinator according to claim 1, wherein the signal characteristic determinator is configured to determine the generalized intensity vector and/or the generalized energy density in a spherical harmonic domain; and wherein the determination of the generalized intensity vector and/or of the generalized energy density on the basis of spherical-harmonic-order dependent weights comprises a spatial averaging of an intensity vector of the sound field and/or of an energy density of the sound field.

6. The signal characteristic determinator according to claim 1, wherein the signal characteristic determinator is configured to determine the generalized intensity vector and/or a component of the generalized intensity vector and/or a generalized energy density of the sound field using a matrix multiplication, which is based on a matrix comprising the spherical harmonic order dependent weights, a matrix describing a relationship of the SHCs of the sound pressure and SHCs of the particle velocity and a matrix which is based on an outer product based on a vector comprising the SHCs of the sound pressure.

7. The signal characteristic determinator according to claim 1, wherein the signal characteristic determinator is configured to determine at least one of an expected value of the generalized intensity vector, an estimate of the expected value of the generalized intensity vector, an expected value of the generalized energy density, an estimate of the expected value of the generalized energy density, based on an averaging of the generalized intensity vector, and/or of the generalized energy density respectively over different time frames.

8. The signal characteristic determinator according to claim 1, wherein the signal characteristic determinator is configured to determine at least one of an expected value of the generalized intensity vector, an estimate of the expected value of the generalized intensity vector, an expected value of the generalized energy density, an estimate of the expected value of the generalized energy density, based on a covariance matrix of the spherical harmonic coefficients of the sound pressure and/or an estimate of the covariance matrix of the spherical harmonic coefficients of the sound pressure.

9. The signal characteristic determinator according to claim 1, wherein the signal characteristic determinator is configured to determine at least one of an expected value of the generalized intensity vector, an estimate of the expected value of the generalized intensity vector, an expected value of the generalized energy density, an estimate of the expected value of the generalized energy density, an expected value of the covariance matrix of the spherical harmonic coefficients of the pressure and an estimate of the expected value of the covariance matrix of the spherical harmonic coefficients of the pressure recursively.

10. The signal characteristic determinator according to claim 1, wherein the signal characteristic determinator is configured to receive the SHCs of the sound pressure and/or of the particle velocity from a microphone and/or wherein the signal characteristic determinator comprises the microphone and wherein the microphone is configured to determine the SHCs of the sound pressure and/or of the particle velocity.

11. The signal characteristic determinator according to claim 1, wherein the signal characteristic determinator is configured to determine a direction of arrival of a plane wave component of a sound field which comprises the plane wave component and a diffuse component, or to determine a diffuseness of the sound field which comprises the plane wave component and the diffuse component, wherein the signal characteristic determinator is configured to receive SHCs of the sound pressure of the sound field, and wherein the estimator is configured to determine the direction of arrival and/or the diffuseness based on at least one of the generalized intensity vector, an expected value of the generalized intensity vector, an estimate of the expected value of the generalized intensity vector, the generalized energy density, an expected value of the generalized energy density, an estimate of the expected value of the generalized energy density.

12. The signal characteristic determinator according to claim 1, wherein the signal characteristic determinator is configured to determine an estimation of the direction of arrival and/or the direction of arrival based on the real part of the expected value of the generalized intensity vector and/or based on the real part of an estimate of the expected value of the generalized intensity vector.

13. The signal characteristic determinator according to claim 1, wherein the signal characteristic determinator is configured to determine an estimate of the diffuseness or the diffuseness based on a quotient comprising a norm of an expected value of the generalized intensity vector or a norm of an estimate of the expected value of the generalized intensity vector in the numerator and an expected value of the generalized energy density or an estimate of the expected value of the generalized energy density in the denominator.

14. The signal characteristic determinator according to claim 1, wherein the signal characteristic determinator comprises a weight calculator and wherein the weight calculator is configured to determine the spherical-harmonic-order dependent weights using a variance of the signal characteristic to be determined as an optimization quantity.

15. The signal characteristic determinator according to claim 1, wherein the signal characteristic determinator comprises a weight calculator and wherein the weight calculator is configured to determine the spherical-harmonic-order dependent weights on the basis of higher-order SHCs of the sound pressure and/or of the particle velocity.

16. The signal characteristic determinator according to claim 14, wherein the weight calculator is configured to minimize the variance of the generalized intensity vector of the sound field in order to determine the spherical-harmonic-order dependent weights.

17. The signal characteristic determinator according to claim 14, wherein the weight calculator is configured to minimize a cost function, the cost function comprising the variance of the generalized intensity vector of the sound field, in order to determine the spherical-harmonic-order dependent weights.

18. The signal characteristics determinator according to claim 1, wherein the higher-order spherical harmonic coefficients of the sound pressure and/or of the particle velocity are substituted by or are determined by higher-order circular harmonic coefficients of the sound pressure and/or of the particle velocity; and wherein the signal characteristic determinator is configured to determine the characteristic of the sound field on the basis of spherical-harmonic-order dependent weights or on the basis of circular-harmonic-mode dependent weights.

19. A method for determining a signal characteristic, wherein the method comprises determining a characteristic of a sound field on the basis of higher-order spherical harmonic coefficients of a sound pressure and/or of a particle velocity and on the basis of spherical-harmonic-order dependent weights;

wherein the characteristic of the sound field is a generalized intensity vector and/or a generalized energy density of the sound field;

wherein the determination of the characteristic of the sound field on the basis of the spherical-harmonic-order dependent weights is associated with a weighted spatial averaging; and wherein the determination of the characteristic of the sound field on the basis of the spherical-harmonic-order dependent weights comprises a radial spatial averaging of an intensity vector of the sound field and/or of an energy density of the sound field.

20. A non-transitory digital storage medium having a computer program stored thereon to perform the method for determining a signal characteristic, wherein the method comprises determining a characteristic of a sound field on the basis of higher-order spherical harmonic coefficients of a sound pressure and/or of a particle velocity and on the basis of spherical-harmonic-order dependent weights;

wherein the characteristic of the sound field is a generalized intensity vector and/or a generalized energy density of the sound field;

wherein the determination of the characteristic of the sound field on the basis of the spherical-harmonic-order dependent weights is associated with a weighted spatial averaging; and wherein the determination of the characteristic of the sound field on the basis of the spherical-harmonic-order dependent weights comprises a radial spatial averaging of an intensity vector of the sound field and/or of an energy density of the sound field, when said computer program is run by a computer.

* * * * *